US011546923B2

(12) United States Patent
Kaur et al.

(10) Patent No.: US 11,546,923 B2
(45) Date of Patent: Jan. 3, 2023

(54) DEVICE-TO-DEVICE SYNCHRONIZATION

(71) Applicant: INTERDIGITAL PATENT HOLDINGS, INC., Wilmington, DE (US)

(72) Inventors: Samian Kaur, Plymouth Meeting, PA (US); Diana Pani, Montreal (CA); Yuxin Zhao, Linköping (SE); Benoit Pelletier, Roxboro (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/167,682

(22) Filed: Oct. 23, 2018

(65) Prior Publication Data
US 2019/0059094 A1 Feb. 21, 2019

Related U.S. Application Data

(63) Continuation of application No. 15/127,385, filed as application No. PCT/US2015/021489 on Mar. 19, 2015, now Pat. No. 10,129,902.
(Continued)

(51) Int. Cl.
*H04W 72/12* (2009.01)
*H04W 56/00* (2009.01)
(Continued)

(52) U.S. Cl.
CPC ....... *H04W 72/121* (2013.01); *H04W 52/383* (2013.01); *H04W 56/002* (2013.01);
(Continued)

(58) Field of Classification Search
CPC ... H04W 72/121; H04W 76/19; H04W 76/18; H04W 76/14; H04W 52/383; H04W 56/002; H04W 72/02; H04W 72/12
(Continued)

(56) References Cited

U.S. PATENT DOCUMENTS 8,588,803 B2  11/2013  Hakola et al.
9,113,450 B2   8/2015  Pelletier et al.
(Continued)

FOREIGN PATENT DOCUMENTS

CN  101754227 A  6/2010
CN  102090132 A  6/2011
(Continued)

OTHER PUBLICATIONS

3rd Generation Partnership Project (3GPP), R2-140422, "Procedures for Type 1 and Type 2 Discovery Resource Allocation", Huawei, 3GPP TSG RAN WG2 Meeting #85, Prague, Czech Republic, Feb. 10-14, 2014, 8 pages.
(Continued)

*Primary Examiner* — Obaidul Huq
(74) *Attorney, Agent, or Firm* — Condo Roccia Koptiw LLP

(57) ABSTRACT

A wireless transmit receive unit (WTRU) may be operated in a first scheduling mode for device-to-device communication. In the first scheduling mode, a network entity may schedule resources to be used by the WTRU for device-to-device communications. The WTRU may detect that a radio link failure (RLF) timer is running or has been started. The WTRU may switch from the first scheduling mode for device-to-device communication to a second scheduling mode for device-to-device communication in response to detecting that the radio link failure timer is running or has been started. In the second scheduling mode, the WTRU may select a resource from a resource pool for the WTRU to use for one or more device-to-device communications.

16 Claims, 23 Drawing Sheets

Related U.S. Application Data

(60) Provisional application No. 62/075,524, filed on Nov. 5, 2014, provisional application No. 62/032,373, filed on Aug. 1, 2014, provisional application No. 61/990,049, filed on May 7, 2014, provisional application No. 61/955,746, filed on Mar. 19, 2014, provisional application No. 61/955,747, filed on Mar. 19, 2014.

(51) Int. Cl.
*H04W 76/19* (2018.01)
*H04W 76/18* (2018.01)
*H04W 76/14* (2018.01)
*H04W 52/38* (2009.01)
*H04W 72/02* (2009.01)

(52) U.S. Cl.
CPC ........... *H04W 72/02* (2013.01); *H04W 72/12* (2013.01); *H04W 76/14* (2018.02); *H04W 76/18* (2018.02); *H04W 76/19* (2018.02)

(58) Field of Classification Search
USPC ................................ 370/310, 328, 329, 336
See application file for complete search history.

(56) References Cited

U.S. PATENT DOCUMENTS

| | | |
|---|---|---|
| 9,276,665 B1 | 3/2016 | Johnson et al. |
| 9,516,550 B2 | 12/2016 | Xiong et al. |
| 9,622,131 B2 | 4/2017 | Koskela et al. |
| 10,159,061 B2 | 12/2018 | Zhao et al. |
| 10,327,256 B2 | 6/2019 | Boudreau et al. |
| 2006/0036518 A1 | 2/2006 | O'Neill |
| 2009/0291692 A1 | 11/2009 | Kazmi et al. |
| 2009/0325625 A1 | 12/2009 | Hugl et al. |
| 2010/0027507 A1 | 2/2010 | Li et al. |
| 2010/0172311 A1 | 7/2010 | Agrawal et al. |
| 2010/0202400 A1 | 8/2010 | Richardson et al. |
| 2010/0215011 A1 | 8/2010 | Pan et al. |
| 2010/0240312 A1 | 9/2010 | Peng et al. |
| 2010/0278132 A1 | 11/2010 | Palanki et al. |
| 2010/0317291 A1 | 12/2010 | Richardson |
| 2011/0007657 A1 | 1/2011 | Kazmi et al. |
| 2011/0106952 A1 | 5/2011 | Doppler et al. |
| 2011/0122933 A1 | 5/2011 | Adam et al. |
| 2012/0039253 A1* | 2/2012 | Wang ................ H04W 72/1263 370/328 |
| 2012/0057461 A1 | 3/2012 | Bader |
| 2012/0063298 A1 | 3/2012 | Yi et al. |
| 2012/0076084 A1 | 3/2012 | Iwamura et al. |
| 2012/0106517 A1 | 5/2012 | Charbit et al. |
| 2012/0170447 A1 | 7/2012 | Bell et al. |
| 2012/0207045 A1 | 8/2012 | Pelletier et al. |
| 2012/0243431 A1 | 9/2012 | Chen et al. |
| 2013/0064187 A1 | 3/2013 | Patil et al. |
| 2013/0100846 A1 | 4/2013 | Park et al. |
| 2013/0107704 A1 | 5/2013 | Dinan |
| 2013/0109301 A1 | 5/2013 | Hakola et al. |
| 2013/0123637 A1 | 5/2013 | Wohlschlager et al. |
| 2013/0208604 A1 | 8/2013 | Lee et al. |
| 2013/0210435 A1 | 8/2013 | Dimou et al. |
| 2013/0230032 A1 | 9/2013 | Lu et al. |
| 2013/0242787 A1 | 9/2013 | Sun et al. |
| 2013/0267230 A1 | 10/2013 | Lin et al. |
| 2013/0272148 A1* | 10/2013 | Fong ................ H04W 28/0226 370/252 |
| 2013/0272262 A1 | 10/2013 | Li et al. |
| 2013/0288737 A1 | 10/2013 | Nentwig et al. |
| 2013/0322413 A1 | 12/2013 | Pelletier et al. |
| 2013/0343322 A1 | 12/2013 | Lee et al. |
| 2014/0010172 A1 | 1/2014 | Wei et al. |
| 2014/0023008 A1 | 1/2014 | Ahn et al. |
| 2014/0056220 A1 | 2/2014 | Poitau et al. |
| 2014/0098761 A1 | 4/2014 | Lee et al. |
| 2014/0119228 A1 | 5/2014 | Wang et al. |
| 2014/0126527 A1 | 5/2014 | Xiong et al. |
| 2014/0128057 A1 | 5/2014 | Siomina et al. |
| 2014/0128115 A1 | 5/2014 | Siomina et al. |
| 2014/0198655 A1 | 7/2014 | Ishii et al. |
| 2014/0204825 A1 | 7/2014 | Ekpenyong et al. |
| 2014/0241260 A1 | 8/2014 | Schmidt et al. |
| 2014/0247800 A1 | 9/2014 | Ro et al. |
| 2014/0256329 A1 | 9/2014 | Cao et al. |
| 2014/0280581 A1 | 9/2014 | Hernandez et al. |
| 2014/0295858 A1 | 10/2014 | Li et al. |
| 2014/0334391 A1 | 11/2014 | Khoshnevis et al. |
| 2015/0009910 A1 | 1/2015 | Ryu et al. |
| 2015/0029983 A1 | 1/2015 | Kimoto |
| 2015/0181546 A1 | 6/2015 | Freda et al. |
| 2015/0195828 A1 | 7/2015 | Fujishiro et al. |
| 2015/0215981 A1* | 7/2015 | Patil ................ H04W 72/1263 370/329 |
| 2015/0223141 A1* | 8/2015 | Chatterjee ............. H04L 5/0092 370/329 |
| 2015/0236825 A1 | 8/2015 | Park et al. |
| 2015/0245191 A1 | 8/2015 | Xu |
| 2015/0271763 A1 | 9/2015 | Balachandran et al. |
| 2015/0271841 A1 | 9/2015 | Yamada et al. |
| 2015/0289304 A1 | 10/2015 | Liang et al. |
| 2015/0327240 A1 | 11/2015 | Yamada et al. |
| 2015/0334760 A1 | 11/2015 | Sartori et al. |
| 2015/0341911 A1 | 11/2015 | Wakabayashi et al. |
| 2015/0373764 A1 | 12/2015 | Yu et al. |
| 2016/0029429 A1 | 1/2016 | Peng et al. |
| 2016/0037488 A1 | 2/2016 | Li et al. |
| 2016/0044730 A1 | 2/2016 | Baghel et al. |
| 2016/0057604 A1 | 2/2016 | Luo et al. |
| 2016/0095131 A1 | 3/2016 | Seo et al. |
| 2016/0135200 A1 | 5/2016 | Brahmi et al. |
| 2016/0165428 A1 | 6/2016 | Lee et al. |
| 2016/0219632 A1* | 7/2016 | Wallentin ............... H04W 76/14 |
| 2016/0255515 A1* | 9/2016 | Lindoff ............. H04W 74/0833 370/252 |
| 2017/0006582 A1* | 1/2017 | Jung ..................... H04W 72/02 |
| 2017/0013595 A1 | 1/2017 | Jung et al. |
| 2017/0048888 A1 | 2/2017 | Belleschi et al. |
| 2017/0230957 A1 | 8/2017 | Wakabayashi et al. |
| 2017/0295567 A1 | 10/2017 | Chen et al. |
| 2017/0303241 A1 | 10/2017 | Yang et al. |
| 2019/0082423 A1 | 3/2019 | Zhao et al. |
| 2019/0239266 A1 | 8/2019 | Chai et al. |
| 2019/0281526 A1 | 9/2019 | Freda et al. |
| 2021/0410126 A1 | 12/2021 | Ganesan et al. |

FOREIGN PATENT DOCUMENTS

| | | |
|---|---|---|
| CN | 102318421 A | 1/2012 |
| CN | 102428728 A | 4/2012 |
| CN | 102783211 A | 11/2012 |
| CN | 102869105 A | 1/2013 |
| CN | 102883440 A | 1/2013 |
| CN | 102883441 A | 1/2013 |
| CN | 103037448 A | 4/2013 |
| CN | 103068049 A | 4/2013 |
| CN | 103200634 A | 7/2013 |
| CN | 103634845 A | 3/2014 |
| JP | 2014-007745 A | 1/2014 |
| KR | 20130021352 A | 3/2013 |
| RU | 2503153 C2 | 12/2013 |
| WO | WO 2011/069295 A1 | 6/2011 |
| WO | 2012/159270 A1 | 11/2012 |
| WO | 2013/048296 A1 | 4/2013 |
| WO | 2013/100831 A1 | 7/2013 |
| WO | WO 2013/123637 A1 | 8/2013 |
| WO | WO 2014/169695 A1 | 10/2014 |

OTHER PUBLICATIONS

3rd Generation Partnership Project (3GPP), R2-140714, "Resource Allocation Aspects of 1: M D2D Broadcast Communication",

(56) References Cited

OTHER PUBLICATIONS

Qualcomm, 3GPP TSG-RAN WG2 #85, Prague, Czech Republic, Feb. 10-14, 2014, 4 pages.
Wiemann et al., "Status Report RAN WG2 to TSG-RAN #63", 3GPP TSG RAN-63, Fukuoka, Japan, Mar. 3-6, 2014, 40 pages.
3rd Generation Partnership Project (3GPP), R1-135142, "RRM for D2D communication", Fujitsu, 3GPP TSG-RAN1 #75, San Francisco, United States, Nov. 11-15, 2013, pp. 1-6.
3rd Generation Partnership Project (3GPP), TR 36.843 V1.0.0, "Technical Specification Group RAN, Study on LTE Device to Device Proximity Services-Radio Aspects, (Release 12)", Nov. 2013, pp. 1-32.
3rd Generation Partnership Project (3GPP), R1-135316, "Multi-hop D2D Synchronization Performance", 3GPP TSG-RAN WG1, Meeting #75, San Francisco, USA, Nov. 11-15, 2013, 7 pages.
3rd Generation Partnership Project (3GPP), R1-135803, "Synchronization Procedures for D2D Discovery and Communication", Ericsson, 3GPP TSG RAN WG1, Meeting # 75, San Francisco, USA, Nov. 11-15, 2013, 6 pages.
3rd Generation Partnership Project (3GPP), R1-140773, "Synchronization Procedures for D2D Discovery and Communication", Ericsson, 3GPP TSG RAN WG1, Meeting # 76, Prague, Czech Republic, Feb. 10-14, 2014, 7 pages.
3rd Generation Partnership Project (3GPP), R1-092468, "Control Channel of Backhaul Link", ZTE, TSG-RAN WG1 #67bls, Los Angeles, US, Jun. 29-Jul. 3, 2009, 7 pages.
3rd Generation Partnership Project (3GPP), R1-092965, "Control Structure for Relay Type 1 nodes", TSG-RAN WG1#57Bis, NEC Group, Los Angeles, CA, Jun. 29-Jul. 3, 2009, 5 pages.
3rd Generation Partnership Project (3GPP); RP-140029, "Status Report RAN WG2 to TSG-RAN #63", Wiemann et al, 3GPP TSG RAN-63, Fukuoka, Japan, Mar. 3-6, 2014, 55 pages.
$3^{rd}$ Generation Partnership Project (3GPP), R2-122185, "Early Termination of T310", Qualcomm Incorporated, 3GPP TSG-RAN WG2 Meeting #78, Prague, Czech Republic, May 21-25, 2012, 4 pages.
$3^{rd}$ Generation Partnership Project (3GPP), R3-140047, "Discussion on the Coordination of D2D Resource for Inter-Cell D2D Discovery and Communication", ZTE, 3GPP TSG-RAN WG3 Meeting #83, Prague, Czech, Feb. 10-14, 2014, 6 pages.
3rd Generation Partnership Project (3GPP), R2-142230, "Mode-1 in Coverage Exception Handling", Huawei, HiSilicon, 3GPP TSG RAN WG2 Meeting #86, Seoul, Korea, May 19-23, 2014, 7 pages.
3rd Generation Partnership Project (3GPP), Tdoc R2-142685, "Mode Selection for D2D Communications", InterDigital Communications, 3GPP TSG-RAN WG2 #86, Seoul, Korea, May 19-24, 2014, 5 pages.
3rd Generation Partnership Project (3GPP), R1-140427, "Public safety perspective on resource allocation for D2D group communications", U.S. Department of Commerce, 3GPP TSG-RAN WG1, Meeting #76, Prague, Czech Republic, Feb. 10-14, 2014, 3 pages.
3rd Generation Partnership Project (3GPP), R1-125096, "Text Proposal to 36.888 on Control and User Plan Protocol Aspects with Low Rate MTC Data Services", InterDigital Communications, Llc, 3GPP TSG-RAN WG1 Meeting #71, New Orleans, USA, Nov. 12-16, 2012, 4 pages.
3rd Generation Partnership Project (3GPP), R1-135809, "On Out of Coverage Definitions for D2D", Ericsson, 3GPP TSG RAN WG1 Meeting #75, San Francisco, USA, Nov. 11-15, 2013, 4 pages.
3rd Generation Partnership Project (3GPP), R1-140575, "Resource Allocation for Discovery Signals", Nokia, NSN, 3GPP TSG-RAN WG1 Meeting #76, Prague, Czech Republic, Feb. 10-14, 2014, 5 pages.
3rd Generation Partnership Project (3GPP), R1-140589, "D2D Communication Resource Scheduling", Sony, 3GPP TSG-RAN WG1 Meeting #76, Prague, Czech Republic, Feb. 10-14, 2014, 5 pages.

* cited by examiner

DEVICE-TO-DEVICE SYNCHRONIZATION

CROSS-REFERENCE TO RELATED APPLICATIONS

This application is a continuation of U.S. application Ser. No. 15/127,385, filed Sep. 19, 2016, which is the National Stage entry under 35 U.S.C. § 371 of Patent Cooperation Treaty Application PCT/US2015/021489, filed Mar. 19, 2015, which claims the benefit of U.S. Provisional Application No. 61/955,747, filed Mar. 19, 2014, U.S. Provisional Application No. 61/955,746, filed Mar. 19, 2014, U.S. Provisional Application No. 61/990,049, filed May 7, 2014, U.S. Provisional Application No. 62/032,373, filed Aug. 1, 2014, and U.S. Provisional Application No. 62/075,524, filed Nov. 5, 2014, the disclosures of which are incorporated herein by reference in their entirety.

BACKGROUND

Direct device-to-device (D2D) communications may be used in wireless networks. D2D communications may refer to wireless communication transmission exchanged directly between two or more wireless transmit/receive units (WTRUs) without the communications being routed through wireless communication infrastructure such as base stations or access points (e.g., although the wireless infrastructure may be used for configuring a D2D session and/or scheduling D2D transmissions). D2D communications may be used to provide proximity-based service (Pro-Se) among WTRUs. D2D communications may provide support for commercial, social, and public safety communications. A D2D infrastructure may provide consistency in user experience, for example including reachability and mobility aspects. D2D may provide network offloading in high traffic cells. For example, D2D may provide support for various services and/or applications when network coverage is limited or unavailable.

With respect to supporting public safety communications, there may be a need to harmonize the radio access technology across jurisdictions and lower the cost of radio-access technology to public safety (PS) officials. For example, first responders may require communications in areas that may not be under radio coverage of an LTE network. For example, a WTRU may be out of coverage in tunnels, basements, or areas where network service is disrupted due to natural disasters, terrorist attacks and the like. D2D communications may be supported for PS. For example, D2D may provide direct push-to-talk services to first responders who may be handling time sensitive emergencies.

D2D communications may be available for commercial uses, for example utility companies or the like. For example, D2D communication techniques may be used for enhancing communications in areas that may have poor coverage from network infrastructure. Commercial and social users may request D2D communications, for example, to assure the consistency of their user experience. For example, a user may request D2D communications to improve the user's reachability and/or mobility.

SUMMARY

One or more example embodiments as described more fully below provide apparatuses, functions, procedures, processes, execution of computer program instruction(s) tangibly embodying a computer readable memory, functions and operation of methods for one or more of the following. To facilitate the scheduling of D2D communications, a WTRU may be configured to determine an appropriate scheduling mode for use in D2D communication based on conditions related to the radio link coverage from a cellular network such as a Long Term Evolution (LTE) Evolved Universal Mobile Telecommunications System (UMTS) Terrestrial Radio Access Network (E-UTRAN). For example, the WTRU may determine a coverage condition related to E-UTRAN coverage based on one or more trigger events and/or one or more trigger updates in order to select appropriate modes for utilizing D2D resources.

A WTRU D2D scheduling mode of operation may be determined based on one or more triggering events observed at the WTRU. The trigger events may be related to detected radio conditions, or network coverage. The trigger events may be related to the state of WTRU Radio Resource Control (RRC) timers (e.g., detecting that a RRC timer has been started, detecting that a RRC timer is running, detecting that a RRC timer has been stopped, detecting that a RRC timer has expired, or detecting that a RRC timer has been reset). An example of an RRC timer may include a Radio Link Failure (RLF) timer. For purposes of explanation and description, the examples described herein may be described with respect to RLF timers, but the examples may also be applicable to RRC timers (and vice versa). Rather than or in addition to performing legacy timer procedures upon the occurrence of a RRC-related trigger event, the WTRU may also be configured to switch the D2D mode of operation based on the occurrence of a RRC-related trigger event. The WTRU may evaluate and re-evaluate the WTRU mode of operation based on different types of triggers depending on whether the WTRU is connected to the network or in IDLE mode. Resource pool selection for WTRU transmission (Tx) and/or reception (Rx) for D2D communication may be performed by the WTRU, and the WTRU may select the D2D communication parameters using configuration(s) of resource pools and message content, for example, based on a change in WTRU mode of operation, based upon various triggering events, or based on RLF-related trigger event. Time domain D2D transmission and/or reception patterns may be configured based upon various triggering events.

A WTRU may determine the type of scheduling mode for D2D communications based on detected radio link conditions associated with an E-UTRAN network and/or other triggering conditions. For example, a WTRU may operate in a first scheduling mode for device-to-device communication. In the first scheduling mode, a network entity may schedule resources to be used by the WTRU for device-to-device communications. The WTRU may detect that a radio link failure (RLF) timer is running or has been started. The WTRU may switch from the first scheduling mode for device-to-device communication to a second scheduling mode for device-to-device communication in response to detecting that the radio link failure timer is running or has been started. In the second scheduling mode, the WTRU may select a resource from a resource pool for the WTRU to use for one or more device-to-device communications.

For example, the RRC timer may correspond to a timer T310. The WTRU may start the RRC timer (e.g., timer T310) in response to detecting a number of consecutive out-of-synch transmit time intervals (TTIs) exceeding a threshold. In an example, the RRC timer may correspond to a timer T311. The WTRU may start the RRC timer (e.g., timer T311) in response to a RRC connection re-establishment procedure being initiated. The RRC timer may correspond to a timer T301. The WTRU may cease operating in the second scheduling mode upon expiration of the timer T301. The WTRU may be configured to start the RRC timer (e.g., timer T301) in response to the WTRU transmitting a radio resource control (RRC) connection re-establishment request message. Starting the RRC timer may trigger the WTRU to change the D2D scheduling mode from the first mode to the second mode. The WTRU may change the D2D scheduling mode from the second mode to the first mode upon successful reestablishment of the RRC connection. Operating the WTRU in the second scheduling mode may include operating the WTRU using fixed power control. Determining to operate as a relay may act as a trigger. For example, the WTRU may determine to operate as a relay WTRU and start operating in the second scheduling mode for D2D communication.

A WTRU may determine the type of scheduling mode for D2D communications based on detecting a failure to connect with an E-UTRAN network. For example, a WTRU in IDLE mode may initiate a connection establishment procedure to request D2D resources for transmission. The WTRU may start a RRC timer (e.g., connection establishment timer T300). Upon expiry of the connection establishment timer, the WTRU may determine to use the second scheduling mode. In the second scheduling mode, the WTRU may select a resource from a resource pool for the WTRU to use for one or more device-to-device communications. For example, the WTRU may determine to use the second scheduling mode until it is configured by the network with resources for the first scheduling mode.

A WTRU may switch from a first scheduling mode for D2D communication to a second scheduling mode for D2D communication in response to detecting a condition. The WTRU may operate in the first scheduling mode for D2D communication. In the first scheduling mode, a network entity may schedule resources to be used by the WTRU for D2D communications. The WTRU may detect a condition to switch the WTRU from the first scheduling mode to a second scheduling mode for D2D communication. The WTRU may operate in the second scheduling mode in response to detecting the condition. In the second scheduling mode, the WTRU may select a resource from a resource pool for the WTRU to use for D2D communications.

The WTRU may detect the condition to switch from the first scheduling mode to the second scheduling mode by determining that the WTRU has not selected a cell that supports D2D communication. The WTRU may detect the condition to switch from the first scheduling mode to the second scheduling mode by determining that the WTRU is out of cell coverage. The WTRU may detect the condition to switch from the first scheduling mode to the second scheduling mode by determining that a number of radio link communication (RLC) retransmissions is above a threshold.

The WTRU may detect the condition to switch from the first scheduling mode to the second scheduling mode by detecting a failure to decode a serving cell system information block (SIB) within a time period. The WTRU may detect the condition to switch from the first scheduling mode to the second scheduling mode by determining that the WTRU is in a RRC_IDLE state. The WTRU may switch to using fixed power control in response to switching from the first scheduling mode to the second scheduling mode.

A WTRU may be configured to operate in a first scheduling mode for D2D communication. In the first scheduling mode, a network entity may schedule resources to be used by the WTRU for D2D communications. The WTRU may detect a condition to select a second scheduling mode for D2D communication. In the second scheduling mode, the WTRU may select a resource from a resource pool for the WTRU to use for D2D communications. The WTRU may operate in the second scheduling mode for D2D communication in response to detecting the condition. The WTRU may detect the condition based on the one or more triggers described herein. For example, as described herein, the WTRU may detect the condition based on the state of a timer (e.g., RRC timer, RLF timer, timer 300, timer 301, timer 310, and/or timer 311). The WTRU may be configured to operate in the first scheduling mode using broadcast signaling or dedicated signaling. The WTRU may detect the condition by determining that the WTRU is unable to identify a cell that satisfies a suitability criteria. The WTRU may select a preconfigured resource pool associated with the second scheduling mode upon being unable to identify a cell that satisfied a suitability criteria. The WTRU may be configured to switch from the second scheduling mode to the first scheduling mode upon determining that the timer T310 has been stopped and that timer T311 is not running.

D2D Synchronization signals (D2DSS) may be transmitted and/or received by the WTRU. For example, D2DSS may be communicated using one or more D2D frame configurations. The content of a synchronization frame may be determined from a D2DSS and/or a hop count. The WTRU may use rules to prioritize synchronization sources and prioritize data reception. The WTRU may be configured to transmit one or more D2DSS, which may include configuration of preambles and post-ambles. The WTRU may be configured to determine when to stop and/or change transmission of D2DSSs and/or other types of D2D messages, for example based on the occurrence of triggering conditions. The WTRU may be configured to determine appropriate formats for a Physical D2D synchronization channel (PD2DSCH) transmission, which may include determining the content of the message, the content of the D2DSS, and/or conditions for transmission of the PD2DSCH.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
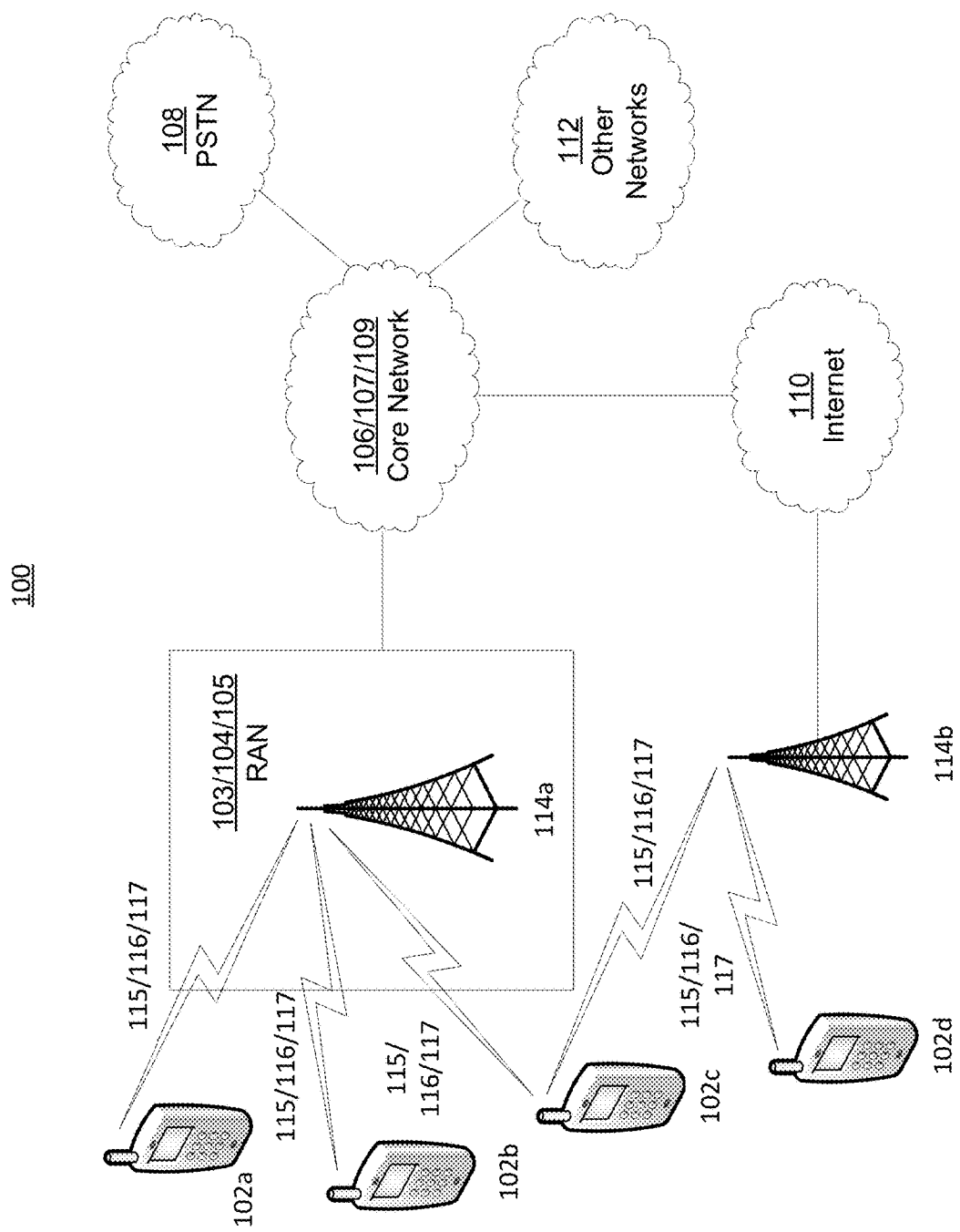
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
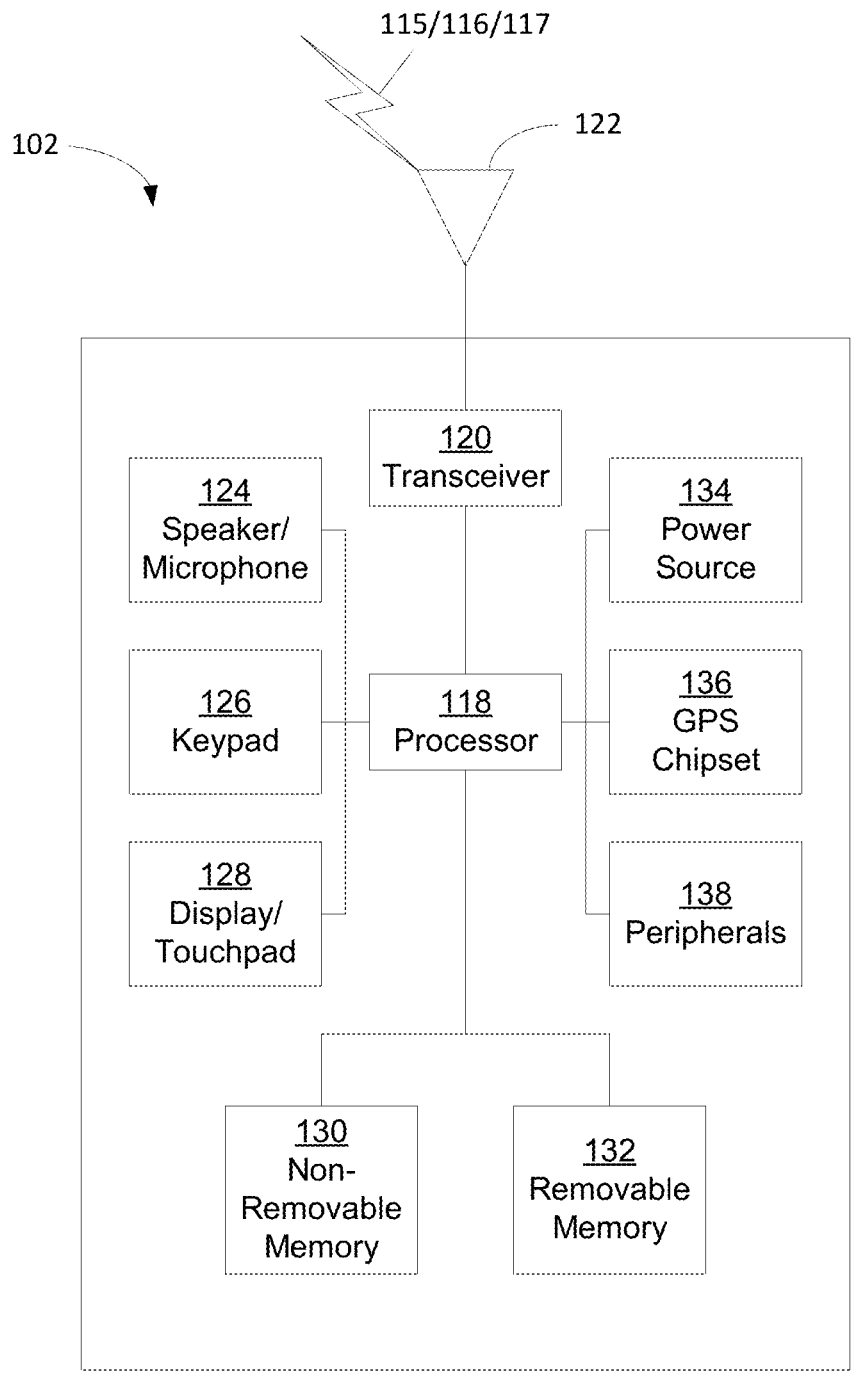
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
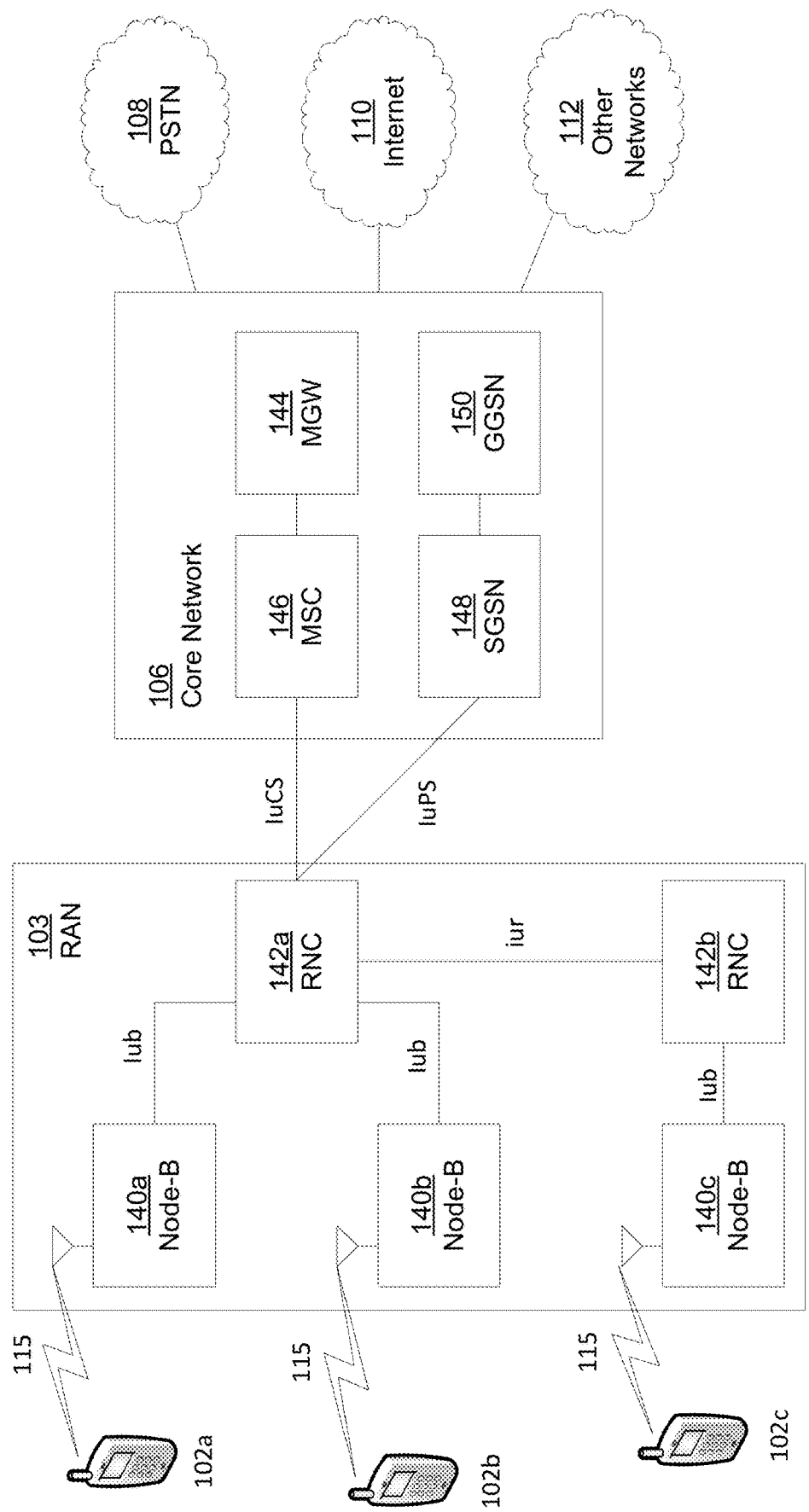
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
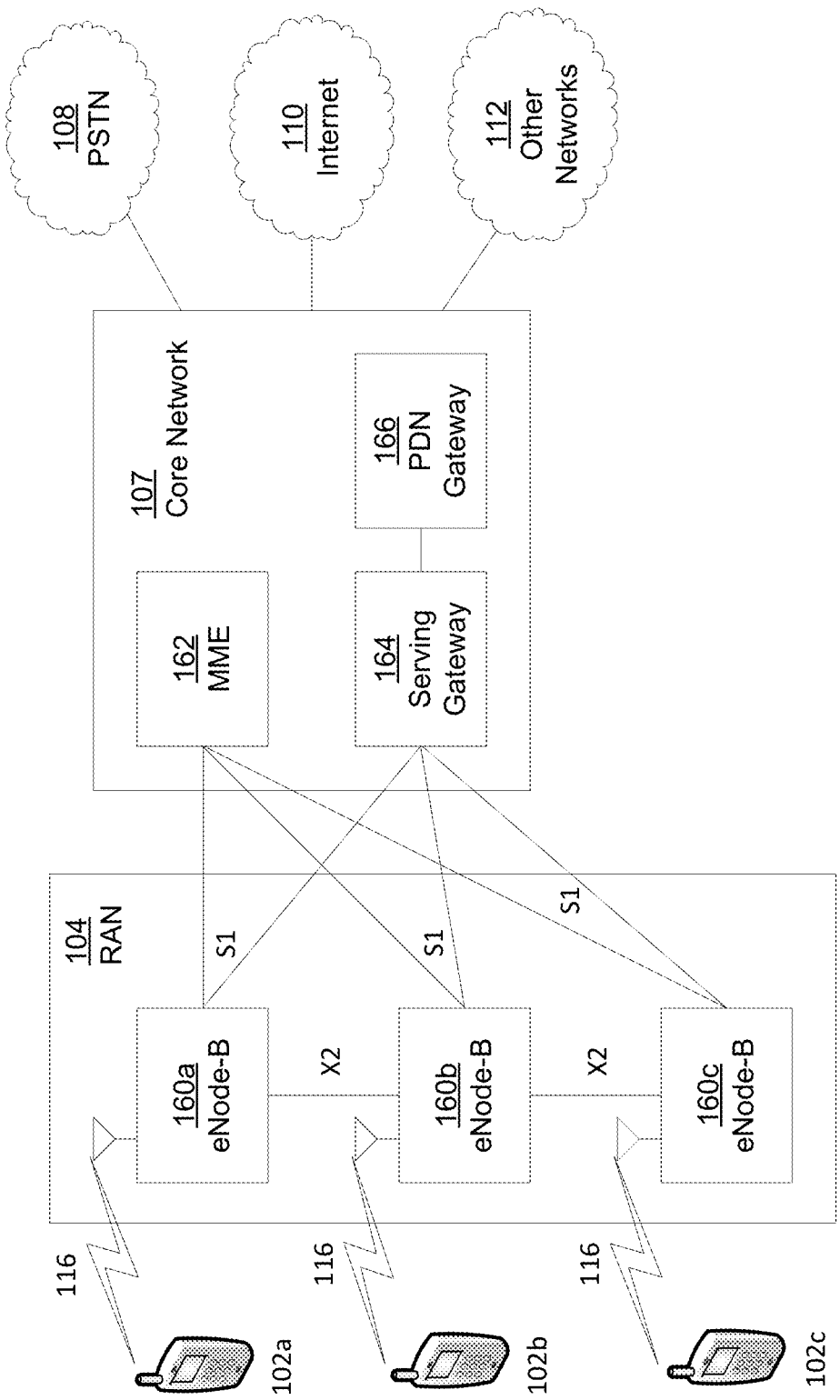
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Sl interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
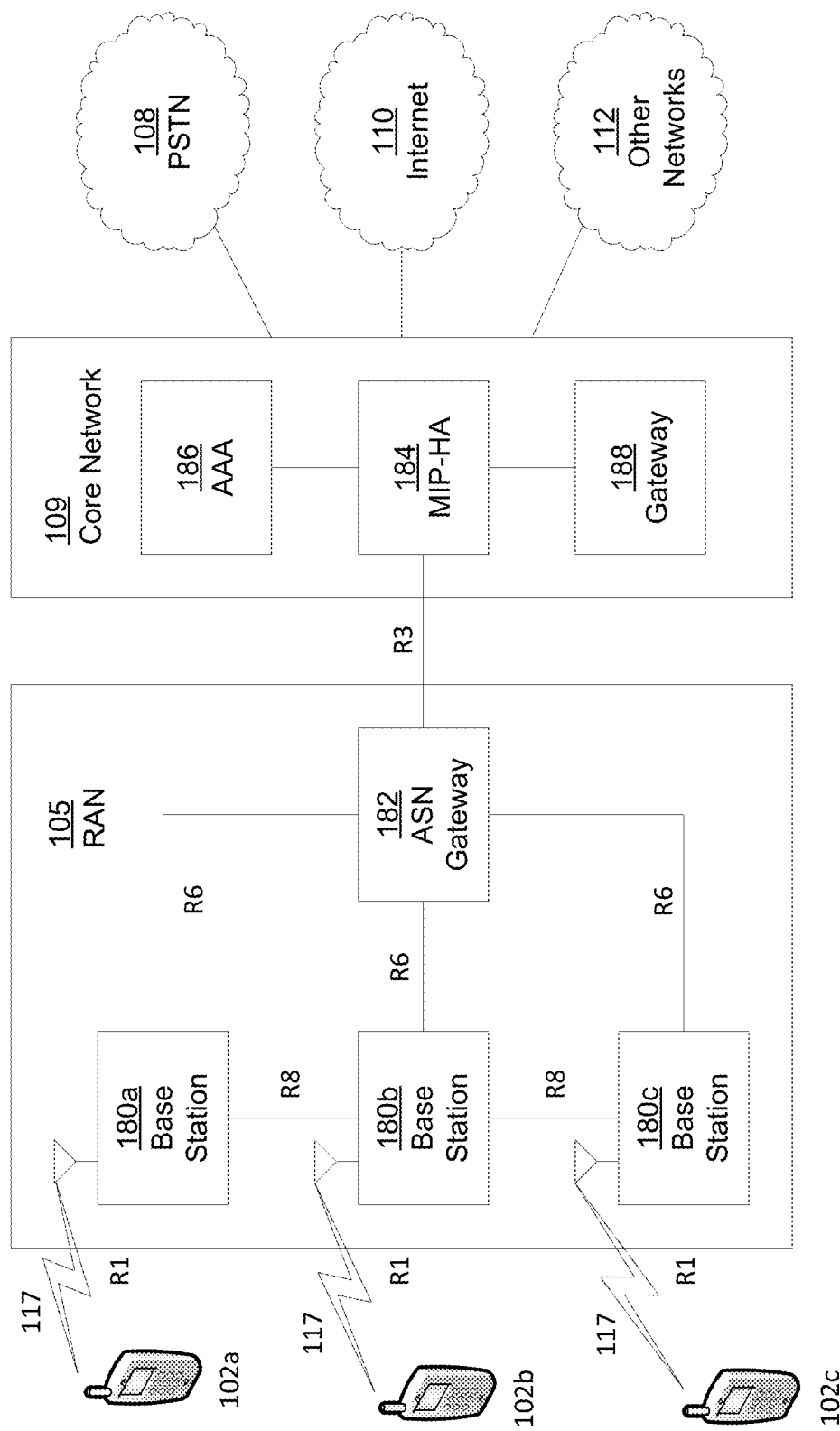
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Referring back to FIG. 1A to FIG. 1E, it will be appreciated that communications system 100 may include synchronization signals (SS) (not shown) broadcast by base stations 114*a* and base station 114*b* to WTRUs 102*a*, 102*b*, 102*c* and 102*d* over air interfaces 115, 116 and 117. The SSs may allow WTRUs 102*a*, 102*b*, 102*c*, 102*d* to determine time and frequency parameters that are used to demodulate the downlink and to transmit uplink signals with the correct timing as well as whether a target cell supports Frequency Division Duplex (FDD) or Time Division Duplex (TDD). These synchronization signals may be designated as Primary Synchronization Signal (PSS) and Secondary Synchronization Signal (SSS). Further, as shown in FIG. 1A to FIG. 1G, it will be appreciated that WTRUs 102*a*, 102*b*, 102*c*, 102*d* as well as WTRUs 102*e*, 102*f*, 102*g*, 102*h*, 102*i*, and 102*j* may support device-to-device (D2D) communications among two or more proximately located WTRUs in accordance with one or more embodiments. Accordingly, D2D Synchronization signals (D2DSS) may be broadcast among D2D enabled WTRUs which may be designated as a Primary D2D Synchronization Signal (P-D2DSS) and as a Secondary D2D Synchronization Signal (S-D2DSS).

Figure 1F:
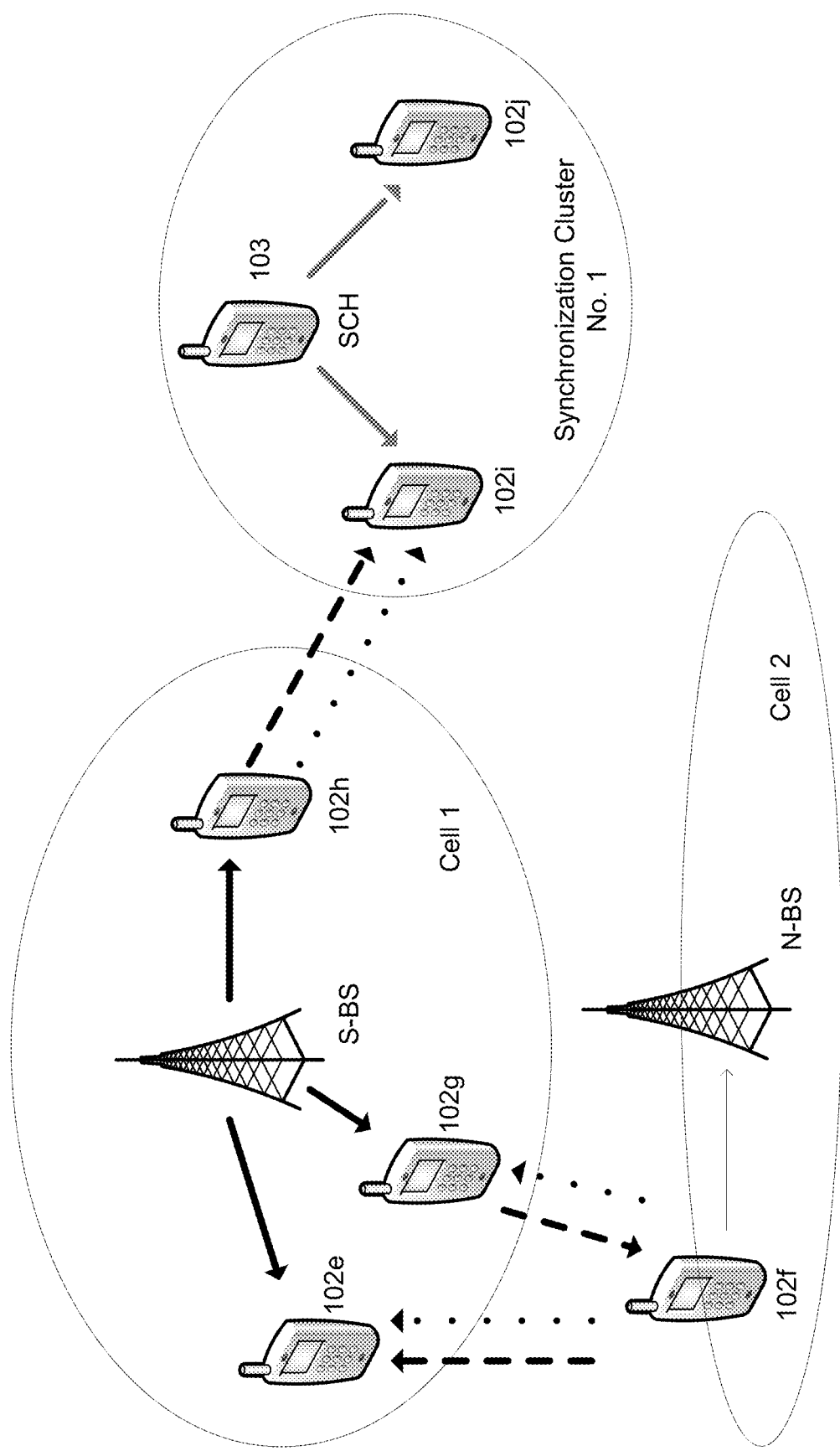
FIG. 1F is a system diagram of an example of device-to-device synchronization signals broadcasted by base stations (BSs) and distributed to various devices in the communication system shown in FIG. 1A.

FIG. 1F is a system diagram of an example of D2DSSs broadcast by base stations (BSs) and a synchronization cluster head (SCH). BSs and/or SCHs that transmit a D2DSS may be referred to as a synchronization source (SS). D2DSSs may be relayed to synchronization cluster heads (SCHs) such as SCH 103 and/or WTRUs 102*e*, 102*f*, 102*g*, 102*h*, 102*i*, and 102*j* as described herein. A SCH may be a synchronization source other than a base station (e.g., eNB) that does not derive the transmitted synchronization from another synchronization source(s). A non-SCH WTRU that receives a D2DSS from an SCH and/or base station. The non-SCH WTRU may become a synchronization source by transmitting a D2DSS based on the synchronization derived from that SCH or base station. A WTRU may communicate D2DSSs using sidelink synchronization signals. The WTRU may use two sidelink synchronization signals to communicate D2DSSs. For example, the WTRU may use a primary sidelink synchronization signal and a secondary sidelink synchronization signal to communicate D2DSSs.

Figure 1G:
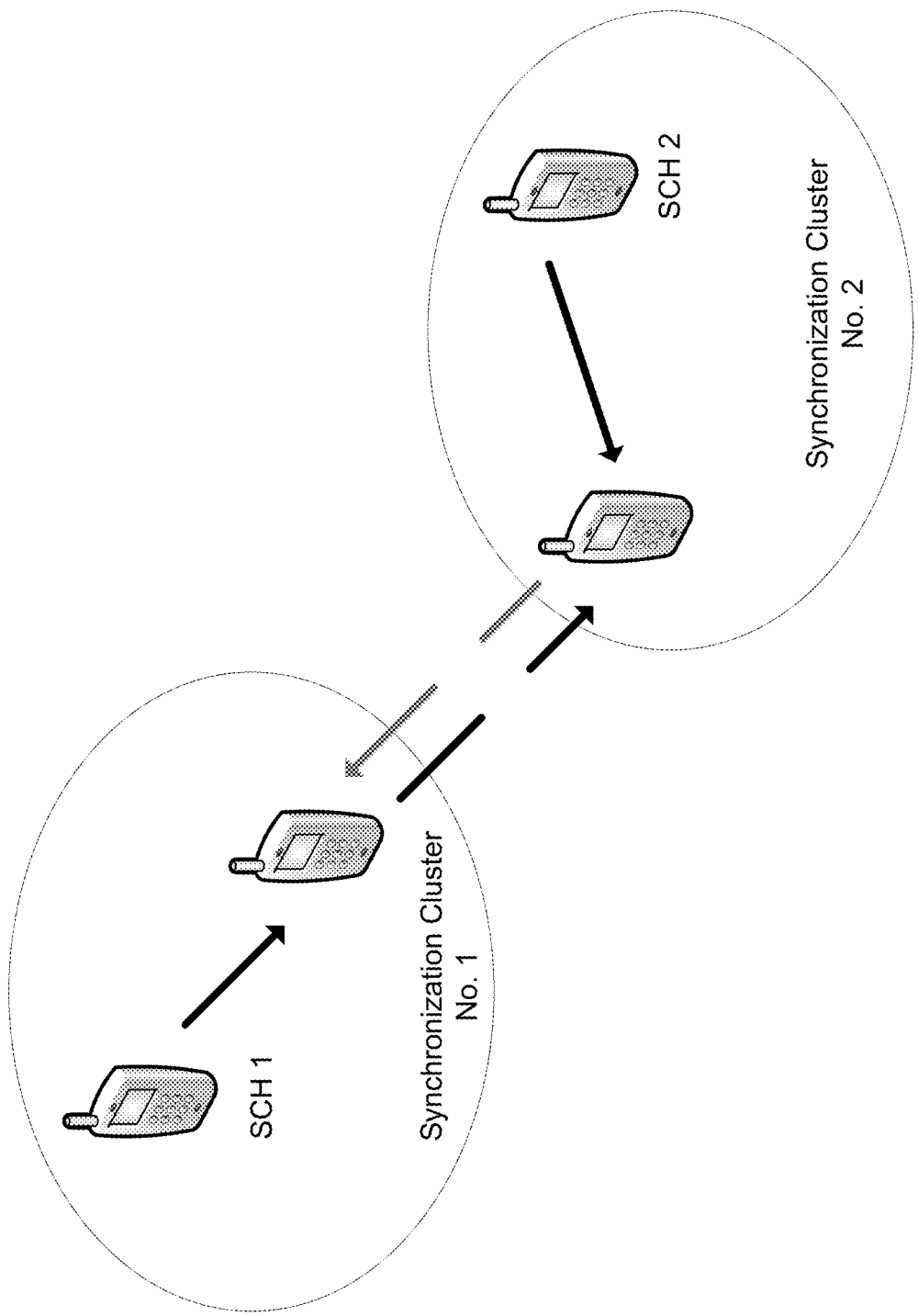
FIG. 1G is a system diagram of an example of propagation of synchronization cluster head (SCH) among two synchronization clusters (e.g., two-hop synchronization) within the communications system illustrated in FIG. 1A.

FIG. 1G is a system diagram that illustrates an example propagation of a SCH synchronization among two synchronization clusters (e.g., among synchronization zones 1 and 2). This example of a two-hop synchronization that may be performed by the communication system shown in FIG. 1A. Although FIG. 1G illustrates an example two-hop synchronization, a SCH synchronization may be propagated to more than two hops.

In particular, FIG. 1F illustrates an example of a distributed synchronization scheme where a serving base station (S-BS) may broadcast an indication of one or more pools of D2D resources to one or more WTRUs for discovery and communication within its own cell (e.g., cell 1), for reception and/or transmission. A receiver disposed in a WTRU may determine a time and/or frequency reference, for example, such that the receiver window and frequency correction may be aligned when detecting D2D channels and/or the transceiver timing and parameters may be aligned when transmitting D2D channels. As shown in FIG. 1F, example embodiments described below provide information to WTRUs that are exposed to D2D channels transmitted by neighbor WTRUs camping on different cells (e.g., N-BS in Cell No. 2), PLMNs (not shown) and clusters (e.g., SCH Synchronization Cluster No. 1). WTRUs camping on neighbor cells, PLMNs, and/or clusters may signal their own D2D resource pool along their synchronization reference, in order to allow detection of the D2D communication resources. This purpose is fulfilled by various synchronization protocol described below in accordance with one or more example embodiments. In other words, WTRUs may relay a synchronization reference and the D2D resource pool to be monitored by neighbor WTRUs. Additionally, example embodiments may allow the WTRU to perform direct transmission to re-transmit synchronization signals to other neighboring WTRUs in order to allow synchronization of potential receivers in the network (e.g., as well as outside the network coverage area).

A D2D enabled WTRU may perform various operations based on the state of the WTRU. Example states may include location of the WTRU in the network, whether a neighboring WTRU is in the vicinity of the WTRU, radio resource control (RRC) state, D2D configuration, and/or the like. For example, mode selection (e.g., scheduling mode selection) may be performed when the WTRU moves out of the coverage of a cell. The WTRU may, for example, start/stop relaying synchronization based on certain conditions. An example might be that the WTRU may select a synchronization source based on certain conditions or the WTRU may select a resource pool based on the same or other conditions. The WTRU may determine whether to transmit D2DSS, and/or relay a PD2DSCH message based on the same or other conditions. The WTRU may relay a PSBCH (Physical Sidelink Broadcast Channel) message that may include aMasterinformationBlock-SL message. In other words, a D2D enabled WTRU may determine a plurality of parameters to perform D2D communications based on detected radio link conditions. A D2D enabled WTRU may initiate procedures to evaluate or re-evaluate these parameters when there is a change in the WTRU state. For example, changes in the location of the WTRU in the network, changes in the identity of neighboring WTRUs in the vicinity, changes in RRC state, D2D configuration updates, and/or the like may trigger the WTRU to evaluate which scheduling mode to use and/or whether to relay synchronization signals. Non-limiting example scenarios are provided herein, which may describe operations and procedures that may be carried out by a D2D enabled WTRU.

A D2D enabled WTRU may determine the resources that the D2D enabled WTRU may use for D2D communications. The resources may depend on a scheduling mode that the WTRU is operating in. For example, the WTRU may operate in Mode 1. In Mode 1, the WTRU may dynamically request resources from a network entity (e.g., base station or eNB). In Mode 1, which may be referred to as a scheduled mode of operation, the eNB may schedule the resources that the WTRU may use for D2D transmissions. The WTRU may operate in Mode 2, which may be referred to as a WTRU-selected scheduling mode. In Mode 2 (e.g., WTRU selected mode), the WTRU may autonomously select D2D resources to use from a resource pool(s) that may be semi-statically signaled by the network or pre-configured in the WTRU. As described herein, the WTRU may determine whether to select Mode 1 or Mode 2 based on a network configuration and/or one or more conditions or triggers, for example, in response to detecting that a RRC timer is running or has been started. The WTRU may select a resource pool based on current conditions of the WTRU (e.g., RRC state, coverage state, channel conditions, etc.).

A D2D enabled WTRU may determine when to transmit (e.g., originate or forward) D2D synchronization signals (D2DSS) and/or D2D synchronization messages (PD2DSCH). The WTRU may determine when to transmit the D2DSS(s) and/or the D2D synchronization messages based on nearby nodes that a WTRU may detect, configuration parameters and/or other triggers described herein.

A D2D enabled WTRU may select a Master Synchronization Source (MSS). The MSS may be a base station (e.g., eNode B). The MSS may be another D2D enabled WTRU that may be suitable to use for reference timing in support of D2D operations. A D2D enabled WTRU may perform MSS selection or re-selection based on an update of WTRU conditions (e.g., detection of D2D neighbor nodes, and/or WTRU mobility).

A D2D enabled WTRU may determine the resource pool that the WTRU may use for D2D transmissions and receptions. For example, a WTRU may use resources provided by the network or pre-configured resources depending on its configuration and condition (e.g., when the WTRU is operating in Mode 1). A WTRU may (e.g., due to mobility or network reconfiguration) stop using pre-configured resources and obtain resources from the serving cell base station or eNB (e.g., when the WTRU transitions from Mode 2 to Mode 1). A D2D enabled WTRU may determine a change in network conditions and may perform resource pool selection/re-selection based on the changed network conditions.

A D2D enabled WTRU may determine a time pattern for reception and transmission of D2D communications and/or exchange the information with a second WTRU, for example, to ensure the pair of WTRUs can communicate with each other. An in-coverage D2D enabled WTRU may initiate a procedure to provide a time-domain transmission and/or reception pattern when the in-coverage D2D enabled WTRU detects an out-of-coverage WTRU in the vicinity of the in-coverage D2D enabled WTRU.

A WTRU may identify resources that the WTRU may monitor for discovery and communication. For example, a WTRU may monitor resources associated with a serving cell or cluster. A WTRU may monitor resources associated with neighboring cells, clusters or PLMNs. A WTRU may determine a coverage condition of the WTRU. For example, the WTRU may determine that the WTRU is in-coverage, at edge-of-coverage or out-of-coverage. In determining the coverage condition, a WTRU may utilize one or more trigger events (e.g., RRC timer(s), for example RLF timer(s)). The WTRU may determine the coverage condition by detecting one or more trigger updates associated with a coverage condition. The WTRU may detect a trigger update by detecting one or more trigger events.

A WTRU may select resources based on a coverage condition of the WTRU. A coverage condition (e.g., each coverage condition) may be associated with WTRU resources and the WTRU may select resources that are associated with the coverage condition of the WTRU. The WTRU may determine a mode of operation (e.g., scheduling mode for D2D communication), for example, based on one or more trigger events. Example trigger events may include detecting that a RRC timer (e.g., RLF timer) is running or has been started. The WTRU may determine the scheduling mode for D2D communication based on additional trigger events. The WTRU may select resource pool(s) for WTRU transmission (Tx) and/or reception (Rx). Resource pool selection may include configuration of resource pools and message content based upon various triggering events. The WTRU may select one or more resource pools that may have been forwarded to other WTRUs.

A WTRU may configure time domain D2D transmission and/or reception patterns, for example, based upon various triggering events. The WTRU may perform D2DSS transmission and/or D2DSS reception, for example, based on one or more D2D frame configurations. The WTRU may determine the content of a synchronization frame from a D2DSS and hop count. The WTRU may use rules to prioritize synchronization sources. The WTRU may use rules to prioritize data reception, for example, from different synchronization sources. A WTRU may transmit D2DSS. D2DSS transmissions may include configuration of pre-ambles and/or post-ambles. The WTRU may determine when to stop or change transmission of D2DSSs or messages. The WTRU may format Physical D2D synchronization (PD2DSCH), for example, to include content of a message, rules for determining the content, content of the D2DSS, and/or conditions for transmitting the PD2DSCH.

A WTRU may determine a coverage condition of the WTRU based on trigger events that may be associated with the coverage condition. For example, the WTRU may determine whether the WTRU is in-coverage, at edge-of-coverage, or out-of-coverage conditions, for example, by determining that a timer (e.g., RRC timer, for example, RLF timer) is running or has been started.

The WTRU may determine the coverage condition by determining one or more trigger updates of a WTRU coverage condition. The WTRU may determine a trigger update by detecting one or more trigger events associated with the trigger update. A WTRU may determine a coverage condition based on the WTRU's proximity to a cell that may transmit radio frequency signals. An example cell may include a LTE cell (e.g., a macro cell), a pico cell, a femto cell, or the like. For example, a WTRU may determine that the WTRU is in-coverage when the WTRU is located within a boundary of a cell. The WTRU may determine that the WTRU is not in-coverage when the WTRU is proximate to an edge of a cell. The WTRU may determine that the WTRU is at edge-of-coverage when the WTRU is located proximate to an edge of a cell. The WTRU may determine that the WTRU is out-of-coverage when the WTRU is neither in-coverage nor at edge-of-coverage.

The WTRU may be configured to initiate evaluation or re-evaluation of a plurality of D2D operation parameters, for example, when there is a change in the WTRU's coverage condition. For example, D2D operation parameters may include resource pool, mode of operation (e.g., D2D scheduling mode, D2D operation mode, for example, relay WTRU, remote WTRU, or normal WTRU), synchronization transmission, synchronization source selection, or the like.

A WTRU may detect a change in the coverage condition by detecting one or more event triggers. The WTRU may detect a trigger based on a measurement. For example, the WTRU may be configured to determine its coverage condition by measuring a signal received from one or more base stations (e.g., eNBs). A WTRU may be configured to determine that the WTRU is in-coverage or on the edge-of-coverage by comparing a measured Reference Signal Received Power (RSRP) value or Received Signal Strength Indication (RSSI) value of its associated cell (e.g., serving cell) to one or more threshold values stored in memory. A WTRU may determine that the WTRU is located in-coverage, for example, if a measured RSRP value or a measured RSSI value is above a preconfigured threshold. A measured RSRP or RSSI value being above a preconfigured threshold may indicate that the signal power is above a threshold. The WTRU may determine that the WTRU is in an out-of-coverage condition, for example, based on the absence of a RSSI or RSRP signal value.

A WTRU may determine that it is in-coverage, on the edge-of-coverage, or out-of-coverage by comparing the measured RSRP value of its associated cell (e.g., serving cell) to a measured RSRP value of one or more cells (e.g., neighboring cells). A WTRU may determine that it is located in-coverage or on the edge-of-coverage, for example, if it determines that the RSRP value of its associated cell exceeds RSRP measurements from other cells by a preconfigured value. A WTRU may determine that the WTRU is in-coverage or on the edge-of-coverage, for example, when the RSRP value of its associated cell is within a preconfigured range that is above a preconfigured range of RSRP measurements from other cells. The WTRU may determine that the WTRU is in an out-of-coverage condition, for example, based on the absence of a RSSI or RSRP signal value.

The WTRU may determine whether it is in-coverage or edge-of-coverage. The WTRU may determine its in-coverage or on-the-edge of coverage based upon the presence of hysteresis. The WTRU may determine it is in-coverage or on-the-edge of coverage based on time to trigger, measurements that the WTRU may make for a period of time, and/or the like. The WTRU may be configured to avoid an undesirable ping-pong effect. A WTRU that is on-the-edge of coverage may refer to a WTRU that is near an edge of a cell with which the WTRU is associated (e.g., edge of the serving cell).

A WTRU may be configured to determine a coverage condition of the WTRU based on event triggers (e.g., by detecting event triggers). The WTRU may determine it is in edge-of-coverage when event A3 is triggered with a positive or negative value of Cell Range Extension (CRE) bias (e.g., offset value). The WTRU may determine it is in edge-of-coverage by comparing the measured RSRP or Reference Signal Received Quality (RSRQ) value of its associated cell with a neighboring cell. For example, a WTRU may determine that the WTRU is in edge-of-coverage when a difference between the RSRP/RSRQ values of the serving cells and the neighboring cell is equal or less than the configured CRE bias.

A WTRU may be configured to determine a coverage condition by detecting event triggers that may be based on D2D resource (grant) request failures. The WTRU may determine it is on the edge-of-coverage of a cell when the number of Random Access Channel (RACH) failures reaches a preconfigured threshold. An in-coverage WTRU may initiate RACH to send a Scheduling Request (SR) and/or Buffer Status Report (BSR) to request resources for D2D transmissions. The WTRU may determine it is in an edge-of-coverage condition, for example, if the number of RACH attempts exceeds a pre-configured threshold. A WTRU may be configured to determine it is in edge-of-coverage condition, for example, if the number of SRs exceeds a preconfigured threshold. The WTRU may be configured to determine it is in edge-of-coverage condition when a WTRU does not receive a grant for a configured time duration since sending a first SR that may have triggered D2D transmissions. The WTRU may determine it is in edge-of-coverage, for example, when the WTRU does not receive a grant for a preconfigured duration after sending a BSR for D2D resources. The WTRU may determine it is in edge-of-coverage, for example, if a retxBSR-Timer expires after transmission of BSR for D2D communications. The WTRU may determine it is in edge-of-coverage after a predefined number of retransmissions of the initial BSR. An edge-of-coverage WTRU may be configured to attempt (e.g., periodically attempt) uplink communication.

A WTRU may determine a coverage condition of the WTRU by detecting event triggers that may be based upon HARQ A/N feedback. A WTRU may determine it is in an edge-of-coverage condition, for example, if the HYBRID Automatic Repeat Request (HARQ) negative feedback to uplink transmissions is above, below, or equal to a configured threshold. For example, an in-coverage WTRU may be configured to determine it is in edge-of-coverage when the number of NACKs received in a certain window (e.g., time period) reaches or exceeds a configured threshold.

A WTRU may determine a coverage condition of the WTRU by detecting event triggers that may be based upon RLF conditions. The WTRU may determine it is in edge-of-coverage, for example, if one or more of the specified triggers cause the WTRU to detect Radio Link Failure (RLF) conditions. For example, the WTRU may determine it is in edge-of-coverage condition when a RRC timer is started, for example, when timer T310 or T312 are started or expire. The WTRU may be configured to determine it is in edge-of-coverage based on a preconfigured number of consecutive out-of-synch or being in out-of-synch (e.g., N TTIs). The WTRU may determine it is in edge-of-coverage, for example, if the Radio Resource Control (RRC) re-establishment procedure is triggered or initiated. The WTRU may determine it is in edge-of-coverage if a re-establishment timer (e.g., RRC timer) is started, for example, if timer T311 is started or T301 is started.

A WTRU may start a timer (e.g., RRC timer, for example, RLF timer), such as timer 311 or timer 301, when a RRC re-establishment procedure is triggered or initiated. A WTRU may determine it is in edge-of-coverage, for example, if a command to re-establish RRC is transmitted. A WTRU may determine it is in-coverage, for example, if the RRC re-establishment procedure is successful. A WTRU may determine it is in an edge-of-coverage condition when the number of Radio Link Control (RLC) retransmissions becomes equal or exceeds a preconfigured threshold value. A WTRU may determine it is in an edge-of-coverage condition when the number of Radio Link Control (RLC) retransmissions is within a preconfigured range of values.

A WTRU may determine a coverage condition of the WTRU by detecting event triggers based upon cell suitability criteria. A WTRU may determine it is in out-of-coverage condition when it cannot find a cell that fulfills one or more predetermined suitability criteria. A WTRU may determine a cell is suitable, for example, if the cell advertises support for D2D communication. An edge-of-coverage WTRU may determine it is in an out-of-coverage condition when the WTRU cannot decode the serving cell System Information Block (SIB), for example, within a predetermined time window. For example, the WTRU may determine a coverage condition of the WTRU upon detecting a transition into RRC_IDLE.Any-Cell-S_election.

A WTRU may determine a coverage condition of the WTRU by detecting event triggers that may be based upon D2D synchronization signal/channel. The WTRU may determine it is in an out-of-coverage condition by detecting one or more neighboring WTRUs that may be able to relay D2D resource pool information. A WTRU may determine it is in out-of-coverage state upon entering a Camped_on_D2DUE state. A Camped_on_D2DUE state may indicate that the D2D enabled WTRU is able to successfully decode a control message carrying D2D configuration information from a neighboring WTRU.

An in-coverage WTRU may be configured to initiate transmission of synchronization signals and/or messages, for example, once the in-coverage WTRU detects D2DSS from a neighboring out-of-coverage WTRU.

Figure 5:
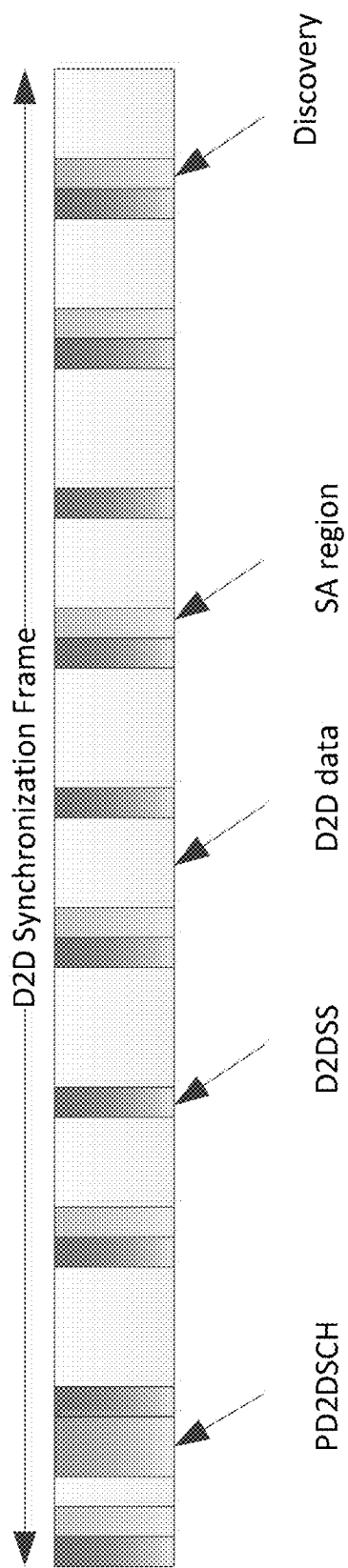
FIG. 5 is an illustration of a device-to-device time domain synchronization frame suitable for carrying out one or more example embodiments.
Figure 6:
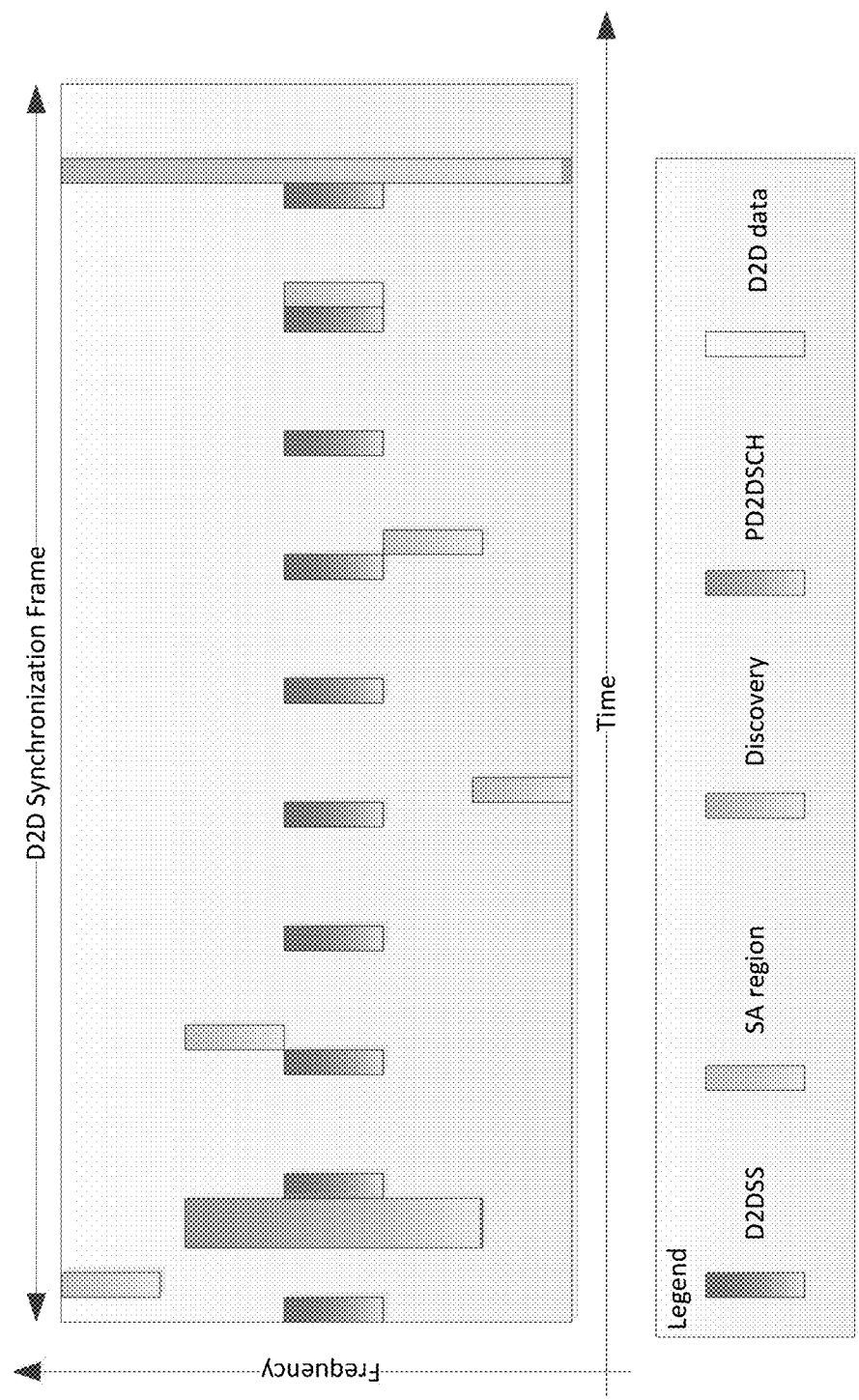
FIG. 6 is an illustration of a device-to-device time and frequency domain synchronization frame suitable for carrying out one or more example embodiments.
Figure 7:
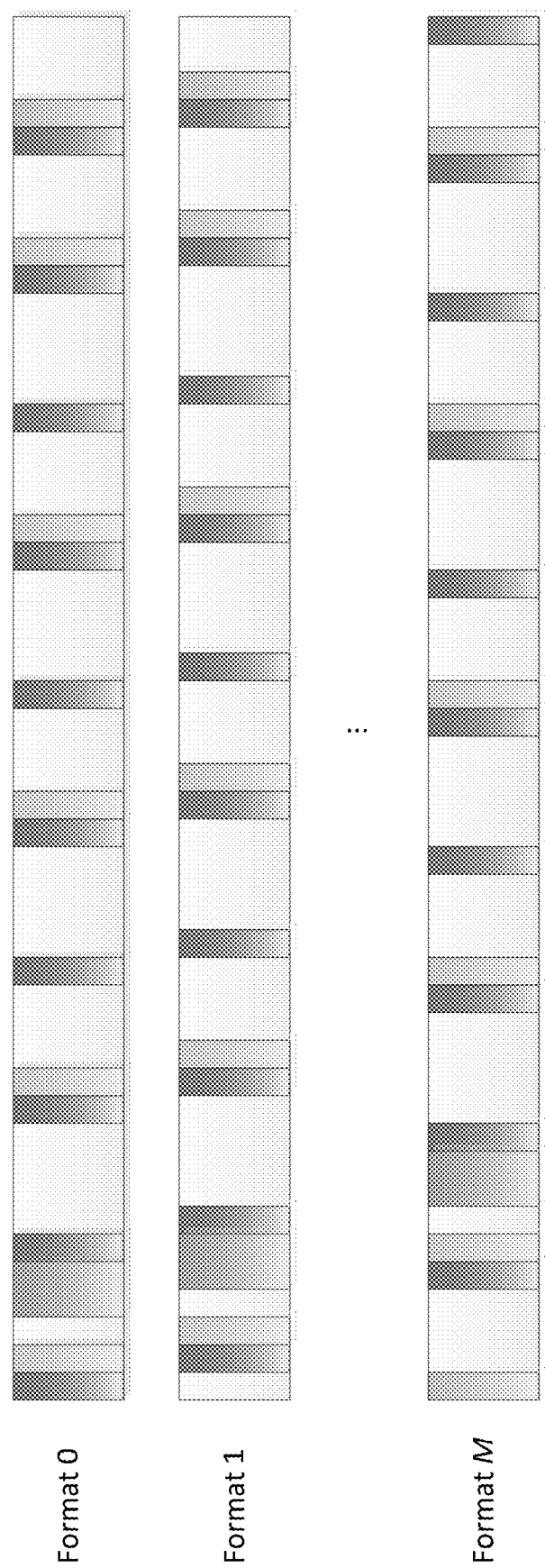
FIG. 7 is an illustration of a device-to-device time domain synchronization frame employing multiple frame formats suitable for carrying out one or more example embodiments.

A WTRU may evaluate and/or re-evaluate whether the WTRU becomes a synchronization source and/or relay. A WTRU may select and/or re-select a new synchronization source upon receiving D2D synchronization signals, for example, as shown in FIG. 5, FIG. 6 and FIG. 7. A WTRU may evaluate/re-evaluate its master synchronization source, for example, if the WTRU detects a new neighboring WTRU that is transmitting one or more alternate D2D synchronization signals with better signal strength.

A WTRU may determine its coverage condition by detecting event triggers that may be based upon a downlink channel condition. The WTRU may determine its coverage condition based on one or more detected downlink signal errors. The WTRU may detect an event trigger, for example, if the Down Link Block Error Rate (DL BLER) is less than, equal to or exceeds a configured threshold. The WTRU may determine that it is in an edge-of-coverage condition in response to the DL BLER being less than, equal to or exceeding a configured threshold.

A WTRU may determine its coverage condition by detecting event triggers that may be based upon a handover event. A WTRU may determine its coverage condition based on one or more mobility events. The WTRU may detect an event trigger, for example, if a mobility event is triggered (e.g. event A3), or if a (Radio Resource Control) RRCReconfiguration with mobilityControlInfo message is received, which may cause the WTRU to determine it is in edge-of-coverage condition. The WTRU may determine that the WTRU is in-coverage condition, for example, upon detecting an event trigger when an RRCReconfiguration-Complete message is successfully transmitted by the lower layers.

A WTRU may determine its coverage condition by detecting event triggers that may be based upon a periodic UL procedure. A WTRU may determine its coverage condition by periodically attempting to perform one or more uplink procedures to determine whether it can transition into in-coverage condition from another coverage condition. For example, the WTRU may periodically attempt to perform one or more uplink procedures. The WTRU may determine it is in in-coverage state, for example, if the uplink procedure succeeds.

A WTRU may determine its coverage condition based on its current state information. The WTRU may maintain state information based on its current position relative to a base station or an eNB(s) and/or other D2D enabled WTRUs. The WTRU may select a mode of operation and resource pool based on the state information. A WTRU may receive an explicit indication of its coverage state, for example, from the network. The WTRU may determine its coverage state implicitly.

A WTRU may determine its D2D coverage state. A D2D enabled WTRU may be configured to one of the following states, for example, based on its coverage conditions. The state information may be referred to as a D2D-CoverageState (D2D_CS). A D2D_CS may include a D2D_CS referred to as In-coverage. A WTRU may be in-coverage when it is in RRC_IDLE and camped on a suitable cell. The WTRU may be in-coverage when it is in RRC_CONNECTED mode, served with a cell that supports D2D services, and the WTRU determines that conditions for being in edge-of-coverage are not met.

A WTRU may determine that it is at the edge-of-coverage. A D2D_CS may include a D2D_CS sub-state referred to as Edge-of-coverage. A WTRU may be in the edge-of-coverage state when it has an unreliable link in the downlink and/or uplink unicast and/or is unable to exchange request/response communication with the base station or eNB. The WTRU may decode DL System Information from the base station or eNB, for example, since the DL system information may be relatively more robust than normal unicast communication. The WTRU may be in a RRC_IDLE or a RRC_CONNECTED state (e.g., while the WTRU is at the edge-of-coverage).

A WTRU may determine that it is out-of-coverage. A D2D_CS may include a D2D_CS substate referred to as Out-of-coverage. A WTRU may determine that it is in the out-of-coverage state when the WTRU is unable to find a serving cell that fulfills the cell suitability criteria. A WTRU may determine that it is in the out-of-coverage state when the WTRU is unable to find a serving cell that supports D2D services. If the WTRU is unable to find a suitable cell and is an Any Cell Selection state, the WTRU may determine that it is in the Out-of-Coverage state. A WTRU may be configured to search (e.g., periodically search) for suitable cells in configured PLMNs. A WTRU in Out-of-coverage may operate in an EMM-REGISTERED.NO-CELL-AVAILABLE or an EMM-DEREGISTERED.NO-CELL-AVAILABLE state.

A WTRU may be configured to determine a sub state. The D2D enabled WTRU out-of-coverage state may include two or more sub states. For example, a sub state of the Out-of-coverage state may be a Camped_on_D2D UE state. A WTRU may be in the Camped_on_D2D_UE state when the WTRU cannot locate a suitable cell, but the WTRU has successfully decoded D2D configuration information being transmitted by another WTRU that may be an in-coverage WTRU relaying/transmitting information from the network. A sub state of the out-of-coverage state may be a No_D2DSource state. A WTRU may be in the No_D2DSource state when it cannot find a suitable cell supporting D2D services and/or a neighboring WTRU that is transmitting D2D configuration information.

Figure 2:
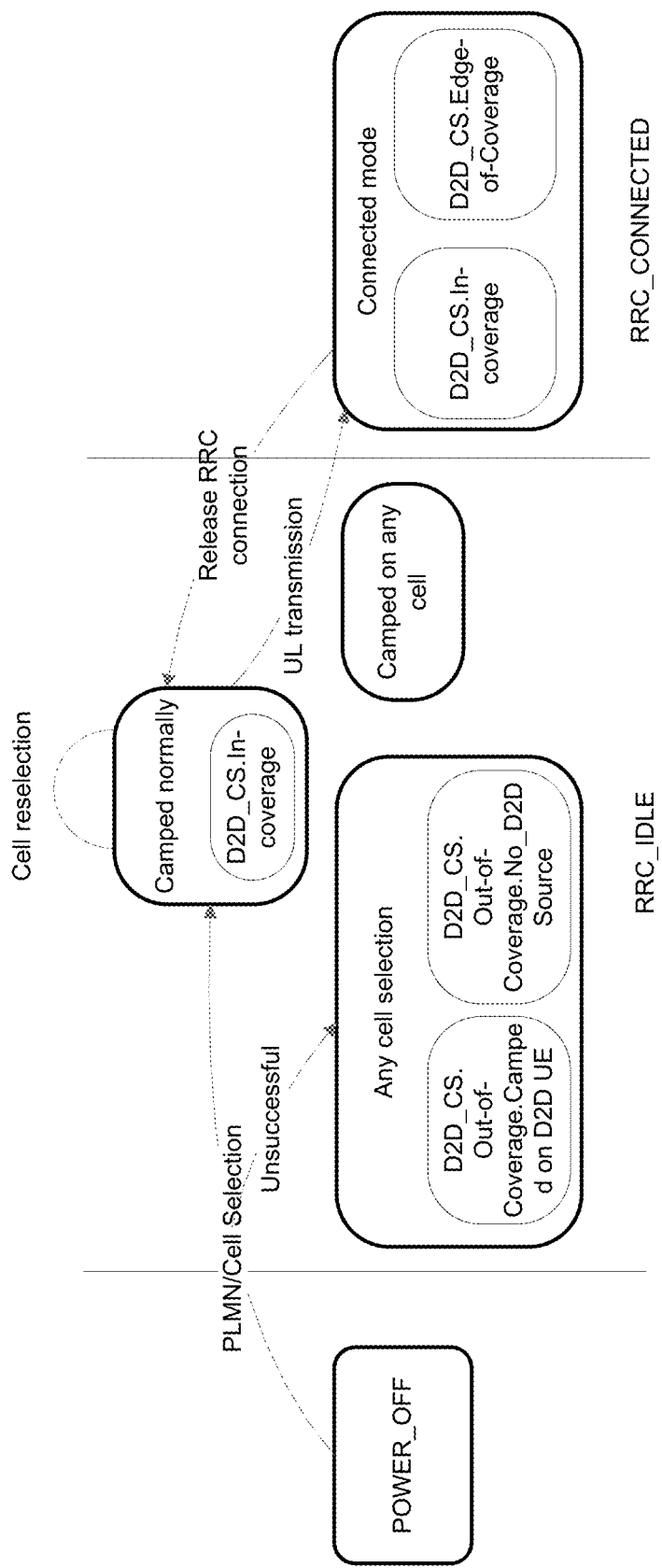
FIG. 2 is a state transition diagram of an example of one or more D2D_CS states configured to be sub-states of existing state machine in accordance with example embodiments.
Figure 4:
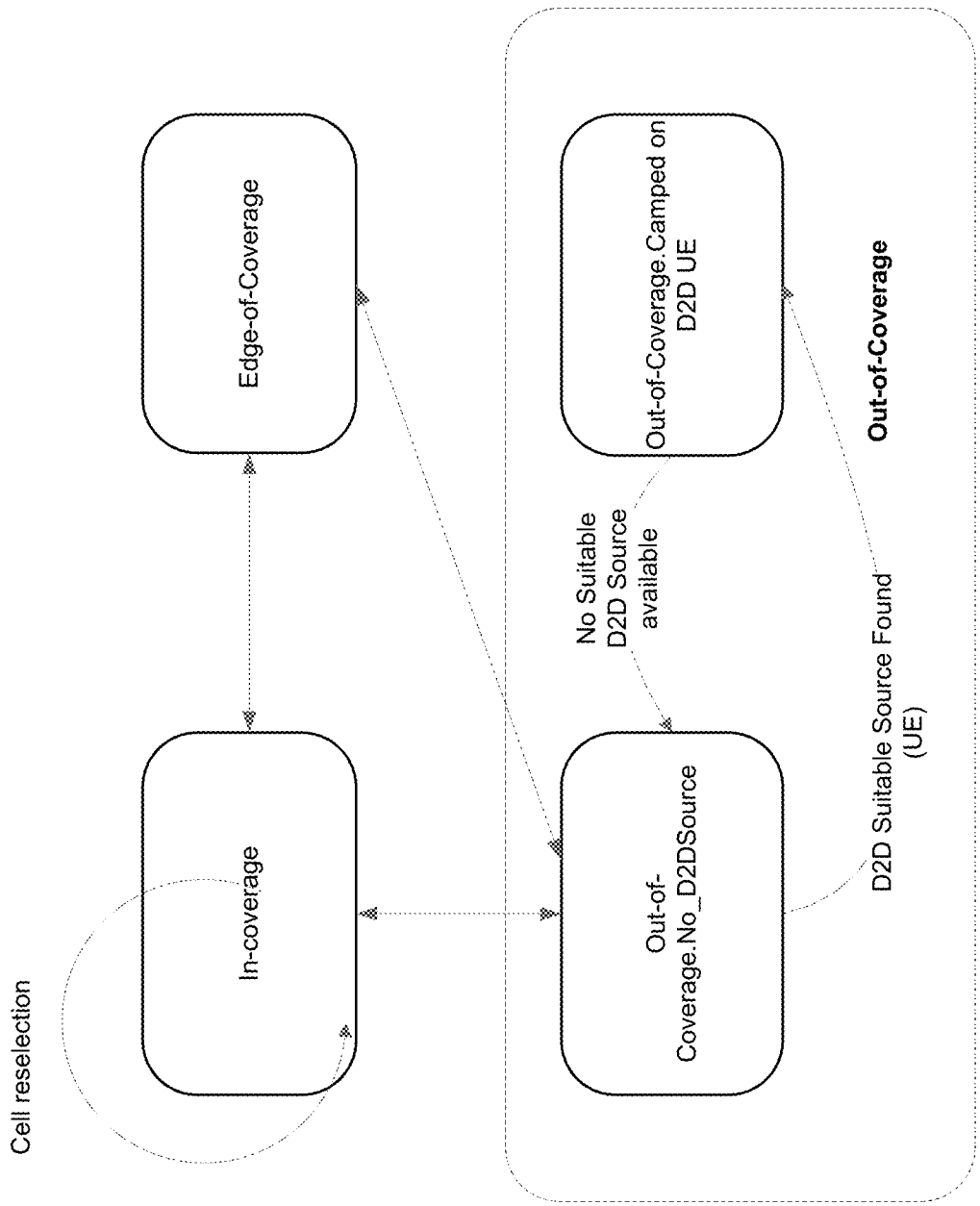
FIG. 4 is a state transition diagram of an example of one or more D2D_CS states configured to be considered as separate state variables or conditions, and used to determine action that may be performed with existing or newly defined procedures in accordance with example embodiments.

FIG. 2 is a state transition diagram illustrating an example embodiment where D2D_CS states may include sub-states, for example, of an existing state machine. As illustrated in FIG. 4, D2D_CS states may be considered as separate state variables or conditions. The WTRU may use D2D_CS states to determine action(s) that may be performed with existing or newly defined procedures. The WTRU may use D2D_CS states to determine one or more transmission modes that the WTRU may use when the separate state variables or conditions are met.

A WTRU may be configured to determine its coverage condition by detecting updates on a trigger event. The WTRU may be configured to determination its coverage state by detecting an independent trigger. A WTRU may trigger evaluation/re-evaluation of its coverage condition based on one or more trigger events described herein. For example, when a WTRU is in a certain state, the WTRU may monitor the conditions to determine the coverage state or the operation mode to use.

A WTRU may be configured to determine a coverage state based on a trigger by a base station or eNB command. A WTRU may trigger evaluation/re-evaluation of its coverage condition based on a command received from a base station or eNB. On RLF re-establishment success, a base station or eNB may send a command to an edge-of-coverage D2D enabled WTRU to transition back to an in-coverage state. A WTRU may implicitly determine that it is in an in-coverage state upon completion (e.g., successful completion) of a re-establishment procedure or upon performing an RRC connection setup. The WTRU may be configured to attempt to operate as an in-coverage state, for example, upon successful completion of the re-establishment procedure. Transition into in-coverage may trigger the WTRU to send an uplink message (e.g., a service or RRC request, dedicated RACH request, or a scheduling request). The WTRU may continue to operate as an in-coverage WTRU, for example, if the uplink procedure is successful. If the uplink procedure is unsuccessful, the WTRU may revert back to edge-of-coverage or out-of-coverage state.

A WTRU may be configured to perform one or more procedures upon a change in coverage states. For example, upon a change in coverage state, the WTRU may be configured to determine a mode of operation (e.g., scheduling mode for D2D communication) that the WTRU may use to obtain D2D resources (e.g., Mode 1 or Mode 2). For example, a WTRU may detect a change to edge-of-coverage and the WTRU may transition to Mode 2 transmission. For example, a WTRU may detect a change in the WTRU's coverage condition and the WTRU may assume the role of the Master Synchronization Source (MSS). Upon assuming the role of the MSS, the WTRU may start transmitting synchronization signals (e.g., D2DSS and/or synchronization message over PD2DSCH).

A WTRU may be configured to perform a resource selection procedure upon detecting a change in coverage states. A D2D enabled WTRU may perform a resource selection procedure to determine resources for D2D transmission and/or reception. The D2D enabled WTRU may determine the D2D resource to be a physical resource block (PRB) in time and frequency for D2D operations. A D2D enabled WTRU may be configured with one or more D2D resources, such as a D2D resource pool. A D2D enabled WTRU may select, based on a D2D resource selection, a pattern of transmission and reception opportunities from the resource pool in a defined duration. The pattern may include a D2D transmission pattern and/or a D2D reception pattern.

A WTRU may be configured to perform WTRU resource selection procedure upon entering an in-Coverage condition. A D2D enabled WTRU that transitions from a network out-of coverage zone or a network edge-of-coverage zone to a network in-coverage zone may be configured to transmit a report. The report may include a request to perform D2D communications and/or a change of state. The D2D enabled WTRU may identify network coverage or conditions by way of trigger events described herein.

A D2D enabled WTRU that transitions from a network out-of coverage zone or a network edge-of-coverage zone to a network in-coverage zone, or a D2D enabled WTRU upon a handover to a new cell may stop transmitting in existing resources N from a previous mode of operation (e.g., previous D2D scheduling mode) or cell. For example, a WTRU that switches from Mode 1 to Mode 2 may stop transmitting in existing resources from Mode 1. The WTRU may determine a network configuration for D2D communication mode for D2D devices within the cell (e.g., by reading one or more System Information Blocks (SIBs) or using the existing configuration of the cell in the D2D enabled WTRU). The WTRU may connect (e.g., register) with the network. The D2D enabled WTRU may request resources for D2D transmission, for example, after connecting with the network. The WTRU may connect with the network if the WTRU is configured for Mode 1. The WTRU may connect with the network if no configuration available. The WTRU may connect with the network, for example, if the cell indicates that the cell is D2D capable. The WTRU may stop using Mode 2 transmission resources that the WTRU may have used when in the network out-of coverage zone or the network edge-of-coverage zone.

A D2D enabled WTRU that transitions from a network out-of coverage zone or a network edge-of-coverage zone to a network in-coverage zone may identify a resource M, a resource pattern, and/or an allowed transmission pattern for in-coverage transmission, for example, based on one or more of the following. The WTRU may use a predetermined mapping between N and M signaled on the SIBs. The WTRU may use a configured or received transmission resource pool (e.g., from the SIB of an eNB if available, or via RRC signaling). The WTRU may continue to use a previous transmission pool, for example, if there is an explicit indication by the network to continue the existing configuration. The WTRU may use an explicit indication received from the network (e.g., via RRC signaling or via Media Access Control (MAC) control element (CE) or via the Physical Downlink Control Channel (PDCCH) using a special Downlink Control Information (DCI)). The WTRU may use a configured transmission resource pool or transmission opportunity pattern from an eNB.

A D2D enabled WTRU that transitions from a network out-of coverage zone or a network edge-of-coverage zone to a network in-coverage zone may identify new resources for in-coverage reception, time pattern, and/or allowed reception opportunities, for example, based on at least one of the following. The WTRU may identify resources using an explicit receive resource pool received from the network (e.g. via RRC signaling, via MAC CE, or via the PDCCH using a special DCI). The WTRU may identify resources using the preconfigured resource pool for reception, and/or a predetermined mapping based on a provided configuration (e.g., calculated time pattern based on a WTRU specific identifier). A D2D enabled WTRU which transitions from a network out-of coverage zone or a network edge-of-coverage zone to a network in-coverage zone may send a report to an eNB indicating a result of the resource selection process based on the procedures described herein.

A WTRU may perform resource selection procedures upon entering an Edge-Coverage state. A WTRU which transitions from a network in coverage zone to a network edge-of-coverage zone may be configured to identify network coverage, for example, by detecting trigger events as described herein. The WTRU may stop transmitting in existing resources N or stop transmitting when a grant expires (e.g., at the end of a scheduling period). The WTRU may read System Information Block (SIB) and determine network configuration for D2D communication mode. The WTRU may select Mode 2, for example, if the WTRU is configured for or allowed to operate with Mode 2, or if no configuration is available.

A WTRU which transitions from a network in coverage zone to a network edge-of-coverage zone may identify new resource M for edge-of-coverage transmission, for example, based on at least one or more of the following. The WTRU may identify a new resource based on a predetermined mapping between N and M signaled on the SIBs. The WTRU may identify a new resource based on a resource configuration from the SIB. The WTRU may identify a new resource based on the preconfigured resource pool for transmission. The WTRU may identify a new resource based on a time pattern (e.g., transmission pool) to be used for transmission. The WTRU may determine the time pattern from the SIB, a preconfigured pattern and/or a predetermined mapping based on configuration provided (e.g., calculated time pattern based on WTRU specific identifier). A WTRU which transitions from a network in-coverage zone to a network edge-of-coverage zone may identify new resources for edge-of-coverage reception, for example, based on at least one or more of the following. The WTRU may identify a new resource based on resource configuration from the SIB. The WTRU may identify a new resource based on the preconfigured resource pool for reception. The WTRU may identify a new resource based on a time pattern to be used for transmission. The WTRU may select the time pattern from timing pattern derived from the SIB, a preconfigured pattern, and/or a predetermined mapping based on configuration provided (e.g., calculated time pattern based on WTRU specific identifier).

A WTRU which transitions from a network in coverage zone to a network edge-of-coverage zone may initiate UL messages, for example, to determine change in current state (e.g., to determine if the WTRU may move back to in-coverage mode). Initiating UL messages may include reading a SIB to determine periodic message configuration (e.g., RACH configuration, periodic BSR configuration, timeout window duration, gap between successive attempts or the like). Initiating UL messages may include performing periodic transmissions to the network with the configured configuration.

A WTRU may be configured to perform resource selection procedures upon entering the Out-Of-Coverage state. A WTRU which transitions from a network in coverage zone to a network edge-of-coverage zone may identify network coverage as described herein. The WTRU may stop transmitting in existing resources N or using existing scheduling mode and determine a new set of resources to use and a new scheduling mode. The WTRU may listen for a neighboring eNB, and check for suitability. The suitability check may include checking whether the cell supports D2D services. In the event that no suitable cell is found, the WTRU may listen for any neighboring D2D synchronization signals. The WTRU may evaluate suitability of D2DSS based on one or more D2D WTRU suitability criteria. The suitability criteria may include a source id priority (e.g., if source ids are prioritized), hop count, and/or the like. A WTRU which transitions from a network in coverage zone to a network edge-of-coverage zone may initiate performing a Mode 2 transmission procedure(s). The WTRU may identify new resource M for out-of-coverage or edge-of-coverage transmission, for example, based on at least one of the following. The WTRU may identify a new resource based on a predetermined configuration for scheduling assignments and D2D transmissions. For example, the WTRU may receive the configuration by reading SIBs. The WTRU may identify a new resource based on the time pattern to be used for transmission a predetermined mapping based on configuration provided (for example, calculated time pattern based on WTRU specific identifier). The WTRU may identify a new resource based on a preconfigured pattern (e.g., pre-configured resources), for example, if provided. The WTRU may identify new resources for in-coverage reception, for example, based on at least one of the following: the pre-configured resource pool for reception, a Time pattern to be used for reception, a predetermined mapping based on configuration provided (for example, calculated Time pattern based on WTRU specific identifier), and/or a preconfigured pattern.

A WTRU may initiate UL messages to determine a change in current state. The WTRU may initiate UL messages by reading a SIB to determine periodic message configuration (e.g., RACH configuration periodic BSR configuration, timeout window duration, gap between successive attempts or the like) and attempting periodic transmission to the network with the configured configuration.

A WTRU may be configured to select a type of power control mode upon change in coverage. A WTRU may be configured with one or more power control modes to operate with D2D communications.

A WTRU may be configured with a closed-loop power control mode. For example, a node (e.g., eNB, cluster head, or controlling node, etc.) may control WTRU transmission power for D2D communications and/or discovery. The WTRU may select a power control mode that may be based in part on a closed loop approach. For example, a WTRU may receive power control signal indications from a node (e.g., eNB, cluster head, or controlling node, etc.) with power control commands. The WTRU may receive a power control signal, for example, as part of a D2D communications grant control signal (e.g., via a PDCCH, ePDCCH, and/or other control signal), and/or the like.

A WTRU may be configured with an open-loop power control (e.g., to a reference node). A WTRU may determine its power based on one or more measurements such as RSRP from a node (e.g., reference node, controlling node, an eNB, a D2D WTRU, a synchronization source, a cluster head, etc.). For example, a WTRU may estimate the path loss to the node, for example, based on a measurement and a node transmit power value which may be pre-configured or determined based on control signaling such as the SIBs in the case of an eNB. A WTRU may adjust power to reach a minimum or maximum received power at the node. The WTRU may be configured with a power control mode based on parameters (e.g., on the USIM). A node (e.g., eNB, a D2D WTRU, a synchronization source, a cluster head, etc.) may configure the parameters for power control, for example, via RRC signaling or on the SIBs.

A WTRU may be configured with a fixed power control mode. A WTRU may be configured with a fixed transmission power. The WTRU may be configured with transmission power parameters, for example, from the USIM or via RRC/SIBs. Transmission power parameters may be fixed. For example, a WTRU may be configured with a plurality of fixed transmission power parameters, such as with individual values associated with a configured range of operation of the D2D service. A WTRU may select a value in the plurality of transmission power values, for example, based on configured range. A discovery service may be configured with a range of operation (e.g., short, medium, long). A WTRU may select a transmission power for transmitting, for example, a D2D discovery payload based on a range of operation. A WTRU may obtain a range of operation and/or a D2D discovery payload as an indication from higher layers.

A WTRU may be configured to perform actions related to power control when changing coverage state. The WTRU may be configured to determine the D2D power control mode, for example, based on the D2D WTRU coverage situation.

Communication between a WTRU and an eNB may be applicable to communications between a WTRU and a node, such as a resource node, a controlling node, a cluster head, a synchronization source, a D2D WTRU, etc. Communications between a WTRU and a node, such as a resource node, a controlling node, a cluster head, a synchronization source, a D2D WTRU, etc. may be applicable to communication between a WTRU and an eNB.

A WTRU may be configured to change its power control mode to fixed power control mode, such as when moving out-of-coverage. A WTRU may be configured to change its power control mode autonomously (e.g., when it detects that it is outside network coverage or outside coverage of a node and/or reference node). For example, a WTRU may be configured to autonomously change its power control mode to fixed power control when moving to out-of-coverage. A WTRU may be configured to determine the power control parameters from a configuration. A WTRU may be configured to maintain parameters that were configured by the network. A WTRU may use configuration parameters forwarded from an in-coverage D2D WTRU, such as provided by a node (e.g., eNB, controlling node, reference node, cluster head, a D2D WTRU, a synchronization source, etc.) associated with an in-coverage WTRU.

Figure 3:
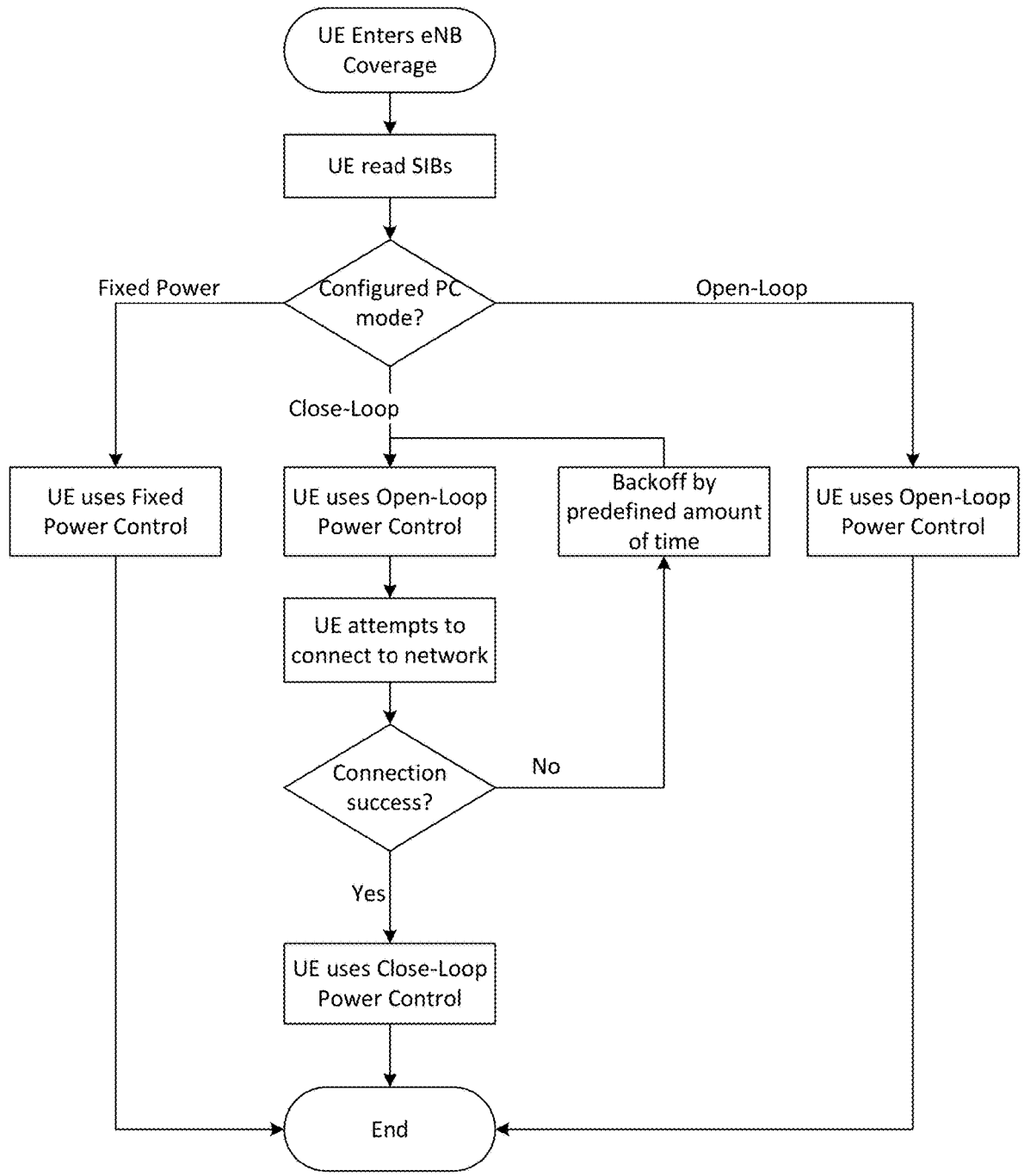
FIG. 3 is a system diagram of an example of a WTRU determining power control mode based on SIBs when moving into edge-of-coverage or in-coverage.

FIG. 3 may depict a system diagram of an example of a WTRU determining power control mode based on SIBs when moving into edge-of-coverage or in-coverage. A WTRU may be configured to determine power control mode based on SIBs when moving into edge-of-coverage and/or in-coverage. A WTRU may be configured to change its power control mode autonomously when it detects that it is moving within coverage of a node (e.g., eNB, controlling node, reference node, cluster head, a D2D WTRU, a synchronization source, etc.). For example, a WTRU may be configured to change its power control mode to an open-loop power control mode (e.g., reference node power control mode) with the closest eNB and/or the serving eNB as a reference node. A WTRU may use the power control parameters received from the SIBs from an eNB or from the broadcast control of a node.

A WTRU may determine the power control mode to use when moving within coverage of a node (e.g., eNB, controlling node, reference node, cluster head, a D2D WTRU, a synchronization source, etc.) by reading a configuration on the SIBs. A WTRU may receive an indication on the SIB to use fixed power control with associated parameters, such as power parameters for SA transmission, D2D data and/or discovery transmission power, and/or the like.

A WTRU may be configured via the SIBs, for example, to use close-loop power control. A WTRU may be configured to attempt to connect to a node (e.g., eNB, controlling node, reference node, cluster head, a D2D WTRU, a synchronization source, etc.), for example, when using close-loop power control. A WTRU may be configured to use open-loop power control with parameters configured on the SIBs, for example, in a case of connection failure or during the time a WTRU is attempting connection, and/or the like.

A WTRU may be configured via the SIBs to use open-loop power control, for example, with parameters signaled on the SIBs.

A WTRU may be configured to determine a power control mode based on a configuration from the network, for example, when in-coverage. A WTRU may be configured to connect to the network. A WTRU may be configured to receive a power control configuration, for example, via dedicated RRC signaling, such as when the WTRU moves within network coverage. A WTRU may be configured to use fixed power control, for example, during the time a WTRU is not connected. A WTRU may be configured to use parameters signaled on the SIBs, for example, during the time the WTRU is not connected.

A WTRU may be configured to determine a power control mode based on D2D mode of operation (e.g., D2D scheduling mode, for example Mode 1 or Mode 2). For example, a WTRU may evaluate and/or select the power control mode that may be used when a WTRU changes D2D mode of operation. A WTRU may move from closed loop power control to open loop power control and/or fixed power control, for example, when a WTRU switches from Mode 1 to Mode 2 (e.g., when RRC connection is released). A WTRU may use a parameter(s) signaled on the SIBs, for example, when a WTRU switches from Mode 1 to Mode 2 (e.g., when RRC connection is released).

A WTRU may be configured to determine power control mode based on transition of role. A WTRU may evaluate and select a power control mode that may be used when the WTRU, for example, starts operation as a synchronization source or cluster head or stops operating as an MSS or cluster head. For example, a WTRU may be operating in closed power control mode obtaining at least part of transmission power parameters from a reference node, such as when a WTRU is operating as a general WTRU obtaining synchronization from a reference node (e.g., synchronization source or cluster head). A WTRU may change the power control mode to fixed power control, for example, due to change in conditions, such as if a WTRU decides to start operating as a synchronization source. A WTRU may use parameters configured in a WTRU, for example, due to change in conditions, such as if a WTRU decides to start operating as a synchronization source.

A WTRU may be configured to select a mode of operation (e.g., scheduling mode for D2D communication). If the WTRU is in a RRC_CONNECTED state, the WTRU is performing D2D communications using Mode 1 scheduling (e.g., the eNB schedules the D2D transmission), and the WTRU detects connection issues, the WTRU may determine that a Radio Link Failure (RLF) condition has occurred based on existing triggers. The WTRU may attempt to recover the link (e.g., by attempting to perform re-establishment). However, there might be some delay while the WTRU is attempting to recover the link. For example, repeated out-of-sync indications in the downlink can trigger a RRC timer (e.g., RLF timer, for example, timer T310 or timer T312) which can have large values (e.g., up to 2s). The thresholds to detect uplink issues may include large values to avoid frequent ping-pongs, but these may lead to long delays when the WTRU is unable to communicate with the network, unable to obtain grants for D2D and/or unable to perform important D2D communications. In order to avoid such interruptions, D2D WTRUs may continue to operate during this time frame. The WTRU may be configured to determine issues (e.g., by detecting that T310 is running) and transition to Mode 2 resource selection.

The base station or eNB and WTRU may determine the change in conditions, and trigger the WTRU to change its procedure to obtain D2D resources. The WTRU may determine the change in conditions, and trigger the WTRU to change its procedure to obtain D2D resources (e.g., switch from Mode 1 to Mode 2).

A WTRU may evaluate/re-evaluate a D2D mode of operation based on triggers (e.g., conditions). The WTRU may be configured to select a scheduling mode based on independent triggers. The WTRU may trigger evaluation/re-evaluation of its mode of operation (e.g., Mode 1 or Mode 2) based on one or more trigger events (e.g., conditions) described herein. The WTRU may use Mode 2 resources when the WTRU detects (e.g., determines) that it is in an out-of-coverage state. The WTRU may determine that it is in an out-of-coverage state when the WTRU is unable to find a cell that fulfills the cell suitability criteria and/or when the WTRU is unable to detect a cell. For example, the WTRU may, upon being unable to decode a serving cell SIB within a predetermined time window, use Mode 2 resources. When the WTRU transitions into RRC_IDLE.Any-Cell-Selection, the WTRU may use Mode 2 resources. When the WTRU determines a change in coverage state based on start or expiration of a RRC timer (e.g., timer T300), the WTRU may use Mode 2 resources. When the WTRU determines that a re-establishment procedure has been initiated (e.g., when RRC timer starts or expires, for example, when T311 or T301 starts or expires), the WTRU may use Mode 2 resources. If a RRC connection request procedure fails, the WTRU may use Mode 2 resources.

The WTRU may be configured to perform a mode selection/switching procedure based on an attempt/fallback method. If D2D resources are used, the WTRU may attempt using the mode configured by the base station or eNB. If the WTRU does not succeed to obtain resources within a configured duration, the WTRU may fallback to semi-static or preconfigured resource pool, using Mode 2.

A WTRU camped (e.g., RRC_IDLE or RRC_CONNECTED) on a suitable serving cell may be configured to initiate D2D resource selection by using Mode 1. When new D2D data arrives, the WTRU may initiate a request to obtain resources from the base station or eNB. If the procedure is unsuccessful, the WTRU may attempt to use Mode 2 with the resource pool configured using broadcast signaling. If no resources are available in broadcast signaling or no resources are configured (e.g., explicitly) for Mode 2 operation, the WTRU may not perform a D2D operation. If no resources are signaled or the WTRU is unable to decode a SIB, it may transition to Mode 2, with a pre-configured resource pool.

A WTRU may be configured to establish an RRC Connection and may request resources for D2D operation. The WTRU may be configured to establish an RRC Connection by receiving a signal from an eNB over the SIB D2D configuration. When D2D data (e.g., new D2D data) arrives, a WTRU in RRC_IDLE mode may initiate a RRC Connection establishment procedure. If the RRC Connection establishment procedure does not succeed, the WTRU may attempt to use configured Mode 2 resources. The WTRU may use the configured Mode 2 resources in specified conditions, such as one or more of the following conditions.

The WTRU may be configured to operate in Mode 2 and use Mode 2 resources when a timer is running or expires, for example, when T300 is running or expires (e.g., upon transmission of a RRCConnectionRequest). The WTRU may use Mode 2 resources upon reception of RRC Connection Reject. The WTRU may use Mode 2 resources when T302 (e.g., TBarring) is running (e.g., upon reception of RRCConnectionReject while performing RRC connection establishment). The WTRU may use Mode 2 resources when T303 or T305 is running (e.g., upon access being barred while performing RRC connection establishment for mobile originating calls or signaling). The WTRU may use Mode 2 resources, for example, if the WTRU is configured to inform higher layers about the failure to establish the RRC connection. The WTRU may use Mode 2 resources when an access barring check in RRC determines the cell as barred, and/or after a timer (e.g., a new timer) expires. The timer may have been initiated at the initiation of a RRC connection request. The timer may start when the RRC connection request is initiated. The timer may stop when a RRC connection setup is received. Upon reception of a RRC connection setup or upon reception of an indication from higher layers to stop transmission, the WTRU may use Mode 1 operation or a configuration that the network provides.

For example, a WTRU may send a BSR to request a grant for D2D transmissions. A WTRU may attempt to use Mode 2, for example, if the WTRU does not receive a response from an eNB within a time. A timer may start, for example, when a BSR is triggered and/or sent. The WTRU may be triggered to transition to Mode 2, for example, by the expiry of a timer. The WTRU may be triggered to transition to Mode 2 by the expiry of a timer, such as retxBSR-Timer. The WTRU may initiate Mode 2, for example, after a number of retransmissions of the D2D BSR.

A WTRU may send a SR to request a grant, for example, as a result of a D2D BSR triggered. A WTRU may transition to use Mode 2, for example, if the WTRU did not receive a PUSCH resource to transmit BSR. A WTRU may transition to use Mode 2, for example, if the D2D BSR for a defined duration does not include an assembled MAC PDU. A timer may be started when a D2D BSR is triggered and/or an SR is transmitted. The expiry of the timer may trigger a WTRU to transition to Mode 2. For example, a WTRU may transition to Mode 2 if the WTRU re-transmits the SR more than a configured amount of times. The WTRU may be triggered to transition to Mode 2 transmission by the expiry of the sr-ProhibitTimer. For example, a WTRU using Mode 2 transmission may be configured to attempt (e.g., periodically attempt) uplink communication. A WTRU may be configured to periodically attempt UL communication, such as if it remains in connected mode and/or if the network has configured it for Mode 1 transmission. A WTRU may re-attempt communication (e.g., periodically and/or if a BSR is triggered). The WTRU may wait for a period of time before attempting communication.

A WTRU may be configured to perform a mode selection/switching procedure based on a resource grant duration expiry. The WTRU may detect a resource grant de-activation, for example, if mode selection/switching procedure is not triggered by resource grant duration expiry. A WTRU may be configured with information on selecting mode, for example, if D2D resources are used. A WTRU may be configured with information on a resource pool, for example, when D2D resources may be invalid and/or may become invalid. For example, a WTRU may be configured with D2D resources that may be valid for a duration (e.g., a time duration during which resources may be considered valid). A WTRU may be configured to perform mode switching, for example, when a duration expires. A duration may be configured, for example, in terms of time, number of frames, number of sub-frames, as a resource time pattern, etc. A WTRU may be configured to switch mode, for example, from Mode 1 to Mode 2, such as when Mode 1 resources are de-activated by a network.

A WTRU may switch from Mode 1 to Mode 2 based the absence of a response to a BSR transmission. For example, the WTRU may send a BSR to request a grant for D2D transmissions. The WTRU may attempt to use Mode 2, for example, if the WTRU does not receive a response from an eNB within a time. A timer may start when a BSR is sent. A WTRU may be configured to transition from Mode 1 to Mode 2 upon expiry of an existing timer retxBSR-Timer.

A WTRU may be configured to perform a mode selection/switching procedure based on RRC state transition. If D2D resources are used, the WTRU may be configured with rules on selecting mode and resource pool based on RRC state. The WTRU may be configured to operate in Mode 2 when it is in RRC_IDLE mode. The WTRU may be configured with a rule to take precedence over a base station or eNB defined mode.

A WTRU may be configured to perform a mode selection/switching procedure based on a change in D2D Coverage-State. The WTRU may be configured with rules on selecting mode and resource pool based on the current D2DCoverage-State. The WTRU may detect the change in state based on one or more trigger events as described herein.

When the WTRU determines itself to be in-coverage state, it may be configured to obtain resource pool and mode configuration for D2D transmission. The WTRU may receive resource pool and mode configuration information by signaled configuration that may be received from the base station or eNB. A WTRU operating in edge-of-coverage may be configured to obtain resource allocation from the network, and perform autonomous resource selection for D2D transmissions. A WTRU operating in out-of-coverage state (e.g., No_D2DSource_Available) may use pre-configured resource allocation and may perform autonomous resource selection. A WTRU operating in Out-of-Coverage. Camped_on_another_UE may obtain resource pool for control message from one or more neighboring WTRUs and perform autonomous resource selection from control configuration.

A WTRU may be configured to perform mode selection/switching based on one or more base station or eNB commands. A base station or eNB may send a Mode Selection command with the Mode to be used for WTRUs in the cell using dedicated or broadcast signaling. The base station or eNB may send a Mode Selection command with the Mode along with one or more resources to be used for WTRUs in the cell using dedicated or broadcast signaling. The base station or eNB may send the Mode Selection command as an RRC message, a layer 2 message, and/or a layer 1 message (e.g., PDCCH). The WTRU may request resources from the network in Mode 1. The network may send a layer 1 message that may indicate to the WTRU to transition to Mode 2. The network may indicate (e.g., explicitly indicate) to the WTRU whether to attempt Mode 1 operation or Mode 2 operation. When the WTRU is configured for Mode 1 operation, one or more conditions described herein may trigger the WTRU to transition to Mode 2 operation.

When an in-coverage WTRU is triggered to perform D2D communications, the WTRU may send a request to the base station or eNB to request one or more resources, and the base station or eNB may respond with the mode that the WTRU may use to operate (e.g., Mode 1 or Mode 2).

A WTRU may receive rules to perform mode selection for D2D communication. For example, the base station or eNB may signal the rules using broadcast signaling, indicating the mode that may be used for all WTRUs in the cell.

A WTRU may be configured to perform mode selection/switching based on an UL success. For example, a WTRU operating in Mode 2 may be configured to evaluate/re-evaluate resource selection mode when RACH is successful. The WTRU operating in Mode 2 may be configured to evaluate/re-evaluate resource selection mode when UL grant is received within a configured duration after a scheduling grant is sent.

A WTRU may be configured to perform mode selection/switching based on time alignment timer (TAT) expiry. For example, a WTRU operating in Mode 1 may be configured to evaluate/re-evaluate mode when the WTRU loses timing with the network. The WTRU may be configured to transition to Mode 2, for example, when the WTRU is triggered by the expiry of TAT (e.g., timeAlignmentTimer).

A WTRU may be configured to perform other procedures after selecting a scheduling mode for D2D communication. A WTRU in Mode 2 may select pre-configured resource pool, or resources configured by the base station or eNB.

A change in a WTRU mode selection may trigger the WTRU to send an indication to a node, for example, so that the network may release resources. For example, a WTRU may send an indication to an eNB, such as when a WTRU moves from Mode 1 to Mode 2. The indication to the eNB may include a pattern that the WTRU may use when it begins Mode 2 operations. A WTRU configured with active Mode 1 (e.g., semi-static) resources may not use and/or need resources at a point (e.g., if no data remains to be transmitted). A WTRU may autonomously release and/or deactivate resources (e.g., Mode 1 resources), for example, when configured for Mode 2. A WTRU may send an indication to the eNB that the WTRU has released the resources. A WTRU may wait for an indication by the network to release resources. The eNB may release resources and/or provide an indication to the WTRU to release and/or deactivate resources, such as upon indication from the WTRU that the resources are no longer occupied and/or needed. The indication may allow the eNB to perform management of resources.

The WTRU may be configured to release the Mode 1 resources by releasing a grant and/or not performing D2D transmissions (e.g., if the WTRU has no data to transmit but may have an active grant). For example, a WTRU may cause an MAC CE to indicate to a network that it has released Mode 1 resources. A WTRU may use the buffer status report with buffer size low (e.g., set to zero) to indicate that the WTRU may not use resources and/or has released the grant. In some examples, a WTRU may send an indication when it releases a resource (e.g., after implicitReleaseAfter number of consecutive MAC PDUs each containing zero MAC SDUs are provided for D2D data traffic), such as for a semi-persistent resource allocation.

A WTRU may be configured with one to more procedures to change the scheduling mode for D2D communication. As discussed herein, a WTRU may be configured by an eNB to use Mode 1 resources (e.g., using RRC signaling) and may begin to use Mode 2 resources in response to one or more conditions described herein. The one or more conditions may include resource configuration, authorized application types, authorized usage area, index ID, control and/or data usage. The one or more conditions may include activation/deactivation triggers, time window, triggers based on measurements and/or triggers based on cell range extension. The one or more conditions may include D2D resource grant request failures, HARQ A/N feedback. The one or more conditions may include triggers based on RLF conditions. The WTRU may be configured to detect a RLF condition by detecting that a timer (e.g., RRC timer, timer 310, timer 311, and/or timer 301) is running or has been started. The one or more conditions may include cell suitability criteria, D2D synchronization signal/channel, downlink channel condition, handover events, and/or triggers periodic uplink procedure. The WTRU may be configured to use and/or request Mode 1 resources unless a failure condition is detected.

A WTRU in connected mode may be configured with procedures for changing scheduling modes for D2D communication. One or more triggers may indicate to start performing Mode 2 operations and/or may indicate to consider the WTRU in a failure condition (e.g., radio link failure (RLF) condition, for example when a RRC timer (e.g., RLF timer, for example, T310, T311 or T301) is running or has been started).

A RRC_CONNECTED WTRU may be configured to detect a failure condition (e.g., a RLF condition, for example, by detecting that a RRC timer is running). When a RRC_CONNECTED WTRU has D2D data to transmit and is configured to request for Mode 1 resources, the RRC CONNECTED WTRU may detect a failure condition if it is unable to obtain Mode 1 resources due to one or more conditions or triggers discussed herein. For example, a RRC_CONNECTED WTRU may detect a failure condition (e.g., a condition to switch from Mode 1 to Mode 2) when one or more of the following conditions are met. A RRC_CONNECTED WTRU may detect a condition upon failure to receive a grant after a predetermined duration after a D2D BSR is sent. A RRC_CONNECTED WTRU may detect a condition upon failure to receive a grant after a predetermined duration after a D2D SR is sent. A RRC_CONNECTED WTRU may detect a condition when one or more RLF triggers are met (e.g., RACH failure, RLC retransmission failures, etc.). A RRC_CONNECTED WTRU may detect a condition upon T310 running (e.g., detecting N out-of-synch TTIs) or expired. A RRC_CONNECTED WTRU may detect a condition when T311 is running (e.g., detecting that a RRC connection re-establishment procedure has been initiated). A RRC_CONNECTED WTRU may detect a condition when T301 is running (e.g., detecting that a request to re-establish a RRC connection has been transmitted).

When a WTRU detects a failure condition (e.g., a condition to switch from Mode 1 to Mode 2), the WTRU may begin Mode 2 operation. A WTRU may detect a failure condition and may begin Mode 2 operation for example, if while the WTRU has UL D2D data to transmit, a RRC re-establishment procedure is initiated (e.g., a RRC timer is running, for example, T311 or T301 is running).

A WTRU in Mode 2 operation may continue using Mode 2 until one or more of the following conditions occurs: the WTRU has data to transmit, the WTRU receives a RRC re-establishment message from a network and completes a re-establishment, the WTRU receives a RRC re-establishment message, T301 stops, the WTRU transitions to an idle mode (e.g., when a RRC timer stops or expires, for example, when T311 or T301 stops or expires, or a RRC connection reject occurs), and/or a timer expires and the WTRU attempts (e.g., re-attempts) access to a network or attempts (e.g., re-attempts) a grant request.

A WTRU may be configured to stop operating in Mode 2 upon successful re-establishment. Upon successful reception of the re-establishment message, the WTRU may stop using Mode 2 operation and may stop D2D data transmission until an explicit configuration is received from the serving eNB. The RRC re-establishment message may include D2D configuration information. The WTRU may continue D2D data transmission according to the D2D configuration information included in the RRC re-establishment message.

A WTRU may use Mode 2 resource until a successful RRC re-establishment. Upon successful reception of the re-establishment message, the WTRU may continue Mode 2 operation until the WTRU has successfully completed the RRC re-establishment (e.g., a RRC re-establishment complete message has been transmitted). Upon completion of the re-establishment procedure, the WTRU may start operating using the configuration provided in the re-establishment procedure. If the re-establishment procedure cannot provide a D2D configuration (e.g., a new D2D configuration) upon completion of the re-establishment procedure, the WTRU may stop performing D2D data transmission until an explicit configuration is received in a RRC configuration message (e.g., if the cell indicates that the WTRU needs to request Mode 1 operation). Upon completion of the re-establishment procedure, the WTRU may continue using Mode 2 until a RRC reconfiguration message provides the WTRU with a D2D configuration to use.

A WTRU may be configured to transition to idle mode upon an unsuccessful re-establishment. If the re-establishment procedure is unsuccessful and the WTRU transitions to idle mode, the WTRU may perform one or more of the following. If the re-establishment procedure is unsuccessful and the WTRU transitions to idle mode, the WTRU may continue performing Mode 2 operation (e.g., if data is still available) and may notify one or more higher layers of the unsuccessful re-establishment (e.g., the failure). If the re-establishment procedure is unsuccessful and the WTRU transitions to idle mode, the WTRU may notify one or more higher layers that D2D data transmission is continuing. The one or more higher layers may trigger a service request (e.g., a new service request) and a RRC connection establishment procedure (e.g., a new RRC connection establishment procedure) which D2D data is being transmitted using Mode 2. If the re-establishment procedure is unsuccessful and the WTRU transitions to idle mode, the WTRU may stop D2D data transmissions, may stop operating in Mode 2, and may notify one or more higher layers of the unsuccessful re-establishment (e.g., the failure). The one or more higher layers may initiate (e.g., immediately initiate) a RRC connection request to request service for D2D applications. If the re-establishment procedure is unsuccessful and the WTRU transitions to idle mode, the WTRU may perform one or more of the WTRU procedures for idle mode described herein.

A WTRU may be configured to detect a failure condition in idle mode. When a WTRU is in idle mode, the WTRU may trigger Mode 2 operation and/or the WTRU may detect a failure condition. When the RRC_IDLE WTRU has D2D data to transmit and is configured to request Mode 1 resources, the WTRU may initiate a RRC connection request to request D2D services and configuration. The WTRU may be unable to successfully perform the RRC connection and may be unable to perform D2D data transmissions. The WTRU may detect a failure condition (e.g., a condition to switch from Mode 1 to Mode 2) when one or more of the following conditions are met. The WTRU may detect a condition when T300 expires (e.g., request to establish a RRC connection was unsuccessful). The WTRU may detect a condition upon reception of a RRC Connection Reject or RRC Connection Release, or when T302 or Tbarring is running (e.g., a_RRCConnectionReject message is received while performing RRC connection establishment). The WTRU may detect a condition when access barring check in RRC determines the cell as barred. The WTRU may detect a condition when T303 or T305 is running (e.g., access barred while performing RRC connection establishment for mobile originating calls/signaling). The WTRU may detect a condition if the WTRU has to inform one or more higher layers about the failure to establish a RRC connection. The WTRU may detect a condition after a timer, initiated at the initiation of a RRC connection request, expires. The timer may start when the RRC connection request initiates. The timer may stop when a RRC connection setup message is received.

A WTRU may select from Mode 2 resources identified by the network. When a WTRU is in idle mode, the WTRU may start using Mode 2 using broadcasted Mode 2 resources. The WTRU may start using Mode 2 operation upon detection of one or more failure conditions described herein. The network may broadcast a set of Mode 2 D2D resources that WTRUs in failure conditions may utilize in idle mode. For example, the set of Mode 2 D2D resources may be reserved for the use of WTRU in failure conditions (e.g., WTRUs not experiencing failure conditions may not be allowed to use these resources). The network may broadcast an indication that the WTRUs, under normal conditions, use Mode 1 (e.g., attempt connection to the network).

When a WTRU is in idle mode, the WTRU may start using pre-configured Mode 2 resources. For example, the network may not broadcast Mode 2 resources (e.g., if the network commands all idle mode WTRUs to perform Mode 1 access). When the WTRU is in idle mode, the WTRU may initiate D2D data transmission using a preconfigured set of resources in order to transmit (e.g., not stop) higher priority D2D data transmission (e.g., D2D emergency data services, for example, Public Safety services). When performing D2D data transmission using the preconfigured set of resources, the WTRU may be configured to re-tune back to the network's resources to monitor and ensure proper reception of paging messages.

When a WTRU is in idle mode, the WTRU may re-attempt RRC connection request access according to a RRC retry timer (e.g., a new RRC retry timer). For example, a timer (e.g., a D2D exceptional state timer) may be defined by the network or the WTRU to retry connection and/or request to the network, for example, to request for D2D resources from the network. The timer may start when one or more of the triggers described herein are met. When the timer is started, the WTRU may start using configured Mode 2 resources (e.g., Mode 2 resources configured for use during exceptional scenarios). Upon expiry of the timer, the RRC may be configured to re-attempt sending a request in the uplink to establish connection (e.g., RRC_IDLE) or to request a grant (e.g., RRC_CONNECTED). The RRC may be configured to start the timer and continue to re-attempt connection to the network for a pre-configured number of times (e.g., max attempts) before signaling a failure to one or more higher layers.

When a WTRU is in idle mode, the WTRU may interact with higher layers upon RRC connection establishment failure. When a WTRU is in RRC_IDLE mode and fails to establish connection to the network (e.g., the WTRU detects a failure according to any of the conditions specified herein), the WTRU may be configured to indicate a failure to one or more higher layers (e.g., NAS or ProSe client) and may begin performing D2D data transmission using Mode 2 resources. The WTRU may notify the one or more higher layers (e.g., NAS or ProSe client) that the WTRU is configured to perform D2D data transmission using Mode 2, even though the one or more higher layers may not have received a service request response. The one or more higher layers (e.g., NAS or ProSe client) may re-attempt connection based on existing mechanisms (e.g., while allowing the application to continue transmitting). The WTRU may be configured to continue using Mode 2 resources until Mode 1 resources become available (e.g., until RRC connection establishment succeeds with a cell supporting D2D communications).

When a WTRU is in idle mode and the WTRU interacts with one or more higher layers upon RRC connection establishment failure, the WTRU may continue Mode 2 transmissions of D2D data until one or more of the following conditions are met. The WTRU may continue Mode 2 transmissions of D2D data until the successful completion of a subsequent RRC connection request. Upon completion of the RRC connection, the WTRU may act according to a serving cell configuration or a provided dedicated configuration (e.g., Mode 1 or Mode 2). The WTRU may continue Mode 2 transmissions of D2D data until a RRC connection request message (e.g., a new RRC connection request message) is initiated. The WTRU may stop using Mode 2 and may stop performing D2D transmission until the procedure is successful or one or more of the failure conditions described herein is met. The WTRU may continue Mode 2 transmissions of D2D data until no D2D data has been transmitted for a predetermined period of time. One or more higher layers (e.g., the NAS or the application layer) may be notified that the WTRU has stopped Mode 2 transmissions. A service request (e.g., a new service request) may be triggered if new data arrives. The WTRU may continue Mode 2 transmissions of D2D data when the WTRU moves out of Mode 2 transmission if an application is terminated by a user. Applications (e.g., new applications) or data (e.g., new data) may trigger the WTRU to initiate a RRC connection request. The WTRU may continue Mode 2 transmissions of D2D data until no D2D data is in the WTRU D2D transmission buffer.

A WTRU may be configured with a power control procedure that the WTRU may perform when changing the scheduling mode in D2D communication. A WTRU may be configured to determine power control mode of operation when a WTRU detects a change in D2D mode of operation. Methods and procedures related to power control when a WTRU changes coverage state may be applicable to situations where a WTRU changes its D2D mode of operation. Methods and procedures related to power control when a WTRU changes its D2D Mode of Operation may be applicable to when a WTRU changes coverage state.

A WTRU may be configured to use CLPC (e.g., with indication signaled along the grant signal), for example, when using Mode 1. A WTRU may be configured to determine which power control mode to use when a WTRU moves into Mode 1. For example, a WTRU may be configured to autonomously use close-loop power control mode, such as when a WTRU determines that it is operating in D2D communications Mode 1. SIBs may indicate semi-static power control parameters. A D2D grant may carry dynamic close-loop indications.

A WTRU may be configured to determine which power control mode to use when moving out of Mode 1 to Mode 2. A WTRU may be configured to determine which power control mode to use, for example, when a WTRU moves out of Mode 1. A WTRU may be configured to read SIBs. A WTRU may be configured to determine the power control mode to use based on SIB configurations (e.g., a WTRU may be configured to use open loop power control). A WTRU may be configured to autonomously use fixed power control, for example, if a WTRU fails to read SIBs.

A WTRU may be configured to select a resource pool for a WTRU transmission (Tx) and/or reception (Rx). A D2D enabled WTRU may be configured with at least a reception resource pool (e.g., or reception pool) and/or at least a transmitting resource pool (e.g., or transmission pool). A D2D enabled WTRU may be configured to use a resource pool. The WTRU may be configured to determine the reception pool as the aggregation of the resource pool from different received synchronization sources/relays and the transmission pool from the resource pool received from the serving (e.g., or Master) synchronization source/relay. A transmission pool may refer to a transmission pattern. A reception pool may refer to a reception pattern. A transmission pattern may refer to a transmission pool. A reception pattern may refer to a reception pool.

A WTRU may be configured with a resource pool configuration. The resource pool configuration may include and/or be defined by one or more resource pool parameters. Example resource pool parameters that may be associated with or used to define a given resource pool may include one or more resource configurations (e.g., which may include one or more D2D Reception and/or D2D Transmission parameters). Example resource pool parameters may include one or more authorized application types, an authorized usage area, and/or an index id. Example resource pool parameters may indicate whether the pool is available for control usage, and/or whether the pool is available for data usage. Example resource pool parameters may include one or more activation or deactivation triggers, a time window, a priority, a transmission power, a transmission control indication, a traffic type, a type of device (e.g., D2D relay), and/or a type of service. For example, a D2D resource configuration may include D2D reception parameter(s). The D2D reception parameter(s) may include or indicate a sub-set of time-frequency (T/F) resources to be monitored for reception of D2D signaling from other devices, for example when operating in both Mode 1 and Mode 2. D2D reception parameter(s) may include or indicate a separate set of T/F resources for Mode 1 and Mode 2 and/or a sub-set of T/F resources to be listened to for D2D control messages (e.g., scheduling assignments or D2D synchronization messages). A D2D resource configuration may include D2D transmission parameter(s). A D2D transmission parameter may include or indicate a sub-set of T/F resources to be used for D2D transmissions, when operating in both Mode 1 and Mode 2. A D2D transmission parameter may include or indicate a separate set of T/F resources for Mode 1 and Mode 2 and/or a sub-set of T/F resources to be used for transmissions of D2D control messages. The D2D transmission parameter or the D2D reception parameter may include one or more time-domain patterns.

An example of a resource pool parameter may include an authorized application type. For example, the authorized application type resource pool parameter may include an indication of whether the pool is to be used for commercial or public safety applications, or both. The authorized application type resource pool parameter may include an indication of whether the resource pool may be used for relaying, for example, by a relay WTRU or a remote WTRU using relay services. The authorized application type resource pool parameter may include an indication of the groups of application or services that the resources are applicable for. For example, a resource pool configuration may be used for public safety fire department applications. An example of a resource pool parameter may include an authorized usage area. For example, the authorized usage area may be an indication of the PLMNs, eNB, cell ids and/or tracking area id that the resources are authorized to be used with. If the WTRU is in-coverage of a base station or eNB operating with one or more of the associated PLMNs, the WTRU may be configured to use the corresponding resource pool.

An example of a resource pool parameter may include an Index Id. For example, the resource pool information may include an index id, which may identify the resource pool. The index id may identify the resource pool via a resource configuration index. The resource pool may be characterized by the index id. The base station or eNB may signal the resource pool that may be used by the WTRU using a resource pool index.

The resource pool may be associated with control and/or data usage. For example, the resource pool information may include an indication whether the resource pool is applicable for D2D control messages (e.g., synchronization message over PD2DSCH), D2D data messages, or both.

A resource pool may be associated with Activation/Deactivation triggers. If the resources are preconfigured or semi-statically allocated, the resource pool may include an indication that configures the WTRU to use the resources when desired and/or use the resources once the resources have been activated/deactivated. The base station or eNB may configure the WTRU using RRC signaling and may explicitly activate and/or deactivate the resource pool.

A resource pool may be associated with a time window. The resource pool configuration may indicate a time duration during which the resources may be valid.

A WTRU may receive an indication that may indicate whether the WTRU may attempt (e.g., always attempt) Mode 1 transmission before using the Mode 2 transmission pool.

A resource pool may be associated with a priority. The priority may indicate a priority level. The WTRU may be configured to select the resource pool based on the priority.

A resource pool may be associated with a transmission power and/or control information. The resource pool may be characterized by a maximum transmission power and/or a transmission range. The WTRU may determine the transmission power based on a transmission power and/or control parameter (e.g., when using the resource pool for transmission).

A resource pool may be associated with a traffic type. The traffic type may include unicast and/or broadcast/multicast. For example, the WTRU may transmit unicast traffic via a resource pool with a unicast traffic type. The resource pool with a unicast traffic type may be reserved such that non-unicast traffic may be barred with the resource pool. As another example, the WTRU may transit any type of traffic via a resource pool with a traffic type that is not unicast. As another example, the WTRU may transmit broadcast and/or multicast traffic via a resource pool with a broadcast/multicast traffic type.

A resource pool may be associated with a type of device and/or service. The resource pool may be reserved for a type of device. The resource pool may be reserved for a type of service. For example, the resource pool may be reserved for a relay device that supports relay services. A resource pool may be individually initialized/re-initialized by the higher layers.

As described herein, each resource pool may be associated to an index. A WTRU may be configured with one or more resource pools. The WTRU may be configured with one or more resource pools via higher layer signaling (e.g., RRC). The one or more resource pools may be defined via a specification. The WTRU may determine one or more characteristics of a resource pool. The WTRU may find resource pool information associated with a received resource pool index.

A WTRU may be configured to select a resource pool, for example, from a plurality of resource pools. The WTRU may be configured to select the resource pool for D2D Tx/Rx. The WTRU may be configured with separate pools to be used for reception and transmission of D2D communications. The WTRU may receive one or more reception and/or transmission resource pools from one or more sources. A WTRU may select the resource pool based upon one or more resource pool selection criteria. The WTRU may receive multiple resource pool configurations, for example, based on resource pool selection criteria. The WTRU may select the resource pool configuration based on the applications that are running, or the groups that the WTRU is currently a participant of. If the WTRU is part of the fire department public safety group, it may be configured to identify a resource pool dedicated for fire department first (e.g., as defined by a configured group ID). The resource pool configuration may be aligned for one group across multiple synchronization sources. If the WTRU selects resource pools from multiple synchronization sources, the WTRU may select a resource pool that is advertised to support the group or applications that the WTRU is participating in or is a part of.

Based on a resource pool selection criteria, the WTRU may determine the reception pool as the aggregation of the resource pools from the same or different received synchronization sources/relays and the transmission pool from the resource pool received from the serving (e.g., or Master) synchronization source/relay.

Based on a resource pool selection criteria, the WTRU may be configured to prioritize resource pools based on the originator of the resource pool configuration. For example, the WTRU may prioritize resource configuration obtained from a base station or eNB over resource configuration originating from other D2D WTRUs (e.g. other Synchronization Sources).

Based on a resource pool selection criteria, the WTRU may be configured to prioritize a resource pool from the Master or Serving Synchronization Source. The selection of the Master or Serving Synchronization source is described in more detail below.

Based on a resource pool selection criteria, the WTRU may be configured to prioritize the most recent resource pool information.

Based on a resource pool selection criteria, the WTRU may be configured to prioritize resource pool configuration from the highest priority source, or from a relay source.

Based on a resource pool selection criteria, the WTRU may be configured with one or more of the priority rules as described herein and the relative order among them. The WTRU may be configured to default to a common resource pool, for example, if the previous prioritized selection is unavailable. The WTRU may be configured to default to a randomly selected resource pool, for example selected from a pre-defined set of resources.

The WTRU may be configured to select a resource pool associated with relay services, for example, based on a resource pool selection criteria. For example, a WTRU that is configured to act as a relay may be configured with one or more resource pools for relay transmission/reception. A WTRU that is configured as a remote WTRU using relay services offered by a relay WTRU may be configured to select a resource pool(s) associated with relay services when transmitting data targeting this relay service.

A WTRU may be configured to forward (e.g., transmit) a selection of a resource pool to other WTRUs. The WTRU may determine to transmit information regarding the resource pool to other WTRUs, as described herein. A WTRU may determine that the resource pool may be transmitted for other WTRUs when the WTRU is a Synchronization Source, or a relay source.

The WTRU may be configured to become originator of D2D resource configuration when it becomes a Synchronization Source as described herein. The WTRU may be configured to determine the resource pool to transmit based on the resource configurations detected from other sources. In a non-limiting example, an out-of-coverage WTRU may select its resource pool based on the messages received from neighboring D2D WTRUs (e.g., based on the synchronization messages received from neighboring WTRUs).

A WTRU may prioritize the resource pools used by its neighbors and select a non-overlapping resource block or pool, within the allowed pools, that is not being advertised by other D2D WTRUs. If no such resource block is available, the WTRU may be further configured to select a resource pool that is associated to the synchronization message with the weakest signal.

A WTRU may be configured to align resource pools with neighboring WTRUs or synchronization zones that are associated to the same group as the WTRU. A WTRU that is a part of fire department public safety application/group may align its resource pool to resource pool information detected from neighboring fire department group WTRU.

The WTRU may be configured to randomly select a resource pool, for example, if no other rules are available. A resource pool may be selected from a pre-determined set that may be transmitted within a synchronization message.

A WTRU may use a resource pool identified by an eNB (e.g., when the WTRU is in coverage). For example, the network (e.g., the eNB) may configure the WTRU with a resource pool index. As another example, the network may configure the WTRU with a set of resource pool parameters.

A WTRU may determine that a resource pool is to be transmitted for other WTRUs, for example, when the WTRU is forwarding information from other synchronization sources A WTRU may transmit resource configuration and resource pool assignment as a part of a synchronization message, or a relay message. The resource configuration may include a set of parameters and/or a resource configuration index.

A WTRU may be separately configured with the resource pool configuration to be forwarded as a part of synchronization message. An in-coverage WTRU may be configured with in-band resources for its own D2D communications. The in-coverage WTRU may use pre-configured out-of-band resource pool to be transmitted in the synchronization message.

A WTRU may be configured to forward a sub-set of the resources to be forwarded as a part of the synchronization message.

A WTRU may be configured to evaluate/re-evaluate D2D Rx/Tx resources based on triggers. The WTRU may be configured to evaluate and/or re-evaluate the set of D2D Rx/Tx resources based on one or more of the following triggers. The WTRU may be configured to evaluate and/or re-evaluate the set of D2D Rx/Tx resources based on one or more of the trigger events described herein.

The WTRU may trigger evaluation/re-evaluation of the resources to be used for D2D Tx/Rx (e.g. Mode 1 or Mode 2) based on one or more triggers events described herein.

The WTRU may be configured with rules on selecting resources based on the current D2DCoverage-State.

The WTRU may be configured with rules on selecting resources based on the change in operational mode to be used to acquire D2D resources (e.g., based on a change between Mode 1 and Mode 2, for example, based on a change from Mode 1 to Mode 2).

If one or more D2D resources are used, the WTRU may be configured with rules on selecting resource pool based on RRC state. The WTRU may be configured to use one or more base station or eNB signaled resources (e.g., signaled via SIB(s)) when the WTRU is in RRC_IDLE mode.

When new data arrives in the Access Stratum (AS) from a D2D application, the reception of new data may trigger the AS to determine (e.g., look for) D2D resources and if no resources are available, the WTRU may be triggered with procedure to obtain D2D resources.

A WTRU may receive signaling from higher layers indicating that new D2D services are configured.

A WTRU may be configured to select resources, for example, when the WTRU is configured to operate as a relay WTRU.

A WTRU may be configured to select resources, for example, when the WTRU is configured as a remote WTRU. A remote WTRU may refer to a WTRU that may use relay services from a relay WTRU.

If D2D resources are used and WTRU is operating in Mode 1, the WTRU may be configured to first attempt to request resources from the network. If the resources are unavailable within a configured duration, the WTRU may be configured to fallback to semi-static or preconfigured resource pool (e.g., use Mode 2).

An RRC_IDLE or RRC_CONNECTED WTRU camped on a suitable serving cell may be configured to initiate D2D resource selection by using Mode 1. In such a scenario when new D2D data arrives, the WTRU may initiate a request to obtain resources from the base station or eNB. If the procedure is unsuccessful (for example, if there is no response to the scheduling or RRC connection request for a preconfigured duration), the WTRU may attempt to use resource pool configured using broadcast signaling. If no resources are available in broadcast, or the WTRU is unable to decode SIB, the WTRU may transition to pre-configured resource pool.

If D2D resources are used, the WTRU may be configured with rules on selecting a mode and a resource pool based on RRC state. In a non-limiting example, the WTRU may be configured to operate in Mode 2 when it is in RRC_IDLE mode. This rule may take precedence over a base station or eNB defined mode.

A change in the selected D2D resources may further trigger the WTRU to perform one or more additional D2D procedures. An update in selected resources may further trigger WTRU to transmit new resource configuration to other neighboring WTRUs.

A WTRU may be configured with time domain D2D transmission/reception patterns. A D2D WTRU may perform D2D transmission/reception according a D2D pattern (e.g., transmission/reception may be allowed at certain times/subframes and may be barred in other times/subframes). The D2D pattern may define reception opportunities for the WTRU (e.g., time in which the WTRU is expected to receive on the selected resource pool). The D2D pattern may define the transmissions opportunities (e.g., time in which the WTRU may transmit). The D2D pattern may define reception opportunities for the WTRU and define the transmissions opportunities (e.g., the time pattern indicates the time in which the D2D WTRU may perform D2D reception and/or transmissions). The WTRU may be configured with one or more patterns associated with a priority. The WTRU may be configured with rules to select a pattern to use based on a priority of the data to be transmitted or received. For example, pattern1 may be associated with high priority data, pattern2 may be associated with medium priority data, etc. The WTRU may be configured with rules to select a pattern based on the role of the WTRU. For example, the WTRU may select a given pattern when the WTRU operates as a relay. A transmission pattern may refer to a transmission pool. A reception pattern may refer to a reception pool. A transmission pool may refer to a transmission pattern. A reception pool may refer to a reception pattern. As described herein, D2D pattern and transmission pool may be used interchangeably.

A WTRU may be configured to use a D2D pattern when the WTRU is in normal UL communications with a base station or an eNB and the WTRU determines to perform D2D communications (e.g. in another spectrum, or in the same spectrum but when limited to a single receiver). The WTRU may be limited to a single receiver when it has to tune out of eNB reception in order to receive data. A WTRU may use the D2D pattern when the WTRU is expected to perform communications on different frequencies, or to allow some form of battery saving while the WTRU is operating in out-of-coverage mode and performing D2D communication. The triggers of when to start using the pattern are described below.

When the WTRU is out of coverage it may be expected to continuously receive in the resources with the resource pool. The WTRU may be configured to use a DRX like pattern.

A WTRU may be configured to determine when to use a pattern (e.g., pool) based on detecting triggers. A WTRU may receive an explicit indication to use a transmission pattern (e.g., transmission pool) or a reception pattern (e.g., reception pool) according to one or more criteria. For example, when the synchronization message (e.g., the synchronization message of the selected synchronization source or relay) includes a pattern, and/or the WTRU may explicitly receive a pattern from a base station, an eNB or from another controlling entity. When a WTRU receives an explicit indication, the WTRU may initiate the use of the pattern and/or associated pool. For example, when a WTRU is configured to operate as a relay the WTRU may initiate the use of a pattern. The WTRU may be configured to operate as a relay when the WTRU receives an instruction to begin operating as a relay. The WTRU may receive the request or pattern transmission from an entity (e.g., another WTRU) that may be allowed to communicate with the WTRU (e.g., the Group ID corresponds to at least one of the allowed/configured group IDs of the receiving WTRU). The WTRU may receive an explicit indication that it may initiate the use of a transmission pattern or a reception pattern when a D2D discovery or communication session is initiated. The WTRU may be configured with different patterns when the WTRU is configured to operate as a relay WTRU or when the WTRU is configured to communicate with a relay WTRU.

A WTRU may be configured to determine when to transmit or communicate a pattern usage to one or more other WTRUs based on triggers. The WTRU may determine that it may use a pattern and potentially initiate the transmission of at least a transmission pattern indication or a reception pattern indication as part of its synchronization message. The determination of the WTRU to initiate the transmission of a pattern indication and/or to request a pattern for transmission may be based on the triggers described below (e.g., triggers to determine to become a synchronization source or relay). The determination of the WTRU to initiate the transmission of a pattern indication and/or to request a pattern for transmission may be based on one or more additional triggers. The trigger(s) may include a time pattern resource use trigger, a frequency of operation trigger, a trigger based on the state of the WTRU, a trigger based on the hop of the received pattern, a trigger indicating that a WTRU may be configured with power saving mode of operation and a trigger indicating that a WTRU detect a pattern. A WTRU may transmit one or more selected patterns when the WTRU is operating as a relay node. The WTRU operating as a relay may initiate the transmission of pattern(s) based on the change in role of the WTRU (e.g., operation as a relay node), or based on change in data/services supported by the WTRU (e.g., when a WTRU starts forwarding a new MBMS service).

A first WTRU may receive an indication of a time pattern/resource use trigger when the WTRU determines that a second WTRU is using a different time pattern than the first WTRU. The WTRU may determine to align the pattern or request a new pattern, for example, as described herein. The WTRU may further determine to transmit a pattern indication in the synchronization message. The WTRU may receive an indication of a frequency of operation trigger when the WTRU may be connected for communication in a frequency other than the frequency of operation of a second detected WTRU. The WTRU may request a pattern, initiate the use of a pattern, or may transmit the pattern indication in a synchronization message. A WTRU that receives a pattern for use may further determine whether to transmit (e.g., send) the pattern indication in the synchronization message, for example, if the WTRU determines to communicate with WTRUs in another frequency. A WTRU may receive an indication of a trigger based on the state of the WTRU, for example, if the WTRU is in-coverage state the WTRU may use the pattern provided by an eNB and if the criteria above are met the WTRU may transmit the pattern indication. If the WTRU is in out-of-coverage and it receives the pattern indication, in some examples, the WTRU may use it to determine the transmission opportunities and/or reception opportunities but may not further forward or relay the pattern indication in its own synchronization message.

A WTRU may receive an indication of a trigger based on the hop of the received pattern (e.g., based upon a detected hop count). When a receiving WTRU receives the pattern indication, the receiving WTRU may use the pattern indication to determine whether to forward the pattern indication in the synchronization message. The WTRU's determination to forward may depend on the hop count or the source from which the synchronization message may be received. In some examples, if the WTRU has received the pattern from a synchronization source (e.g., from a base station or an eNB) the WTRU may transmit the pattern indication in its synchronization message. If the WTRU receives the pattern indication from a transmitting relay with a hop count greater than a configured hop count then the WTRU may determine not to further transmit the pattern indication in its synchronization message.

A WTRU may detect a trigger indicating that the WTRU may be configured for power saving mode of operation. Upon detecting the trigger, the WTRU may use and further transmit the pattern indication in the synchronization message that the WTRU may receive during the configured time pattern, for example, if the WTRU is configured with power saving mode of operation. A trigger indicating that a WTRU detect (e.g., use, or transmit) one pattern (e.g., a certain type of pattern) may occur when a WTRU determines that it may become a synchronization source or relay or may communicate to another WTRU and initiate the use and transmission of the pattern indication on the synchronization message. The triggers to operate as a synchronization source may be different from the triggers to operate as a relay. One or more of the triggers described herein may be used by the WTRU to determine whether the WTRU may operate as a synchronization source, as a relay, or both.

For example, the WTRU may determine whether to become a synchronization source based on a measured signal strength of a source (e.g., an eNB) being below a predetermined threshold. A WTRU may become a synchronization source, for example, if the WTRU is in-coverage state or connected to a base station or an eNB and detects a synchronization signal (e.g., a D2DSS or a control message) from a lower priority source or from a source that is not a base station or an eNB (e.g., a second WTRU is out-of-coverage WTRU). In another example embodiment, the WTRU may initiate this procedure if it determines the second WTRU belongs to an allowed group for the WTRU.

For example, an in-coverage WTRU that determines to communicate with an out-of-coverage WTRU may coordinate and transmit the reception/transmission pools over a control or synchronization message in order to be able to communicate.

The WTRU may determine whether a neighboring WTRU is in-coverage or out-of-coverage based on a detected D2D control signal or message (e.g., D2DSS or PD2DSCH). For example, a first WTRU (e.g., an in-coverage WTRU) may detect a second WTRU and determine that it corresponds to an out-of-coverage WTRU based on one or more properties or an identity of the received D2DSS.

A WTRU may determine to operate as a relay, or the WTRU may determine to offer relay services, for example, based on one or more of the following example conditions. The WTRU may determine to operate as a relay when the WTRU detects another out-of-coverage WTRU requesting relay services (e.g., an out-of-coverage WTRU may request a relay WTRU for a service that the relay WTRU may be configured to provide as a relay service). The WTRU may determine to operate as a relay when the WTRU is connected (e.g., via a series of control message exchanges) to one or more remote WTRUs. The WTRU may determine to operate as a relay when the WTRU determines that the WTRU has relay data to transmit and/or the network. The WTRU may determine to operate as a relay when the WTRU determines that the WTRU has relay data to receive (e.g., when the WTRU may be connected to at least one remote WTRU). The WTRU may determine to operate as a relay when the WTRU receives an explicit command by the network to act as a relay, or when the WTRU is configured by higher layers to act as a relay. The WTRU may determine to operate as a relay based on signal strength measurements with the eNB and/or other out-of-coverage WTRUs, etc.

Upon determining that the WTRU is to act as a synchronization source or relay, the WTRU may initiate transmission of one or more indications, for example on the synchronization message. The WTRU may initiate an indication to the network when the WTRU is acting as a relay and the allocated resources are not sufficient to support all the remote UEs.

When a first WTRU detects that a trigger or a combination of the triggers described herein are met, the WTRU may initiate a transmission of the control message or synchronization message (e.g., PD2DSCH) including a transmission and/or reception pattern/pool indication. The contents of the synchronization message may be determined based on the role being performed by the WTRU. For example, when a first WTRU detects a trigger to become a relay, the synchronization message contents may include one or more resource pattern/pool indications.

A WTRU may receive a message (e.g., a control message, a synchronization message, or a PD2DSCH) that may include content of the pattern/resource pool. The synchronization message, the control message and the PD2DSCH may be equivalent. The pattern included in the synchronization message (e.g., PD2DSCH) may correspond to one or a combination of the following. The pattern in the synchronization message may correspond to a transmission pool. WTRUs that receive the synchronization message may use the transmission pool to determine one or more transmission opportunities. The one or more transmission opportunities may be for D2D transmission (e.g., all D2D transmissions) or the one or more transmission opportunities may correspond to the transmission opportunities for services allowed to be received by the WTRU that is transmitting the synchronization message (e.g., based on transmitted identities on the PD2DSCH, or based on higher layer signaling). Transmissions performed by other WTRUs (e.g., out-of-coverage WTRUs) may be received by the in-coverage WTRU. The transmission pool indication to be transmitted on the PD2DSCH, or on another control message may be determined by the WTRU based on an explicit configuration received by the network (e.g., a transmit pool configuration to send on the PD2DSCH, or in another control message). The transmission pool indication to be transmitted on the PD2DSCH may correspond directly to a pool that the in-coverage WTRU is using in the current cell (e.g., the reception pool received by the eNB).

The pattern indicated in the synchronization message may correspond to a reception pool. WTRUs that receive the synchronization message may use the reception pool to determine at least a subset of the reception opportunities. The reception pool indication to be transmitted on the PD2DSCH may be determined and may correspond to an explicit configuration received by the network (e.g., a receive pool configuration to send on the PD2DSCH). The reception pool indication to be transmitted on the PD2DSCH may correspond directly to a pool that the in-coverage WTRU is using in the current cell (e.g., the transmission pool received by the eNB), if the WTRU is configured with Mode 2 configuration. The pattern in the synchronization message may correspond to the content provided in the example embodiments below.

A WTRU may explicitly request that the network allow the WTRU to initiate a pattern or resource pool indication transmission. When a first WTRU detects that one or a combination of the triggers described above are met, the first WTRU may send a request or a message to the eNB to report the detection of the one or the combination of the triggers (e.g., out-of-coverage WTRU detected, detecting that an out-of-coverage WTRU is requesting relay service, WTRU determines that it is acting as a relay (e.g., configured by higher layers to become a relay), or a trigger for the WTRU to become a synchronization source from the eNB). The WTRU may include in the request message one or more of the following: information on the trigger for the message, including, for example, one or more of a cause, measurement, WTRU identities, etc. The WTRU may include in the request message information on relay-related service requests, including, for example, the identity of the remote WTRU requesting relay services, the service type, the QoS, etc. The first WTRU may initiate transmission of the pattern indication or resource pool over the PD2DSCH, or other control message upon confirmation and configuration from the network. The first WTRU may indicate to the network one or a combination of the following information. The first WTRU may indicate a reason for the request (e.g., an out-of-coverage WTRU detected, or that the first WTRU has received a request for relay services), an identity of a detected WTRU, a group ID to which a detected WTRU belongs to, a ProSe ID, number of WTRUs requesting service. The first WTRU may indicate a unique identifier of a detected WTRU, a detected D2DSS of the WTRU that triggered the report, a recommended resource pool or pattern, a frequency of operation of the detected WTRU. The first WTRU may indicate a request to initiate a service as a relay. The first WTRU may request to stop transmission of a PD2DSCH (e.g., out-of-coverage WTRU no longer detected or a trigger to become a synchronization source no longer met, or relay service no longer required).

A WTRU may wait for an explicit indication (e.g., a message) from an eNB or main synchronization source to perform one or more of the following. The WTRU may initiate transmission of one or more resource pools indications (e.g., start transmitting a synchronization message and/or signal). The WTRU may receive the resource pools information that the WTRU may be configured to transmit. The WTRU may be configured with resources in which the synchronization message and/or signal may be transmitted and periodicity (e.g., PD2DSCH and SA resources). The WTRU may include additional information in the synchronization message and/or signal. The WTRU may wait for a request for the in-coverage WTRU to provide the WTRU identity of the out-of-coverage WTRU when available.

Upon reception of a synchronization message initiation from an eNB, the WTRU may initiate or may configure (e.g., re-configure) a transmission of the synchronization message, which may include one or more resource pool or pattern indications.

If the WTRU identity of a detected WTRU (e.g., a WTRU out-of-coverage) that triggered the initiation of a synchronization message was not originally known, the WTRU may continue monitoring until it can detect the identity of the detected WTRU. The WTRU may report the identity of the detected WTRU to the network when available.

The network may use the identity of the detected WTRU to determine whether the in-coverage WTRU may start, continue, or stop transmitting the synchronization message (e.g., if the corresponding WTRUs cannot communicate with each other or do not belong to the same group or services, or if the corresponding WTRU is authorized for such services). The network may further use the identity of the detected WTRU or the D2DSS to determine whether any other in-coverage WTRUs are transmitting the same resource pool to enable communication with the detected WTRU. The network may determine to stop a PD2DSCH transmission of at least one of the other in-coverage WTRUs performing PD2DSCH transmissions.

A WTRU may determine (e.g., on its own) whether the WTRU can communicate with the detected WTRU based on the determined identity and may implicitly stop. If the WTRU detects at least one WTRU in the proximity for which it has not determined the identity or with which it can communicate, the WTRU may continue transmission.

A WTRU may determine to stop transmission of the synchronization message (e.g., when no more out-of-coverage signals are detected). The WTRU may stop the transmission and indicate to the network that the WTRU stopped transmitting the synchronization message. The WTRU may indicate to the network that there are no more out-of-coverage D2D signals detected and the WTRU may wait for an explicit order to start or stop. The WTRU may indicate to the network that there are no more remote WTRUs using a relay service, or that the WTRU is not configured to offer relay service (e.g., upon determining that the WTRU is not being requested to offer relay service). The WTRU may wait for an explicit order to start or stop transmission of the PD2DSCH or control message. The WTRU may autonomously determine to stop transmission of the PD2DSCH or control message.

Upon reception of the pattern or a determination that the WTRU has to use a pattern, the WTRU may perform one or more of the following operations. The WTRU may restrict all transmissions opportunities to fall within the given pattern. This may ensure that a WTRU that relayed or transmitted the message may be able to receive the message. Another operation could include restricting all reception opportunities in the given pool of resources to be within the given pattern. The reception opportunities may be an aggregation of the different resource pools or patterns received. This operation may be beneficial in that it may promote battery life. Depending on the coverage state the WTRU's operation(s) may differ. For example, an in-coverage state WTRU may use the pattern to perform reception in the given resource pool. Depending on the mode a WTRU is using (e.g. Mode 1 or Mode 2) the WTRU may either perform transmissions during some of those opportunities (e.g., in Mode 2) or rely on the eNB to schedule the actual transmission opportunities dynamically (e.g., in Mode 1). An out-of-coverage WTRU may use the pattern to determine the available transmission opportunities, for example, as described herein. An out-of-coverage WTRU may receive at all times, for example, to ensure proper reception of data from all other WTRUs. An out-of-coverage WTRU configured with power savings may receive during the configured pattern or aggregation of different configured patterns (e.g., if there are multiple sources).

Based on the received pattern, a WTRU may determine the transmit time opportunities (e.g., TTIs) that the WTRU can use for transmission and/or reception. For example, if the pattern includes a duration (e.g., number of consecutive TTIs), cycle and/or subframe number, the WTRU may determine the time instances (System Frame Number (SFN) and subframe) during which the WTRU may be allowed to receive transmit/receive.

In order to be aligned with the transmission patterns, a SFN or a reference time that the receiving WTRUs may be using (e.g., the in-coverage WTRU or the out-of-coverage WTRU) may be provided in the synchronization message together with the pattern.

The pattern may be a bitmap or a fixed pattern with a relation to subframes within a frame or within a number of frames. The reference frame may be a specific frame that may be specially defined within the synchronization channel.

A WTRU may detect different patterns. The WTRU may be connected to a selected synchronization source or relay, however it may be able to receive and decode synchronization messages from multiple sources. The WTRU may determine that the patterns used from different synchronization sources may be different. This may cause a WTRU that is connected to different synchronization sources to potentially not be able to receive data from the other clusters. In order to avoid data losses the WTRU may report this discrepancy to the cluster head, detect the discrepancy which becomes a synchronization source and send the same pattern. The WTRU may trigger the initiation of a synchronization message and indicate that the message is being transmitted to align the patterns. The WTRU may transmit the pattern of the highest priority detected source or relay. The WTRU may determine the transmission opportunities for both detected patterns and transmit the message twice in both transmission opportunities. The WTRU may limit transmissions to transmission opportunities that overlap between the different received patterns (e.g., if no overlap then the WTRU may perform one of the actions describe above).

The WTRU may explicitly receive the pattern. For example, the WTRU may receive the pattern via dedicated signaling or a broadcast message that may be broadcasted from a base station or eNB, The pattern may be include in a synchronization message received from a synchronization source or a synchronization relay. The WTRU may receive the pattern through a dedicated message from another WTRU. The WTRU may receive the pattern from a preconfigured WTRU (e.g., the WTRU may be configured with a set of patterns that it can select from).

The WTRU may determine a pattern to use and transmit using the determined pattern. The WTRU may determine that a pattern should be used based on WTRU capabilities and the D2D services configured from one or more higher layers. For example, if the WTRU comprises a single receiver, the WTRU may determine that a pattern is to be used for the WTRU to TDM receive from the DL and D2D link. For example, to avoid self-interference, a pattern may be used for the WTRU to TDM between Uu Tx and D2D Tx/Rx.

The WTRU may be configured to determine (e.g., select) a pattern to use based on the type of traffic to transmit and/or receive. For example, a relay WTRU may be configured to use transmission pattern for relay traffic when relaying such traffic. A remote WTRU may be configured to use the patterns or resource pool associated with the relay when transmitting or receiving data to/from the relay and use another pattern or resource pool when transmitting other data (e.g., non-relayed D2D transmissions). For example, the selection of pattern may be based on priority associated with the received pattern and/or priority of the data or service as determined by the WTRU. The priority of the WTRU service or data may be determined on several factors including the user priority, static priority configured in the WTRU, priority of the application originating the data or the highest priority of the one or more applications originating the data, the services running in the WTRU, etc.

The WTRU may determine the number of transmission sub-frames that may be used in discovery occasion(s), for example, based on number of discovery sessions initiated. The WTRU select the transmission sub-frames based on one or more of the following factors. The WTRU may use a number of discovery sessions initiated by higher layers to select the transmission sub-frames. The WTRU may select the transmission sub-frames based on a ratio of a number of sessions where the WTRU is an announcing WTRU to a number of sessions where the WTRU is a monitoring WTRU. The WTRU may select the transmission sub-frames from a list of configured patterns (e.g., an even sub-frames pattern or an odd sub-frames pattern). The WTRU may select the transmission sub-frames based on D2D-RNTI.

The WTRU may send an indication on using a determined pattern. The WTRU may be configured to send an indication when it determines a pattern. The WTRU may send the indication to an eNB, a synchronization source, or another WTRU. The indication may include one or more of the following. The indication may include a pattern selected by the WTRU. The indication may indicate sub-frames where the WTRU is configured to perform D2D Tx and/or D2D Rx. The indication may indicate when the WTRU is configured to start using the pattern, for example, this information may be indicated using SFN index, and/or sub-frame index when the D2D tx/rx may be performed. The indication may include a duration during which the WTRU may use the pattern. The indication may indicate when the WTRU is configured to stop using the pattern.

The WTRU may be configured to detect a trigger that indicates when to send an indication regarding using a determined pattern. The WTRU may be configured to send the indication in the following conditions. The indication may be sent based on an explicit command by an eNB (e.g., the eNB may send a message requesting the WTRU send the pattern). The indication may be sent when a D2D discovery or communication session is started or stopped by one or more higher layers. The indication may be sent when the WTRU is to perform a service (e.g., a new service) that may need the pattern to be changed.

The WTRU may be configured to perform synchronization procedures, for example, using synchronization principles. To simplify signal detection and demodulation, one or more example embodiments provide a pre-defined frame structure for D2D communications. The pre-defined frame structure may be defined and used by all D2D WTRUs. The frame structure may be defined such that the location (e.g., in time and/or frequency) of one or more of the scheduling assignments (SA), the D2D synchronization signal (D2DSS), the Physical D2D Synchronization Channel (PD2DSCH) (e.g., a broadcast control channel for D2D), the discovery signal and the data transmissions may be readily determined (e.g., well-known). An example D2D synchronization frame structure may be illustrated in FIG. 5 (time-domain) and in FIG. 6 (time-frequency-domain).

The WTRU may be configured to use multiple frame formatted D2D synchronization frames. A WTRU may be configured with multiple frame formats. The frame formats may define the various locations of the various elements of D2D communications. Some non-liming examples may include a D2DSS, a P2D2SCH, a scheduling address (SA) region, a Discovery region, D2D data, or the like.

Different frame formats may be configured such that D2DSS locations (e.g., in time) do not overlap between different formats. This may allow multiple D2DSS hops to have the same formats. This example embodiment may be illustrated in FIG. 7 (e.g., in the time domain). Similar concepts may apply in time-frequency domain in designing frame formats configured to allow for D2DSS locations (e.g., in time and frequency) not to overlap between different formats.

A WTRU may determine to use a fixed format. For example, the WTRU may be configured to use the fixed format based on specifications. The format may in a non-limiting example depend on the frequency band, WTRU category or other fixed criteria. The WTRU may determine the frame format to use based on a pre-configuration in which the WTRU may be pre-configured, for example, by the network or via its USIM or other internal configuration with a D2D Synchronization Frame Format to use. The WTRU may be configured with a specific D2D Synchronization Frame Format to use, for example, when the WTRU becomes a synchronization source. The WTRU may determine the frame format to use based on an implicit format in which the WTRU may be configured to determine the frame format being received, for example, based on the synchronization signal characteristics and/or the PD2DSCH (e.g., content and/or resource location). The WTRU may determine the frame format to use based on an explicit format in which the WTRU may be configured to determine the frame format based on explicit signaling, for example from the PD2DSCH.

A WTRU may determine frame timing based on frame format and D2DSS characteristics. The WTRU may be configured to determine the frame timing and synchronize to the associated D2D Synchronization Frame. A D2D Synchronization Frame Format may be determined in which the WTRU may determine the D2D Synchronization Frame Format and then determine the time position of the D2D Synchronization Frame. D2DSS characteristics are determined in which the WTRU may determine the D2D Synchronization Frame based on the D2DSS characteristics. D2DSS characteristics may include the D2DSS received timing. A synchronization signal hop count and/or information received from the PD2DSCH may be used to determine the frame timing and synchronize to the associated D2D Synchronization Frame.

WTRUs in the same synchronization zone may have the same Synchronization Frame. To facilitate communications between WTRUs in the same vicinity, WTRUs in the same vicinity may share the same D2D Synchronization Frame. Some WTRUs may relay the D2DSS up to a maximum number of hops. As noted above the number of hops can exceed two-hop, for example, as shown in synchronization protocol in FIG. 4. A Synchronization Source (SS) may be a device transmitting a D2DSS with an independent synchronization reference. A SS may be a network source (e.g., a base station or an eNB) in which case it may be referred to as a Network SS (NSS). A SS may be an unconnected independent source (e.g., a WTRU) in which case it may be referred to as an Independent SS (ISS). A Relayed Synchronization Source (RSS) may be a device that may transmit a D2DSS but may derive the synchronization reference from another source, for example, either an ISS or a NSS. A RSS may use another RSS as a synchronization reference, up to a maximum hop count. The area under which all WTRUs are synchronized to the same SS may be referred to as a Synchronization Zone (SZ).

A WTRU may be configured to receive an indication of the synchronization source identity and hop count from the D2DSS. The Synchronization Frame for a RSS may be configured to be the same as the Synchronization Frame from its associated SS. In order for WTRUs in the same synchronization zone to have the same Synchronization Frame, the Synchronization Frame for a RSS may need to be the same as the Synchronization Frame from its associated SS.

A WTRU may determine the Synchronization Frame from the D2DSS and hop count. A WTRU may derive the synchronization frame timing from the received D2DSS timing and/or from the associated hop count. The relayed D2DSS may carry an indication to ensure that the WTRU may derive the synchronization frame timing of the synchronization source from it (e.g., such that the WTRU does not track multiple synchronization zones that are the same).

Since the synchronization frame timing may be associated to the synchronization source, the WTRU may identify the synchronization source from the D2DSS, for example, so that a receiving WTRU can detect the presence of multiple synchronization sources/frame timing.

The D2DSS may carry information on one or more of synchronization source ID, a synchronization source type (e.g., source connected to a base station, an eNB, or an independent source), and/or a hop count A WTRU D2DSS signal may be based on a Zadoff-Chu signal of a known, predefined length and of a known, predefined bandwidth (e.g., number of PRBs) and duration (e.g., number of OFDM symbols which can, for example, be 1 OFDM symbol). The D2DSS may be transmitted multiple times during a D2D Synchronization Frame, or even multiple times during a subframe. Similarly, the D2DSS may be augmented by a second synchronization signal (e.g., the S-D2DSS), which may be used to carry additional implicit information.

The D2D WTRU may be configured with more than one set of ZC root sequence for D2DSS. Each set of ZC root sequence may be associated to a synchronization source type. For instance, the D2D may be configured with 2 sets of ZC roots, each set may include one or more ZC root sequences and ZC roots from each set may be different. The first set may correspond to sources associated to an eNB or network. The second set of ZC roots may correspond to sources associated to independent synchronization sources. A D2D WTRU configured to relay the synchronization source may be configured to use a ZC root from the same set as the synchronization it may be relaying. When a WTRU becomes its own synchronization source, it may be configured to select the ZC root for its D2DSS from a specific set, for example, from the set associated to independent synchronization sources.

Figure 8:
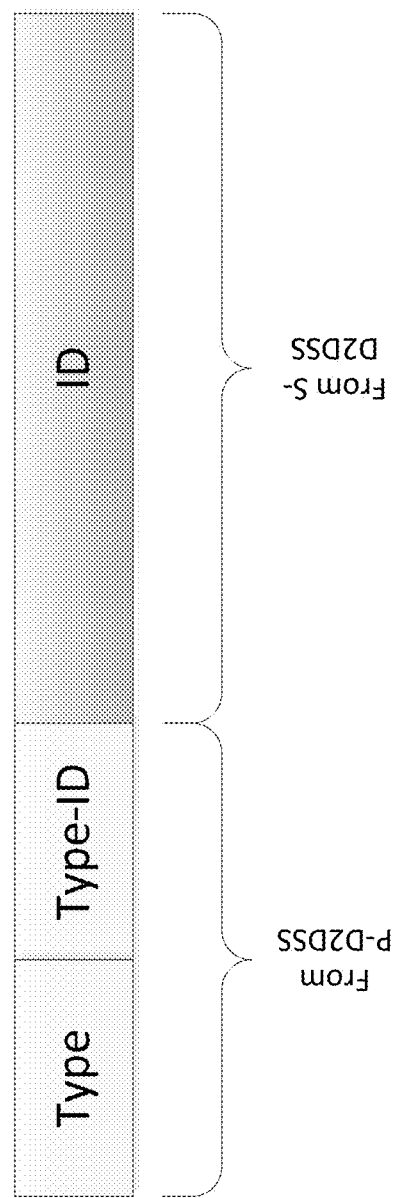
FIG. 8 is an illustration of a device-to-device synchronization source ID suitable for carrying out one or more example embodiments.

A secondary D2DSS may be used, for example, in order to improve the synchronization. The sequence used for this secondary D2DSS (S-D2DSS) may be used to further indicate a source identity. The S-D2DSS may consist of another ZC sequence or an m-sequence. The set of allowable sequences may be indexed. The set of allowable sequences may be associated to at least a part of a synchronization source identity. Referring to FIG. 8, an illustration of an example synchronization source ID is shown in accordance with example embodiments. As exemplified in FIG. 8, the complete synchronization source identity may consist of an aggregate of the primary D2DSS (P-D2DSS), for example, by aggregating the Type, Type-ID indices, and the S-D2DSS.

The D2DSS may carry (e.g., implicitly carry) the hop count. The hop count may be indicated by the S-D2DSS index. For example, a small number of bits from the S-D2DSS index may be used to indicate the hop count. The cyclic shift associated to a D2DSS may be used to indicate the hop count. Pairs of symbols carrying D2DSS may be used to carry the hop count information. For example, the difference in cyclic shift between two D2DSS symbols may indicate the hop count.

Other combinations based on the above described techniques may be used to carry the synchronization source information implicitly.

A WTRU may be configured to select or reselect a synchronization source. Since there may be a limited number of hop counts and since the WTRU may be close to an eNB, a WTRU may be able to acquire the synchronization from multiple synchronization sources (e.g., NSS, ISS, or RSS). The WTRU may prioritize among synchronization sources, for example, in order to determine the synchronization frame for data reception/transmission.

The WTRU may be configured with prioritization rules. A synchronization source may include an eNB. A synchronization source may include a WTRU. Rules to prioritize among ISS may be used by the WTRU. If WTRU detects D2DSS from multiple ISS, the WTRU may prioritize among ISS based on the measured signal strength of received D2DSS and the D2DSS with higher signal strength may be prioritized.

The WTRU may be configured with rules to prioritize among RSS. If a WTRU detects D2DSS from multiple RSS, the WTRU may prioritize among RSS based on the hop count value indicated by the D2DSS. The RSS with the smaller hop count value may be prioritized.

The WTRU may be configured with rules to prioritize among WTRUs connected to network and ISS. A WTRU may prioritize among synchronization sources that are WTRUs in network coverage relaying the D2DSS from eNB and ISS that may be out of coverage. The prioritization rules may be based on several aspects. For example, a WTRU may communicate with WTRUs connected to network. In such a case, it may be beneficial for the WTRU to prioritize the synchronization sources that are WTRUs connected to the network if the signal strength of the D2DSS from such sources is above a pre-defined threshold. The WTRU may prioritize the ISS if the measured strength of D2DSS is significantly stronger than that from synchronization sources connected to the network (e.g. measured energy level from D2DSS of ISS is X dB higher than the D2DSS from synchronization sources connected to the network, and X may be predefined).

A WTRU may be configured to maintain a prioritization list. A WTRU may be configured to maintain a prioritization list of synchronization sources that the WTRU detects. The WTRU may be configured to maintain the prioritization list, for example, based on one or more of the following triggers (e.g., in any order and/or combination). The WTRU may use conditions/Triggers to perform prioritization/reselection.

A WTRU may perform prioritization of synchronization sources periodically (e.g., the WTRU may perform the prioritization after a certain amount of time expires). The amount of time may be explicitly configured by the network or it may be pre-configured in the WTRU. A WTRU may perform prioritization of synchronization sources aperiodically (e.g., not periodically). Aperiodic prioritization can include detection of a new source. A WTRU may perform the update of prioritization list upon detection of a new synchronization source. The detection of a new synchronization source may be declared when a D2DSS from a new SS (e.g. identified from the D2DSS) is detected with measured energy above a certain threshold for a given period of time. A Timeout for a given source trigger may be employed such that a WTRU may perform the prioritization when a given synchronization source is timed out and stops transmitting D2DSS.

A hop count change may act as a trigger. For example, a WTRU may perform prioritization when it detects a change in hop count (e.g., the identity of the SS from D2DSS is the same, while the associated hop counts changes).

The lack of a presence of certain data in a buffer can act as a trigger. A WTRU may perform prioritization when the WTRU determines that no data has been transmitted for a certain period of time and there is new data to transmit in the buffer. A WTRU may perform the prioritization when it had no data or had D2D data to transmit for a certain period of time and there is new UL data to transmit.

The WTRU may use other changes/measurements. A WTRU may measure the energy level of the D2DSS of the current SS which may occur continuously or at certain specified time period. If the measured signal strength is below a pre-defined threshold, the WTRU may perform prioritization and/or the WTRU may determine to become a synchronization source.

The WTRU may perform update of prioritization list when the measured energy level of D2DSS from SS other than the current SS changes. An example could be when the measured energy level of D2DSS from other SS increases above a pre-defined threshold or becomes larger than the energy level of D2DSS of current SS.

The energy level measured may be weighted (e.g., divided in the dB domain, subtracted in the dB domain, or otherwise modified) by a thermal noise measurement/estimate performed by the WTRU.

The WTRU may apply prioritization. A WTRU may apply the new timing at specific synchronization frame time instants (e.g., the WTRU may not apply the new timing at current synchronization frame but at the beginning of the next synchronization frame). Considering there might be a timing difference between old and new synchronization timing references, a gap in synchronization frames may accommodate such a difference.

The WTRU may be configured to not update the prioritization list when one or more of the following triggers are met. The WTRU may not update the prioritization list when it is transmitting or receiving data. The WTRU may not update the prioritization list when the WTRU is in the timer-to-trigger period.

The WTRU may be configured to prioritize for data reception. Because of practical hardware considerations, the WTRU may not be able, in practice, to track an infinite number of synchronization zones simultaneously. A practical WTRU may be capable of decoding a limited number of scheduling announcements (SA) in a subframe. The WTRU may be configured to prioritize the synchronization zones for data reception. The WTRU may be configured to prioritize the synchronization zones for data reception based upon one or more the prioritization information.

The synchronization ID associated to the synchronization source may be prioritization information used by a WTRU to prioritize synchronization zones for data reception. The WTRU may be configured to determine the synchronization source ID and determine whether or not to prioritize this synchronization source ID, for instance based on pre-defined rules/configurations.

The synchronization type associated to the synchronization source may be prioritization information used by a WTRU to configure prioritize of synchronization zones for data reception. The WTRU may be configured to determine the synchronization type and determine priority based on the type. The WTRU may be configured to prioritize for data reception sources that are a base station, an eNB, or sources that are connected to a base station or an eNB over independent sources (e.g., independent sources may have a lower priority).

The group ID associated with the synchronization zone may be prioritization information used by a WTRU to prioritize synchronization zones for data reception. The WTRU may determine the group ID associated to a synchronization zone by decoding the PD2DSCH. The group ID may be in a detected SA associated to that synchronization zone. The WTRU may prioritize synchronization zones for which one or more group ID associated to the WTRU are configured and/or supported.

The WTRU hardware capabilities may be prioritization information used by a WTRU to configure prioritization of synchronization zones for data reception. The WTRU may prioritize when the number of sources is larger than the WTRU is capable of decoding within the set time/latency.

The WTRU reception/transmission pattern may be prioritization information used by a WTRU to configure prioritization of synchronization zones for data reception. Because of its reception/transmission pattern, a WTRU may not be capable of receiving data from another synchronization zone. In such cases, this synchronization zone may not be prioritized.

The WTRU may be configured to transmit a synchronization signal (D2DSS). A D2D WTRU may be configured to transmit a synchronization signal. The following describes methods related to the transmission of a synchronization signal (e.g. D2DSS).

The WTRU may be configured to determine the frame synchronization timing. A D2D WTRU may be configured to transmit a synchronization signal (e.g. the D2DSS) and become a synchronization source. In such cases, the WTRU may be configured to determine its own synchronization frame timing. The WTRU may be configured to determine the D2D Synchronization Frame using one or more of the following.

The WTRU may determine a D2D Synchronization Frame based on internal timing. The WTRU may determine the D2D Synchronization Frame timing arbitrarily, for example, based on the WTRU's internal clock.

The WTRU may determine a D2D Synchronization Frame based on external timing. A WTRU transmitting D2D Synchronization Frame may be in the vicinity of other devices transmitting synchronization signals (e.g., other D2D WTRU, a network synchronization source such as an eNB, etc.). In such a case, if the WTRU is configured to be a synchronization source, the WTRU may be configured to base the D2D Synchronization Frame based on these signals. This configuration may provide the benefit of aligning an adjacent D2D Synchronization Zones, for example, in order to mitigate interference.

The WTRU may align its D2D Synchronization Frame to another received D2D Synchronization Frame. The WTRU may align its D2D Synchronization Frame to the received reference D2D Synchronization Frame (e.g., the D2D Synchronization Frame corresponding to the highest priority D2DSS).

The WTRU may align its D2D Synchronization Frame such that the control channel regions that overlap is reduced. This configuration may provide the benefit of mitigating the interference between control channels.

Frame format may be based on WTRU ID. When the D2D WTRU becomes a synchronization source, the D2D WTRU may be configured to determine the initial value of the D2D Synchronization Frame counter or D2D Synchronization Frame number (D-SFN). The WTRU may be configured to initialize the value of the D-SFN based on a WTRU identifier (e.g., IMSI, a D2D-related ID, RNTI, or the like). This configuration may provide the benefit of randomizing the D-SFN between adjacent synchronization zones and potential associated frequency-time resources configurations.

The WTRU may be configured to transmit preamble and/or postamble. A WTRU monitoring for D2D data transmission may receive data from multiple synchronization zones. The receiving WTRU in that case may acquire the associated synchronization frame for that transmission. D2D transmitting WTRUs (e.g., a WTRU transmitting D2D data) may be configured to transmit the D2DSS when transmitting data communications, for example, in order to not limit the range of a D2D communications.

Figure 9:
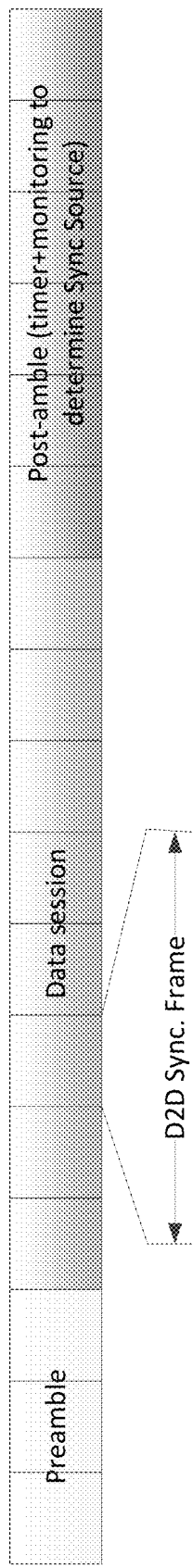
FIG. 9 is an illustration of a device-to-device synchronization signal transmission preamble/postamble suitable for carrying out one or more example embodiments.

The WTRU may transmit a synchronization preamble before sending data. A D2D transmitting WTRU may be configured to transmit a synchronization preamble before transmitting the actual data. The WTRU may be configured to transmit the D2DSS or other information (e.g., PD2DSCH) during a preconfigured period of time before starting to transmit the data, for example, as shown in FIG. 9.

The WTRU may transmit a synchronization postamble after transmitting data. A WTRU may be configured to transmit the D2DSS for a pre-determined period of time after having transmitted its last data packet. This configuration may have the benefit of ensuring that the WTRU does not stop transmission of the synchronization signals, for example, if more data is to arrive in the buffer and in case the WTRU synchronization signal is being relayed by other WTRUs.

The WTRU may be configured to start an inactivity timer when the last data packet has been transmitted. The WTRU may reset the timer when new data is being transmitted. When the timer expires, the WTRU may be configured to stop transmission of the synchronization signals.

The WTRU may determine when to initiate transmission of synchronization signal or message. A WTRU may trigger the transmission of a synchronization message and/or signal (e.g., either as a source or as a forwarding/coordinating WTRU) according to one or more of the following triggers.

The WTRU may detect a trigger based on an explicit indication from the network. A trigger may be received by a WTRU from the eNB/ProSe Function/Application to start/stop operation in PS mode or an explicit configuration by the base station or eNB to detect any of the triggers described herein.

The WTRU may detect a trigger based on detection of other synchronization signal(s). The WTRU may detect another WTRU transmitting a synchronization signal originating from a source of lower priority than the serving synchronization source of the WTRU. A WTRU connected to an eNB (e.g. in in-coverage state) may determine to start transmitting a synchronization signal or message when it detects a synchronization message or signal from an out-of-coverage WTRU. This may allow the out-of-coverage WTRU to find the in-coverage WTRU and synchronize to the reception/transmission opportunities of that WTRU.

The WTRU may detect another WTRU transmitting a synchronization signal originating from a source of lower priority than the serving synchronization source of the WTRU and at least one of the group IDs of the second WTRU belong to the same group ID as the first WTRU.

A WTRU may be an in-coverage WTRU and may detect an out-of-coverage state WTRU or synchronization signal of an out-of-coverage WTRU.

A WTRU may employ a Group ID wherein at least one of the communication group ID(s) of a second WTRU belongs to at least one of the group ID(s) of the first WTRU.

The WTRU may receive data from a second WTRU and determine that the second WTRU is not in coverage of a base station or eNB. This may use some indication in the SA that the WTRU is not in coverage, for example, if there is no D2DSS or message.

The WTRU may use a timer based on absence of other synch signals. A timer from the last synch signal reception may have expired. If the WTRU has not received a sync signal or message from a source, the WTRU may determine to become the source signal.

A WTRU may determine to become a synchronization source, for example, based on a measurement strength falling below a threshold.

The WTRU may determine to initiate transmission of a synchronization signal if the following is detected (e.g., as described herein).

The WTRU may use a time pattern/resource. A first WTRU may determine that a second WTRU is using a different time pattern than the first WTRU.

The WTRU may be configured to detect a difference in frequency of operation such that a first WTRU may be connected for communication in a frequency other than the frequency of operation of a second WTRU.

A WTRU may determine when to stop and/or change transmission of a synchronization signal and/or message. A WTRU may stop and/or change the transmission of a synchronization signal when one or more of the following triggers (e.g., conditions) are met. A trigger may be an explicit configuration from network (e.g., the network explicitly configures the WTRU to stop transmission). A timer based trigger in which the WTRU may stop the transmission of a synchronization signal after a configured period of time. A trigger may be based on data activity that may include an indication that the WTRU has not performed data transmission for a configured period of time. A trigger may be based on an indication that the application process no longer requests the service. A trigger may be based on an indication that the WTRU has not detected any data activity from any neighboring WTRUs (e.g., no SA detected). Detection of another synchronization signal in which the detection of another synchronization signal from a higher priority source or another WTRU may trigger the WTRU to stop transmission of its current synchronization signal and/or modify the transmitted synchronization message and/or signal.

A WTRU may stop and/or determine that a change may be performed, for example, based on the transmission of a synchronization signal. The WTRU may stop and/or determine that a change may be performed, for example, if one or a combination of the following conditions are met. The WTRU may stop and/or determine that a change may be performed, for example, if the WTRU detects a synchronization signal from a higher priority source (e.g. the originating source is a base station or an eNB). This metric may include the synchronization signal power received above or below a configured threshold. The WTRU may stop and/or determine that a change may be performed, for example, if the WTRU detects a synchronization signal from a second WTRU. The WTRU may determine that the synchronization signal from the second WTRU has the same originating source and has a lower hop count than its current hop count. This metric may include the synchronization signal power received above or below a configured threshold.

The WTRU may stop and/or determine that a change may be performed, for example, if the WTRU detects a synchronization signal from a source of the same priority and a hop count lower than the current WTRU hop count. This metric may include the synchronization signal power received above or below a configured threshold. The WTRU may stop and/or determine that a change may be performed in response to determining that the re-evaluated hop count reaches the maximum allowed value (e.g., or is higher than the maximum allowed value). The WTRU may stop and/or determine that a change may be performed if the detected WTRU (e.g., based on the synchronization signal or SA) is connected to a base station or an eNB. The WTRU may stop and/or determine that a change may be performed if the detected WTRU (e.g., based on the synchronization signal or SA) belongs to the same group as the first WTRU.

The WTRU may stop transmission of the D2DSS, for example, if one or more of the following criteria are met. The WTRU may stop transmission of the D2DSS in response to determining that a synchronization timer has expired and is not running. The WTRU may initiate a synchronization timer when one or more of the following conditions are met. The WTRU may initiate a synchronization timer when the WTRU becomes a synchronization source and initiates synchronization signal/message transmission. The WTRU may initiate a synchronization timer when the WTRU becomes a synchronization source based on other detected synchronization signals (e.g., as described herein). The WTRU may initiate a synchronization timer when the timer is restarted, for example, when the WTRU receives data or detects scheduling assignments between transmission (e.g., there may be other WTRUs that are connected to this cluster). The WTRU may initiate a synchronization timer based on data activity, for example, as described herein. The WTRU may initiate a synchronization timer based on the determination that no other WTRU is relaying the synchronization message being transmitted by the WTRU, for example, as determined from measuring the D2DSS of the same source ID, yet with a higher hop count.

If one or more of the criteria to stop transmitting synchronization message are met, but the synchronization timer is running, the WTRU may determine to modify the synchronization signal and message that the WTRU is transmitting. This may be used, for example, to reflect or relay at least part of the detected higher priority synchronization message.

The WTRU may stop transmission of the synchronization signal and/or determine that a synchronization signal change has been triggered when the WTRU determines the WTRU is to stop being a synchronization source. The WTRU may determine that it no longer needs to be a synchronization source when a measurement exceeds a predetermined threshold.

In response to determining that no other WTRU is relaying the synchronization message of the WTRU, the WTRU may determine whether other WTRUs are relaying its message by performing one or more of the following. The WTRU may monitor D2DSS signals of the same source ID but with a higher hop count and determine whether or not there is an associated synchronization message. The WTRU may detect a synchronization message carrying the same content, possibly indicating a higher hop count, and/or by detecting a synchronization message with the same source ID.

The WTRU may receive a synchronization channel message. A synchronization source and/or a synchronization forwarding entity may transmit a synchronization message. The synchronization information may be explicitly sent as a message, or the information could be implicitly derived from the synchronization reference signals characteristics.

For example, a synchronization message may be sent over the D2D data channel (e.g., the communication channel). A synchronization message may be transmitted by a WTRU using a communication MAC PDU. An indication in the MAC header may be included, for example, in order to allow the receiving WTRU to identify this message as a control message. The WTRU may decode this message and/or use the contents of the message. A control message (e.g., RRC, SIB, and/or the like) may be transmitted on the MAC PDU. A logical channel value reserved for control messages may indicate to the receiving WTRU that this is a control message.

The WTRU may use PD2DSCH transmission format and characteristics. The PD2DSCH may be associated with a particular synchronization signal. In order for the receiving WTRU to be able to determine the PD2DSCH associated to the received D2DSS, the WTRU may use one or more of the following.

The PD2DSCH may be transmitted in the same frequency resources as the D2DSS. Once the D2D Synchronization Frame is acquired, the WTRU may retrieve the PD2DSCH without ambiguity. This example embodiment may not be too complex to implement but may not be robust enough against interference from other PD2DSCH or data transmitted in the same set of T/F resources.

PD2DSCH Scrambling sequence may be based on a synchronization source ID. The WTRU may be configured to use a scrambling sequence associated to the D2DSS (e.g., or synchronization zone ID, group ID, etc.) for the PD2DSCH. The synchronization source ID may be used to index a specific scrambling sequence for the PD2DSCH. This example embodiment may provide the benefit of whitening the interference and may mitigate the possibility of neighbor synchronization sources using the same synchronization source ID.

The SA may indicate the PD2DSCH resources using a special identifier linking the synchronization source ID. The T/F location of the PD2DSCH may not be predefined but rather may be transmitted with a scheduling assignment (SA), for example, like a D2D data transmission. The WTRU may be configured to use one or more special values (e.g. special destination group ID) in the SA to ensure that other WTRUs can decode the PD2DSCH properly. The content of the SA (e.g. the source ID) may be associated to the D2DSS or synchronization source in order for the receiving WTRUs to associate the PD2DSCH to the appropriate synchronization source or frame.

The PD2DSCH may be indicated explicitly based on the logical channel ID in the MAC header. The WTRU may receive the PD2DSCH via a normal D2D communications channel. The WTRU may decode the channel based on the SA destination ID or source ID code. The WTRU may determine that the content of the communication is a D2D synchronization message, for example, based on the MAC header (e.g. via a special logical channel ID, or other explicit MAC indication).

The WTRU may detect, select or receive an indication of the PD2DSCH format. The WTRU may be configured to transmit the PD2DSCH in more than one physical layer format. For example, the physical layer format may include one or more PRBs, one or more OFDM symbols, a coding scheme, a coding rate, a puncturing, a CRC, and/or the like. The physical layer format may support different payload sizes (e.g., depending on the content). Different payload sizes in the PD2DSCH may support a PD2DSCH that may carry more (e.g., or less) information based on a coverage status of the WTRU. The coverage status of the WTRU may include in-coverage, out-of-coverage, and/or the like.

The WTRU may determine the PD2DSCH format to use. For example, the WTRU transmitting the PD2DSCH may be configured to determine the PD2DSCH format based on a payload size. The WTRU may be configured with a set (e.g., a fixed set) of PD2DSCH formats supporting corresponding payloads (e.g., fixed set payloads). The WTRU may select a format (e.g., to maintain an appropriate coding rate). The WTRU may determine the content of the PD2DSCH payload based on a coverage state. The WTRU may be configured to select a PD2DSCH format based on the coverage state. For example, the WTRU may select a first PD2DSCH format when the WTRU is in-coverage. As another example, the WTRU may select a second PD2DSCH format when the WTRU is out-of-coverage.

The WTRU may determine the PD2DSCH based on an associated D2DSS signal. The WTRU transmitting the PD2DSCH may be configured to select one or more parameters of the associated D2DSS. The one or more selected parameters may indicate the PD2DSCH format. For example, the WTRU may be configured to select a primary synchronization signal (PSS) part of the D2DSS to indicate that a source is out-of-coverage and/or indicate (e.g., implicitly indicate) the PD2DSCH format. The WTRU monitoring the PD2DSCH may be configured to determine a format of the PD2DSCH based on the D2DSS signal associated with the PD2DSCH. For example, the WTRU may determine one or more characteristics of the D2DSS (e.g., the Zadoff-Chu root associated to a signal, such as the PSS, of the D2DSS). The WTRU may determine the format of the associated PD2DSCH via a pre-defined association rule. For example, the WTRU may be configured to determine whether the WTRU transmitting the D2DSS is in-coverage or out-of-coverage (e.g., out of network coverage). The WTRU may determine (e.g., implicitly determine) the format of the associated PD2DSCH based on the coverage state of the transmitting WTRU.

The WTRU may use different resources to transmit the PD2DSCH when retransmitting by a different hop count. When a WTRU retransmits or relays the PD2DSCH (e.g. in the same synchronization zone) with a different hop count, the WTRU may be configured to use a different time-frequency resource to mitigate the interference. The WTRU may be configured to transmit the PD2DSCH in a specific time location, which may depend on the hop count. The WTRU may transmit the PD2DSCH in a specific D2D Synchronization Frame number associated to the hop count. The WTRU may be configured to transmit the PD2DSCH in a specific frequency location, which may depend on the hop count. The WTRU may transmit the PD2DSCH in a specific frequency offset associated to the hop count. The WTRU may be configured to transmit the PD2DSCH using a predefined time-frequency pattern, which may depend on the hop count.

The WTRU may determine the content of the synchronization message. The synchronization message may include one or more of the following content information. The synchronization message may include a resource pool, which indicates the WTRU may be provided with a reception pool and/or a transmitting pool. The WTRU may be configured to use a resource pool. The WTRU may determine the reception pool as the aggregation of the resource pool from different received synchronization sources/relays and the transmission pool from the resource pool received from the serving synchronization source/relay. The synchronization message may include a resource pool index (e.g., a resource pool configuration index).

The synchronization message may include a sub-set of resource(s) within a resource pool or the D2D pattern that can be used by a receiving WTRU for D2D transmissions and/or D2D scheduling assignments. The message may include a suggested time pattern (e.g., cycle, duration or the like), frequency that the remote WTRU may use for D2D transmissions. A suggested time pattern may include a time pattern received from a base station or an eNB (e.g., or another source entity). The suggested time pattern may be determined autonomously in the coordinating WTRU based on information available to the WTRU. For example, the coordinating WTRU may determine the suggested time pattern based on services that are being supported by the WTRU. For example, for a single receiver WTRU, the coordinating WTRU may be receiving MBMS transmissions, and the coordinating WTRU may determine the suggested time pattern to allow WTRU reception on MBMS sub-frames configured by an eNB.

The resources may include an index (e.g., indices) describing the resource(s) (e.g., in time/frequency) within a resource pool which the remote WTRU may use. The synchronization message may include a source identifier that may include the identity of the source node that is originating the resource configuration. The identity may include one or more of the following: a BS ID, an eNB ID, cell ID, PCI number, PLMN of the cell, WTRU specific ID, ProSe ID, ProSe Group ID, ProSe Application ID, and/or indication whether the source is a base station or an eNB or another type of source (e.g., another WTRU or cluster head). The synchronization message may include a WTRU identifier to identify the WTRU performing transmissions. The identity may include one or more of the following: a BS ID, an eNB ID, cell ID, PLMN of the cell, WTRU specific ID, ProSe ID, ProSe Group ID, ProSe Application ID.

The synchronization message may include location information. The location information may be associated to an in-coverage WTRU. A WTRU (e.g., transmitting and/or receiving) may determine its location, for example, based on the cell ID, GPS information or other location information and append the location information to the control message. The synchronization message may include a hop-count indicating the number of hops from the source node or an indication whether the transmitting entity is the source entity or not. The synchronization message may include a frame number (e.g., a SFN number) and/or a time reference number used as a reference to synchronize reception and/or transmission patterns.

The synchronization message may include an indication that the WTRU is in-coverage of a base station or an eNB. The synchronization message may include a data relay indicating whether the WTRU is a data relay and associated ID. Further configurations related to the relay network may be indicated, for example, the set of support APN or network ID. The synchronization message may include a last link condition which may indicate the WTRU may transmit a value characterizing the channel or link conditions for its link to the previous hop or to the synchronization source/network, depending on the scenario. The value may be based on a measurement. The measurement value may be a RSRP averaged over a specific period of time, or represent an error rate.

The synchronization message may include an aggregate link condition in which the WTRU may transmit a value characterizing the aggregate channel or link condition considering all the links to the synchronization source/network, depending on the scenario. The value may be based on a measurement, for example a RSRP averaged over a specific period of time. The value can represent an error rate. The WTRU may determine this value by adding the conditions transmitted on the previous hop PD2DSCH and the previous hop conditions as measured by the WTRU.

The synchronization message may include a scheduling period. The WTRU may transmit in the scheduling period.

The WTRU may be configured to detect conditions to transmit the PD2DSCH. The WTRU may transmit the PD2DSCH when the WTRU becomes an independent synchronization source and transmits a D2DSS. The WTRU may transmit the PD2DSCH when the WTRU relays the synchronization from another source. The WTRU may transmit the PD2DSCH when the WTRU determines that it has to transmit using a certain pattern (e.g. WTRU has restricted transmission/reception opportunities). The WTRU may transmit the PD2DSCH when the WTRU is in in-coverage state and has been triggered to become a synchronization signal/message transmitter.

The WTRU may use rules to determine the content of the PD2DSCH. When transmitting the PD2DSCH, the WTRU may be configured with a set of predefined values for one or more of the parameters carried on the PD2DSCH, and the WTRU may be further configured to determine the value of one or more parameters.

The WTRU may determine the resource pool, for example, as described herein. The WTRU may transmit the resource pool configuration in the PD2DSCH.

The WTRU may determine a transmission and/or reception pattern to use for communicating with. This configuration may be beneficial to ensure that the WTRU may be able to operate as a relay and/or to ensure that the WTRU may maintain connection with a base station or an eNB or another synchronization zone. The WTRU may determine the transmission and/or reception pattern to use and transmit the configuration on the PD2DSCH. The new pattern may be determined, for example, from a set of allowed pre-defined patterns (e.g. indexed in the specifications).

The WTRU may determine (e.g., autonomously determine) a pattern based on one or more of the following. The WTRU may select the pattern based on a pattern already configured to communicate with the network, for example, the WTRU may select a pattern that maximizes the WTRU opportunities to communicate with a base station or an eNB. The WTRU may select the pattern based on neighbor synchronization zones. For example, the WTRU may determine the patterns in the neighbor zones and determine a pattern to use that minimizes the interference with adjacent synchronization zones. The WTRU may select a pattern that does not overlap with its paging occasions, when in IDLE mode and in-coverage.

The WTRU may be configured to extend the PD2DSCH content. The PD2DSCH may be configured to carry information (e.g., a small amount of information), for example a subset of the information elements described herein. The PD2DSCH may be configured with a fixed, known, physical transport format. The WTRU transmitting the PD2DSCH may be configured to broadcast control information, for example, to indicate additional information related to radio resource management, support for relaying, configuration information, measurement information etc. The PD2DSCH may be configured to carry a larger amount of information. The larger amount of information may vary in size. The WTRU may be configured to extend the content of the PD2DSCH.

Figure 10:
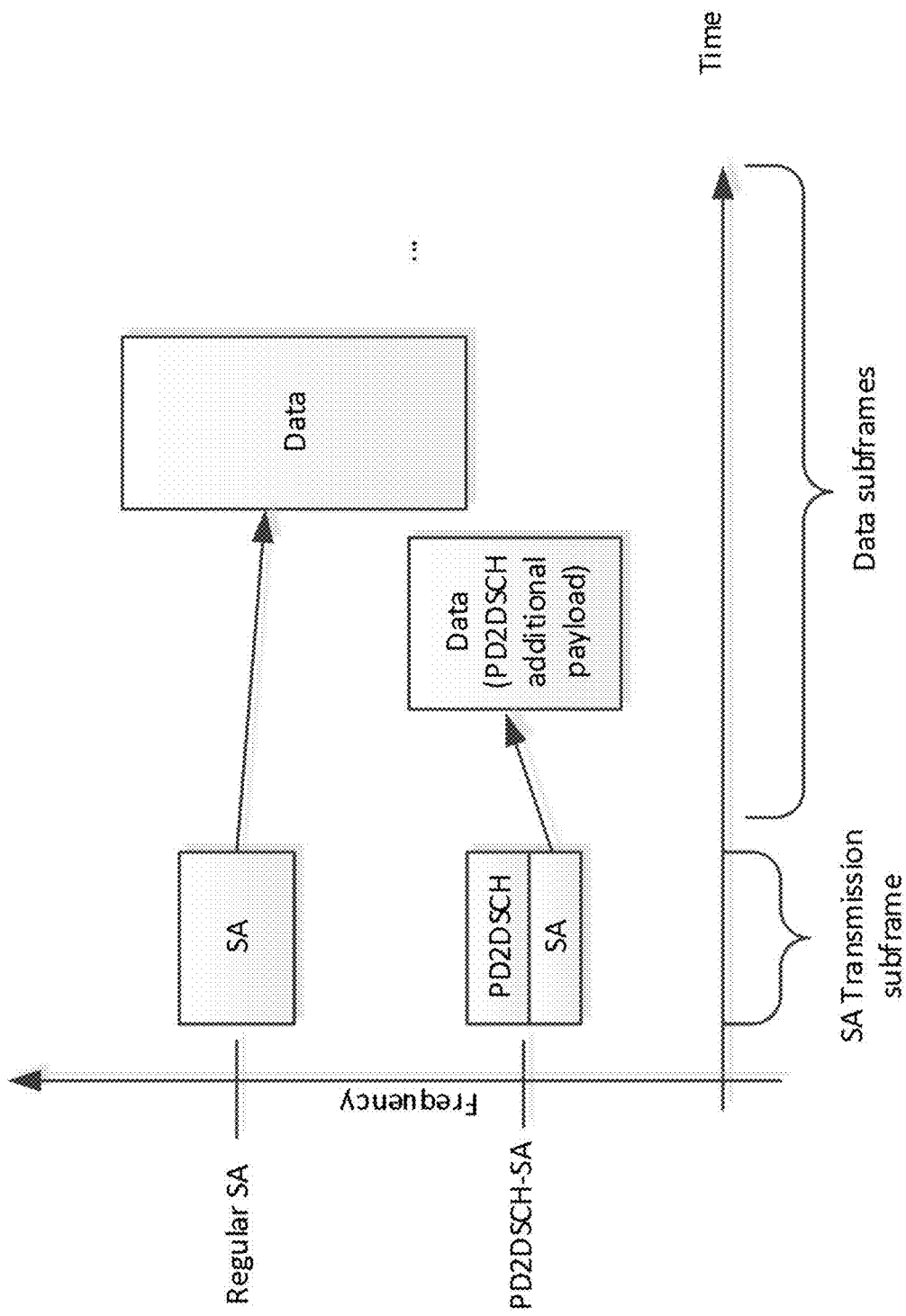
FIG. 10 is a diagram of an example PD2DSCH scheduling assignment (SA) timeline and data association compared to a "regular" SA timeline and associated data.

As shown in FIG. 10, a PD2DSCH may include a scheduling assignment (e.g., a special form of scheduling assignment). The PD2DSCH may include a format of a scheduling assignment (e.g., a special format of the scheduling assignment). A PD2DSCH carrying the scheduling assignment may be referred to herein as the PD2DSCH-SA. For example, the PD2DSCH-SA may be transmitted using the same rules as a regular SA. The PD2DSCH-SA may carry additional information than the normal SA, for example, the PD2DSCH-SA may carry one or more of the following elements: a resource pool, a sub-set of resources, a source identifier, a WTRU identifier, location information, a hop-count, a SFN number or a time reference number, an indication that the WTRU is in-coverage, a data relay, a last link condition, and/or an aggregate link condition.

The scheduling assignment component of the PD2DSCH-SA may carry the additional information. The data associated to the PD2DSCH-SA may carry additional PD2DSCH elements or other information. With reference to FIG. 10, the PD2DSCH-may carry both a PD2DSCH part and a SA part which may point to additional PD2DSCH-related data. An example of a regular SA and data associated to the regular SA are shown in FIG. 10.

A receiving WTRU may be configured to differentiate between a regular SA and a PD2DSCH-SA. A receiving WTRU may differentiate between a regular SA and a PD2DSCH-SA based on one or more of the following approaches. A receiving WTRU may differentiate between a regular SA and a PD2DSCH-SA based on an identifier. An identifier (e.g., a special identifier, for example, a PD2DSCH-SA-ID) may be associated to the PD2DSCH-SA (e.g., replacing a conventional target identifier carried in the SA) and may be used to differentiate the PD2DSCH-SA from a normal SA. Upon reception of the identifier (e.g., a PD2DSCH-SA-ID), the receiving WTRU may determine that the received SA is a PD2DSCH-SA that carries PD2DSCH-related information. The receiving WTRU may interpret the received bits according to the PD2DSCH-SA content. A transmitting UE may be configured to transmit the PD2DSCH-SA with an appropriate configured identifier.

A receiving WTRU may differentiate between a regular SA and a PD2DSCH-SA based on a format or CRC check. A receiving WTRU may be configured to distinguish between a PD2DSCH-SA and a conventional SA blindly based on a format and a CRC of the received signal. For example, a receiving WTRU may be configured to attempt reception of a SA and a PD2DSCH-SA and determine whether the received signal is a regular SA or a PD2DSCH-SA, if the CRC of the channel coder checks. A receiving WTRU may differentiate between a regular SA and a PD2DSCH-SA based on a resource over which the signal is received. The receiving WTRU may be configured to distinguish between a PD2DSCH-SA and a conventional SA based on a resource (e.g., a time, a frequency, or a combination of time/frequency) over which the signal is received. The WTRU may be configured with a set of resources that may be reserved for a transmission of PD2DSCH-SA. When receiving a signal over these resources, the receiving WTRU may be configured to decode using a PD2DSCH-SA format. A transmitting WTRU may transmit a PD2DSCH-SA over resources reserved for a PD2DSCH-SA transmission. The resources for a PD2DSCH-SA transmission may be predefined (e.g., in the specifications, via semi-static configuration, or on the USIM/Application).

When a receiving WTRU has determined that the received SA is a PD2DSCH-SA, the receiving WTRU may be configured to receive the associated payload data. The associated payload data may be indicated in the SA portion of the PD2DSCH-SA. The receiving WTRU may apply one or more parameters of the PD2DSCH that the receiving WTRU receives. The transmitting WTRU may be configured to transmit additional data payload associated to the PD2DSCH at an appropriate location in time/frequency as indicated in the SA portion of the PD2DSCH-SA. For example, one or more transmission parameters for a PD2DSCH data payload may be taken from a subset or a different set than the conventional parameters for data transmission. The additional payload may consist of a restricted amount of data and may not require more than one transmission.

Figure 11:
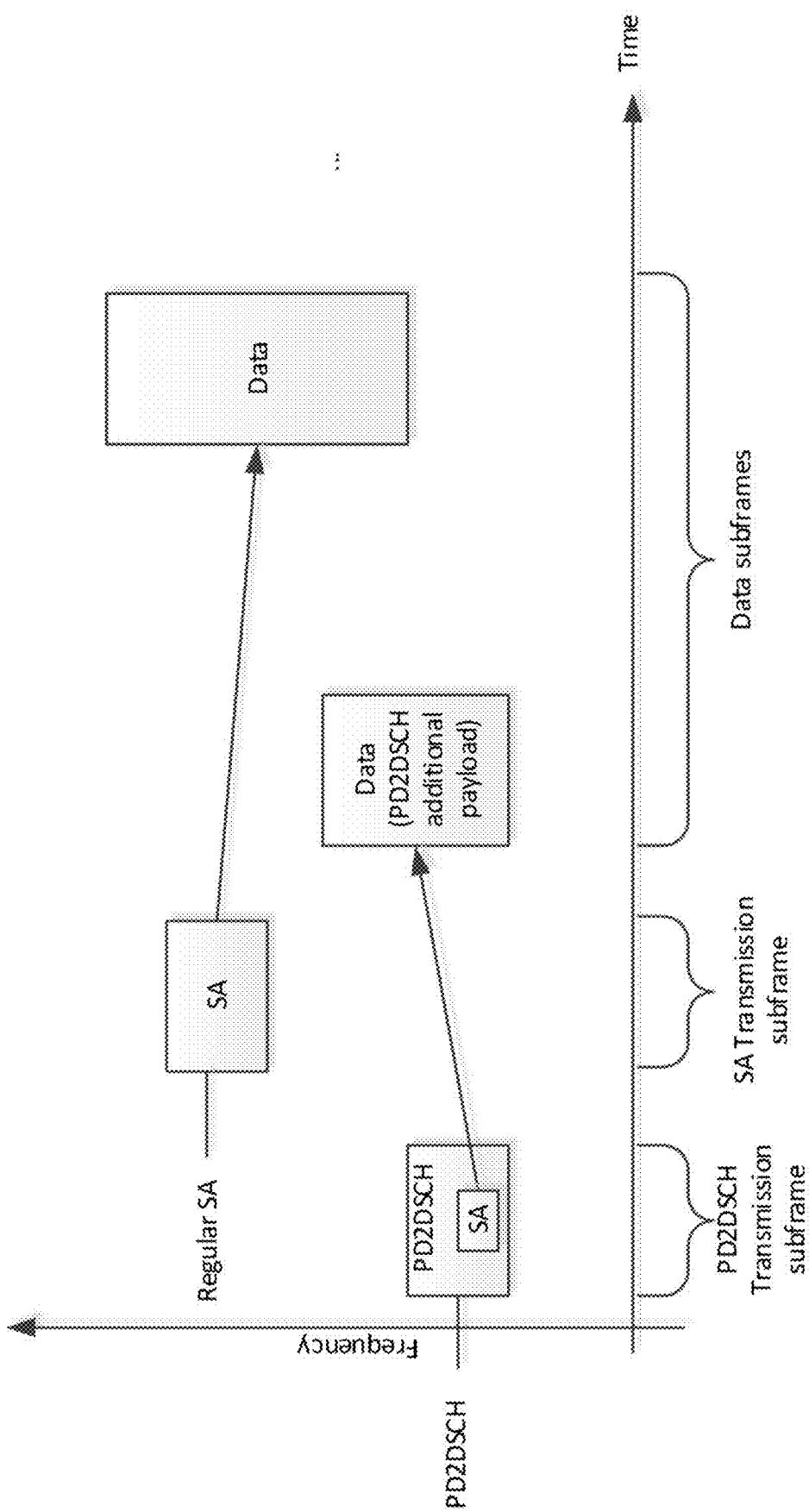
FIG. 11 is a diagram of an example PD2DSCH-SA timeline and data association where the value of the SA associated to a PD2DSCH is set and transmitted in a PD2DSCH transmission subframe.

As shown in FIG. 11, a PD2DSCH may include (e.g., carry) a scheduling assignment. The PD2DSCH may be transmitted with one or more known, pre-determined formats and may carry a SA. The SA carried in the PD2DSCH may include the same information as a conventional SA. The SA carried in the PD2DSCH may have a smaller payload. One or more of the fields in a conventional SA (e.g., target ID) may not be included in a SA carried in the PD2DSCH.

A receiving WTRU may be configured to receive a PD2DSCH and determine whether there is a SA carried in the PD2DSCH. If there is a SA carried in the PD2DSCH, the receiving WTRU may be configured to determine the location of the associated data, further decode the data, and interpret the information as additional PD2DSCH payload and/or data.

A D2D UE may be configured to determine whether additional PD2DSCH data is to be transmitted. The D2D UE may determine the format of the PD2DSCH and/or the content of a SA within the PD2DSCH according to whether or not additional PD2DSCH information is to be transmitted. The D2D UE may set the value of the SA in the PD2DSCH appropriately and may transmit the additional data at the location indicated in the SA within the PD2DSCH.

The WTRU may use a PD2DSCH that points to a SA or is associated to a SA. A PD2DSCH may point to a SA or may be associated to a SA. A PD2DSCH may point to a SA or may be associated to a SA which points to additional data. The PD2DSCH to SA association may be determined based on a PD2DSCH time/frequency or another parameter. A SA location in time or frequency may be explicitly transmitted in the PD2DSCH. Other WTRUs may not be allowed to select the SA resource that the PD2DSCH points to or is associated to. A pattern may be selected from a control-only pattern design or a special pattern design with few transmissions.

A PD2DSCH may be associated to a SA which points to data resources carrying additional PD2DSCH content. Solutions for associating a SA to a PD2DSCH may be described. An association between a SA and a PD2DSCH is implicit (e.g., based on one or more characteristics of the PD2DSCH). The transmitting WTRU may determine one or more transmit SA resources and/or parameters based on or more of the following: a PD2DSCH timing; a PD2DSCH physical resource (e.g., a subframe, a PRB index, etc.); a PD2DSCH identifier; and/or an associated D2DSS ID, physical resources or timing. The receiving WTRU may determine one or more receive SA resources and/or parameters based on one or more of the following: a PD2DSCH timing; a PD2DSCH physical resource (e.g., a subframe, a PRB index, etc.); a PD2DSCH identifier; and/or an associated D2DSS ID, physical resources or timing.

Figure 12:
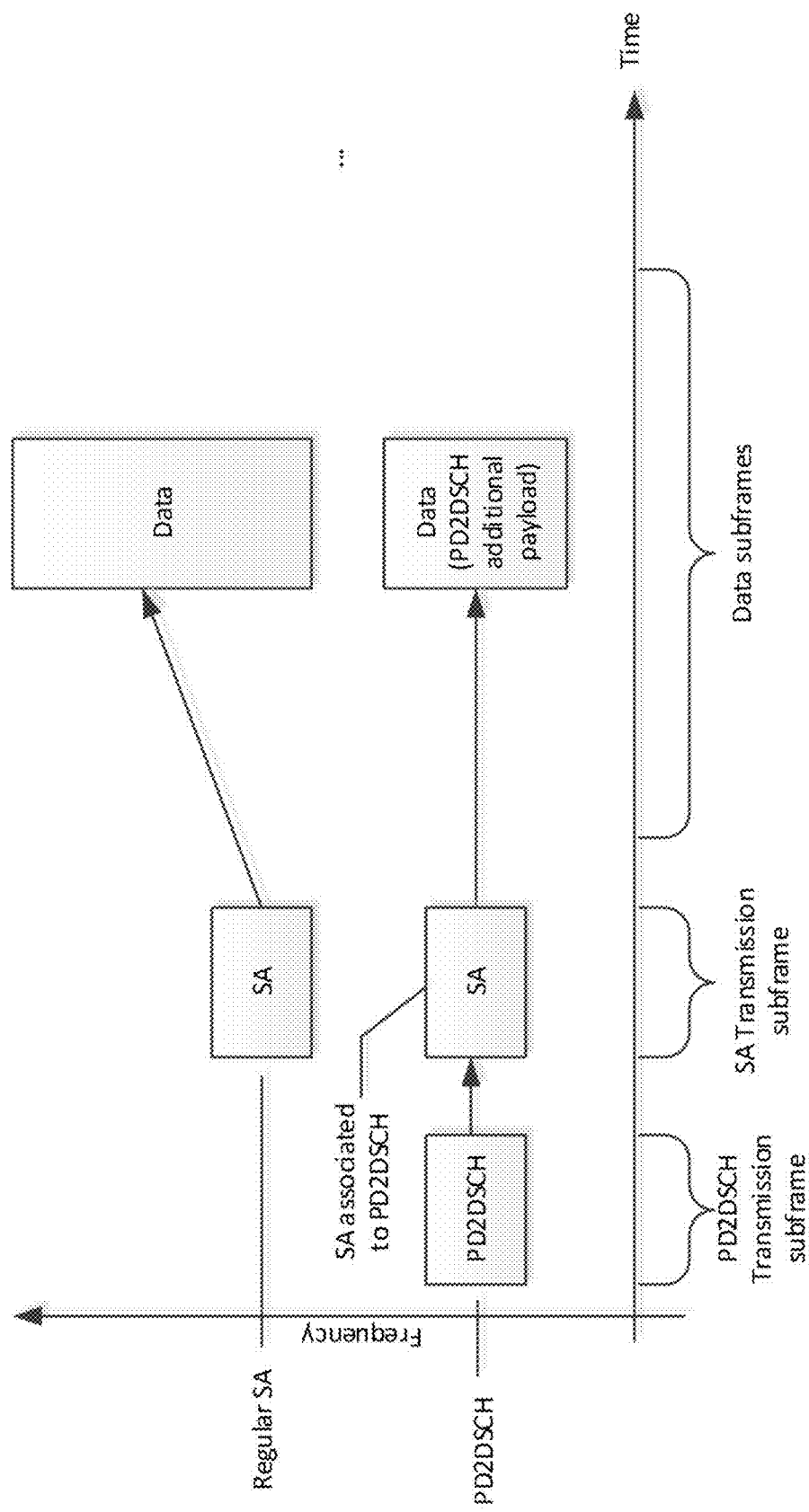
FIG. 12 is a diagram of an example PD2DSCH-SA timeline and data association where the SA associated to a PD2DSCH is transmitted in a SA transmission subframe.

The WTRU may be configured to determine a frequency resource of the SA associated to a PD2DSCH by determining a frequency (e.g., PRB) index associated to the PD2DSCH. The WTRU may be configured to determine a frequency resource of the SA associated to a PD2DSCH by determining a frequency (e.g., PRB) index associated to the PD2DSCH and may apply a mapping function to it. For example, as shown in FIG. 12, the SA associated to a PD2DSCH may be transmitted in a same frequency resource in a subsequent subframe reserved for a SA transmission (e.g., a 1-1 mapping function).

To avoid a SA collision, a transmitting WTRU may be configured to monitor the PD2DSCH and not transmit a SA in one or more resources that are associated to the PD2DSCH.

Figure 13:
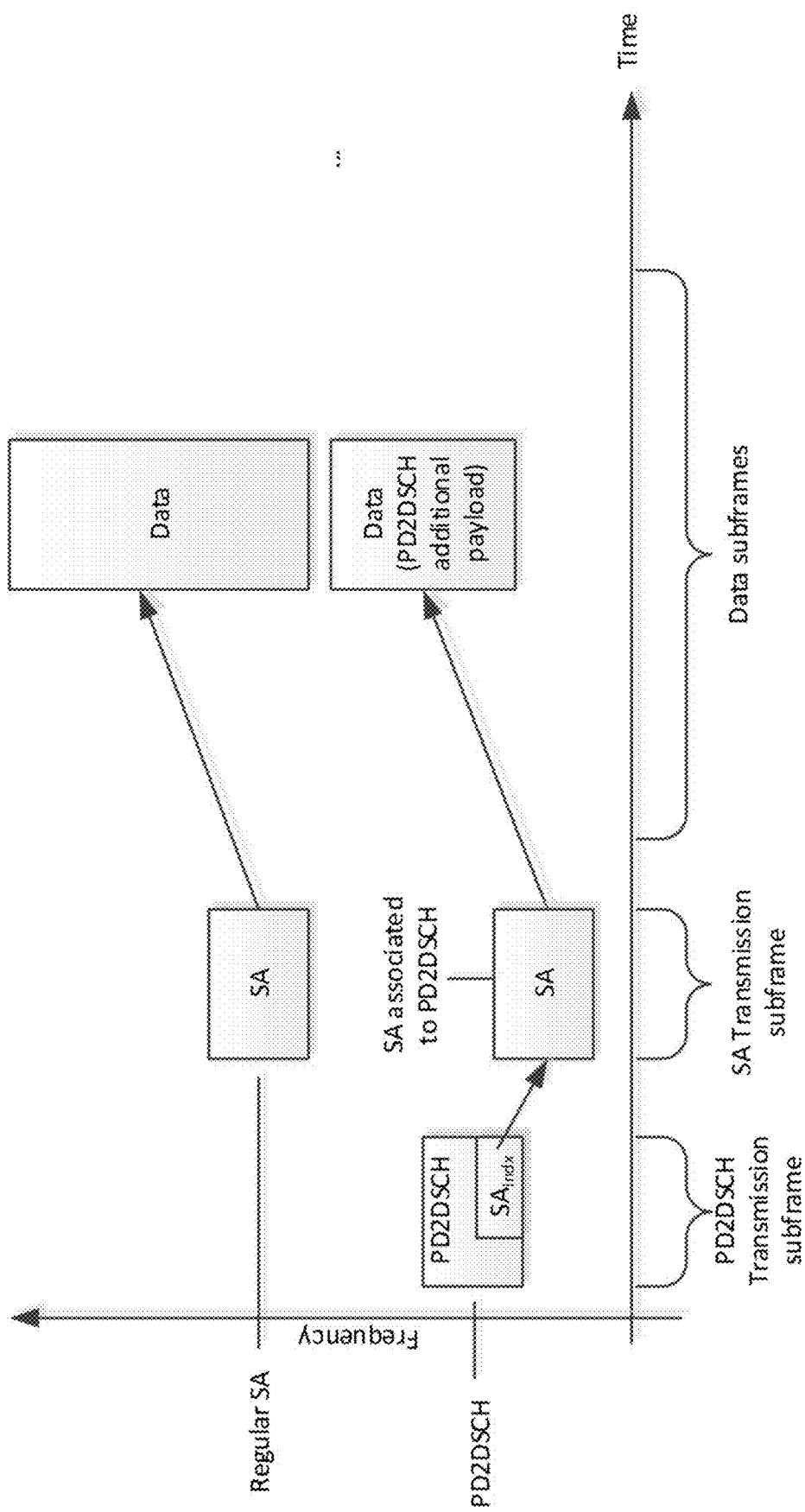
FIG. 13 is a diagram of an example PD2DSCH-SA timeline and data association where the location of the SA associated to a PD2DSCH is based on an explicit indication carried in the PD2DSCH.

As shown in FIG. 13, a receiving WTRU may be configured to determine a location of a SA associated to a PD2DSCH based on an explicit indication carried in the PD2DSCH. The explicit indication carried in the PD2DSCH may be referred to as $SA_{Index}$. The PD2DSCH may carry an explicit indication that a receiving WTRU may use to determine an association to the PD2DSCH. A transmitting WTRU may be configured to select a resource for transmitting a SA according to the same rules as normal SAs and may indicate the resource information in a $SA_{Index}$. For example, the SA associated to the PD2DSCH may be transmitted in a subframe (e.g., a special subframe reserved for SA associated to control information).

The $SA_{Index}$ may be an index to a PRB. A receiving WTRU may determine the subframe information implicitly based on a transmission time of the PD2DSCH. For example, the subframe information may be a next available SA transmission subframe or a next available SA transmission subframe after a time (e.g., a minimum time) after reception of the PD2DSCH has been received (e.g., 2 ms).

The $SA_{Index}$ may carry time information and frequency information for a receiving WTRU to determine a resource (e.g., an exact resource) for the SA.

A transmitting WTRU may be configured to select a SA resource associated to the PD2DSCH from a reserve set of one or more SA resources. The reserve set of one or more SA resources may be reserved for transmission of control information.

A transmitting WTRU may be configured to monitor a PD2DSCH and determine one or more SA resources used for SA transmission associated to the PD2DSCH. The transmitting WTRU may use information carried in a $SA_{Index}$ and may avoid selecting a SA resource from the set of SA resources known to be used for PD2DSCH associated SA transmission.

The WTRU may be configured to select PD2DSCH extended data time pattern. A transmitting WTRU may be configured to select a transmission pattern for a transmission of an extended payload associated to a PD2DSCH or control data using a different mechanism than normal data. A transmitting WTRU may be configured to select one or more transmission parameters from a special set. For example, a transmitting WTRU may be configured to use a number (e.g., a special number) of HARQ transmissions and a repetition pattern reserved for a transmission of control information or information requiring large coverage at high probability.

A WTRU may be configured to coordinate resource usage. Once a WTRU is configured with resources for transmission of a discovery signal, the WTRU may perform transmissions accordingly. If the WTRU is in-coverage with an eNB, the resource pool and/or dedicated resources may be preconfigured and/or dynamically configured by the network. If the WTRU is out-of-coverage of an eNB, the WTRU may obtain resource configuration from a stored pre-configuration and/or from a coordinating entity (e.g., cluster-head). The resources used by the transmitting and receiving entities may be coordinated, for example, if discovery/communication is supported when WTRUs in the coverage of the same configuring entity and/or associated with configuration entities that coordinate with each other. Issues may arise when a WTRU performs transmission and/or reception in multiple domains at the same time, for example, if the discovery/communication is supported in scenarios which are not coordinated.

For resource allocation, the WTRUs may be pre-configured with a resource pool to transmit/receive when operating in out-of-coverage mode. In particular, all WTRUs may be also preconfigured with resources to transmit and receive the resource configuration information (e.g. where to send control information message e.g. synchronization message). The WTRU may also be configured by a controlling entity what resources to use within a resource pool.

Figure 14:
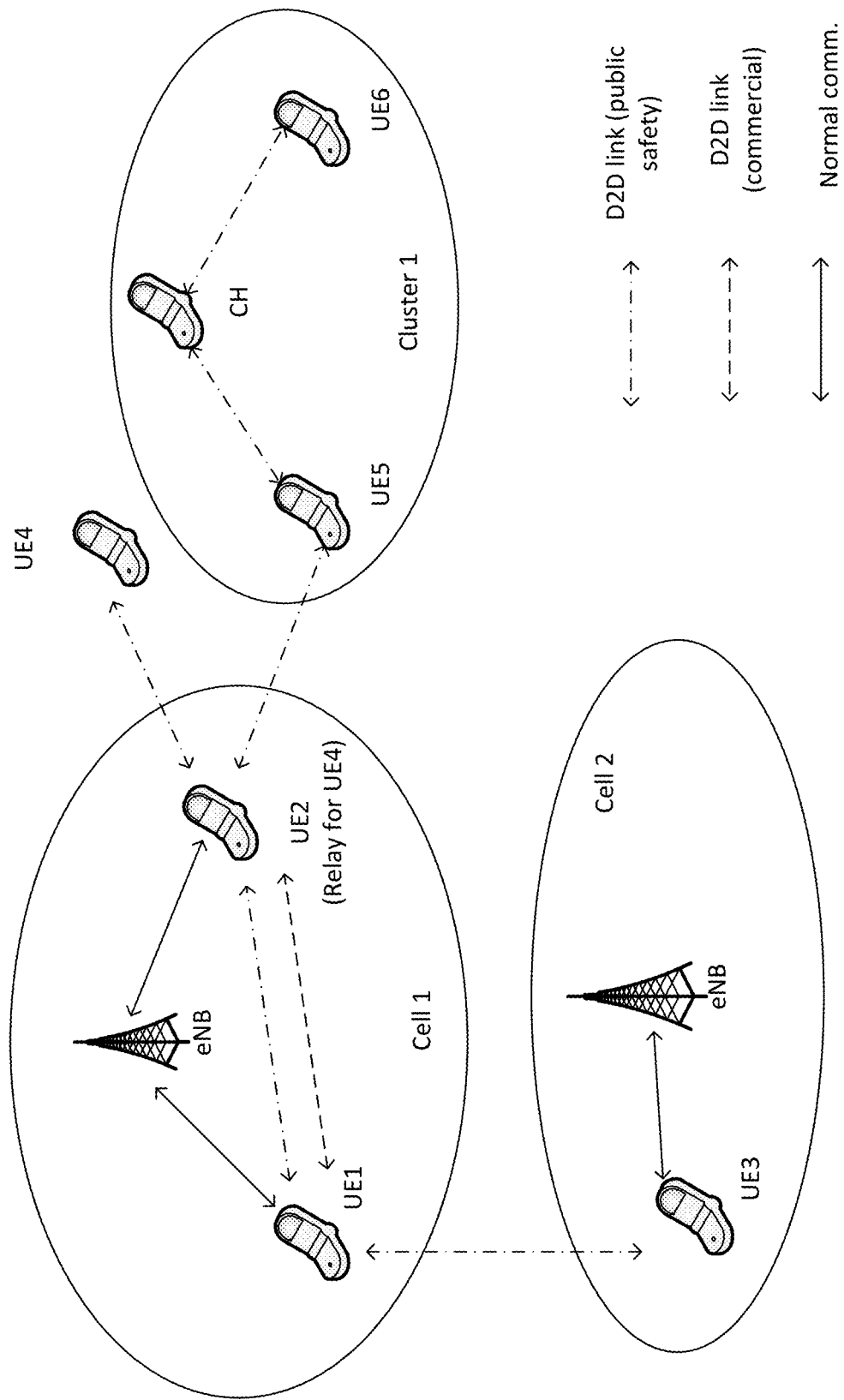
FIG. 14 is a diagram of an example of scenarios for in-coverage, out-of-coverage, and partial coverage D2D discovery and/or communications.

FIG. 14 is a diagram illustrating an example of scenarios for in-coverage, out-of-coverage, and partial coverage D2D discovery and/or communications.

The in-coverage WTRU may discover and/or be discovered by neighboring WTRUs that may be controlled by other uncoordinated controlling entities and/or may be operating in a different spectrum. Since the eNB may provide resource pools for in-coverage discovery, the WTRU may not be able to discover and/or be discovered by the neighboring WTRU, for example, if the neighboring WTRU is not monitoring the same resource pool. The in-coverage WTRU may move (e.g., autonomously move) to a public safety (PS) spectrum and/or out-of-coverage spectrum to perform reception and/or transmission, however, for example, without network coordination this may result in loss of data and/or loss of paging reception. An in-coverage WTRU may be configured to coordinate between the eNB and the in-coverage WTRUs.

An in-coverage WTRU may determine to perform communication with an out of coverage WTRU, act as WTRU-to-Network relay with another WTRU, and/or determine to perform communication with a neighboring WTRU that may determine the set of resources to use by a pre-configuration and/or by a controlling entity (e.g., a cluster head) which may not be coordinated with the serving eNB. The resources and/or time used for transmission by a neighboring WTRU may correspond to subframes in which the in-coverage WTRU may be performing normal cellular communications. The in-coverage WTRU may coordinate with the eNB to request time and/or resources in which it can communicate with the neighboring WTRU without negatively impacting the cellular connection with the eNB.

The WTRU may switch (e.g., autonomously switch) to transmitting and/or receiving on the resources in which the neighboring WTRU is expecting to receive and/or transmit. This may result in data loss, the WTRU not transmitting in the UL, and/or missing paging occasions while in idle mode. In order to avoid data losses and/or loss of paging, coordination between the eNB, the in-coverage WTRU, the out-of coverage WTRU, and/or the controlling entity out-of coverage WTRU may be provided, for example, for the WTRUs using a single transmit and/or receive. The coordination may involve coordination of time patterns in which this communication is expected to happen and/or a coordination of resources (e.g., frequency and/or time) in which this communication and/or discovery may take place.

The coordination may aim at allowing controlling entities to align the resources that the WTRUs involved in the communication are using and/or to be aware of scheduling restrictions during these time periods.

The network and/or coordinating entity may be made aware of resource allocation conflicts, for example, such that the network may re-allocate resources and/or schedule the WTRUs accordingly. For example, this may be performed for communication across different clusters that may be controlled by different entities. The eNB may refer to a cluster head and/or controlling entity in a group and/or cluster. The in-coverage WTRU may refer to a WTRU that is connected to the cluster head and/or controlling entity. A neighboring WTRU, PS WTRU, and/or out-of-coverage WTRU may refer to a WTRU that is configured to operate in direct communication. The resource pool and/or configuration for the neighboring WTRU, PS WTRU, and/or out-of-coverage WTRU may be controlled by an uncoordinated controlling entity different from the in-coverage WTRU and/or for which the resources are pre-configured.

The methods described herein relating to in-coverage and out-of-coverage may be applicable to allow coordination between a WTRU that may be controlled by different uncoordinated controlling entities or eNBs, etc.

Figure 15:
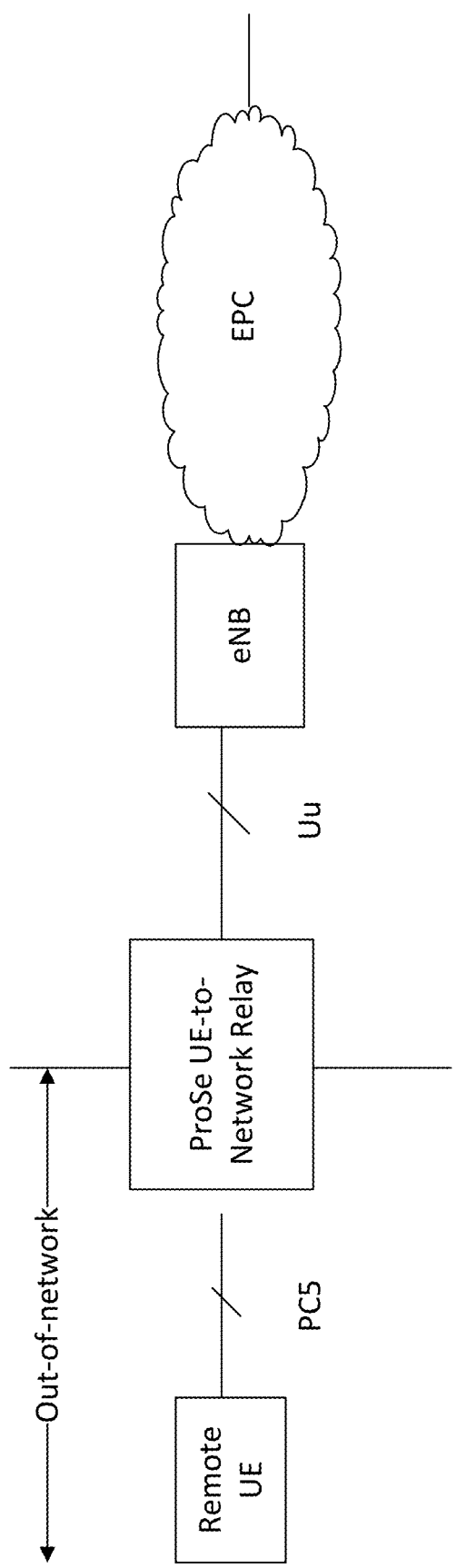
FIG. 15 is a diagram of an example scenario of communication between an in-coverage WTRU and an out-of-coverage WTRU.

An in-coverage WTRU may coordinate, request a gap(s), and/or request resources to communicate with an out-of-coverage WTRU. FIG. 15 is a diagram of an example scenario of communication between an in-coverage WTRU and an out-of-coverage WTRU. A WTRU may be configured to perform interaction between an in-coverage WTRU and an out-of-coverage WTRU, for example, to negotiate resource allocation for the out-of-network link (e.g., PC5). A WTRU may be configured to perform an interaction between the in-coverage WTRU and an eNB, for example, to support resource reconfiguration and/or gap/pattern configuration. The examples described herein may apply to the case where an in-coverage WTRU performs direct public safety communication on public safety resources.

A WTRU may be configured to negotiate resource allocation for out-of-coverage link. The in-coverage WTRU may have a coordinated time and/or gap pattern, for example, such that it may tune out of the cellular link without the risk of losing data. The out-of-coverage WTRU may be aware of when and/or where to expect to receive and/or transmit, for example, to ensure that interested parties may receive the communication.

A pattern for communication may refer to a time pattern (e.g., a period, a cycle, a duration, and/or the like) in which the WTRU may transmit and/or receive. A pattern for communication may refer to a time pattern for reception and a time pattern for transmission. A pattern for communication may include resource information, for example, such a frequency, subframe(s), PRB(s), and/or the like.

Figure 16:
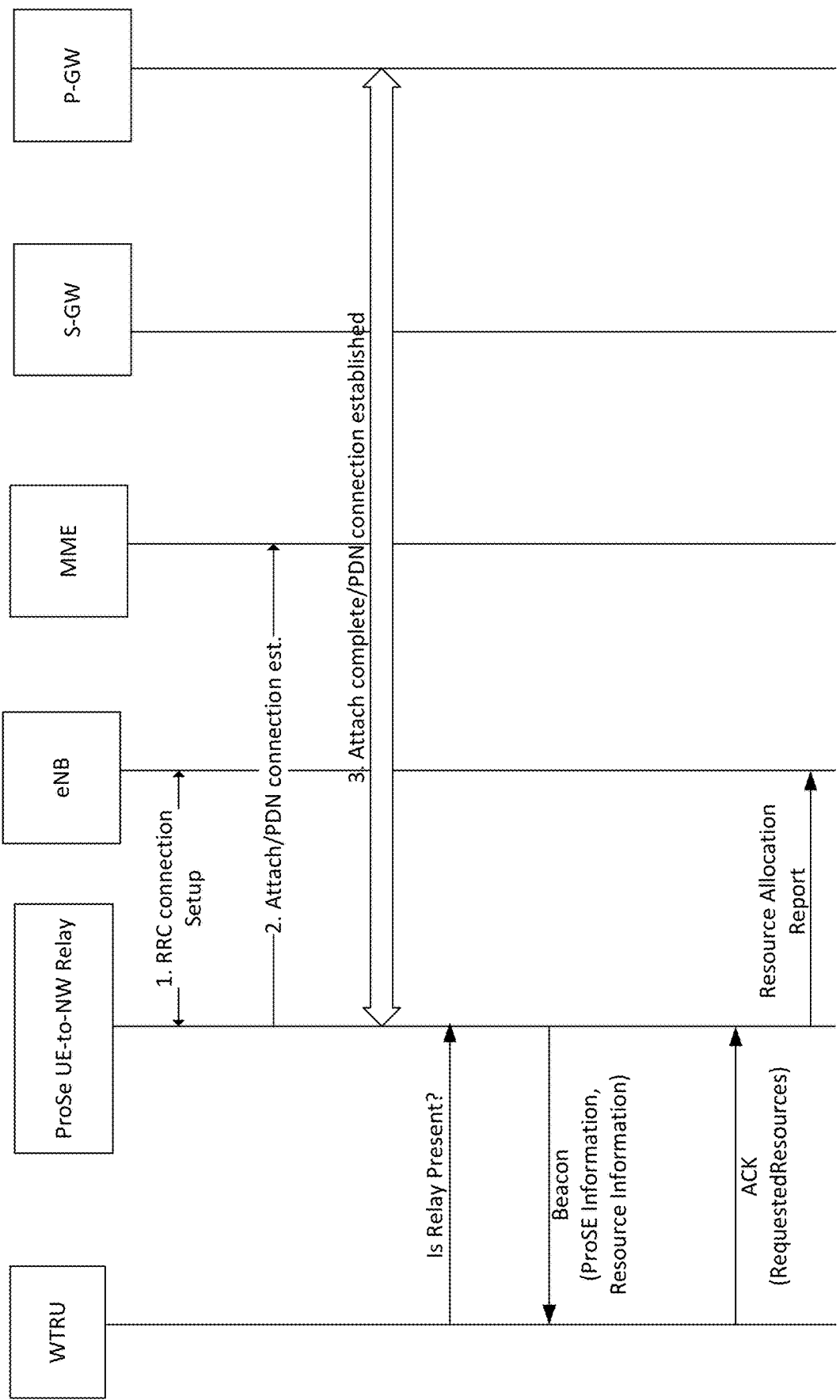
FIG. 16 is a diagram of an example of signaling that may be used for an out-of-coverage WTRU to determine and/or drive resource allocation.

An out-of-coverage WTRU may determine and/or drive resource allocation. FIG. 16 is a diagram of an example of signaling that may be used for an out-of-coverage WTRU to determine and/or drive resource allocation. Resource allocation may refer to a time, a gap pattern, and/or a time and/or frequency configuration for the PS link. For example, the out-of-coverage WTRU may provide and/or broadcast (e.g., in a known pre-configured resource) the resource allocation configuration it is configured to use and/or is using for communication. Resource allocation may be in the form of an SA, a broadcast synchronization message, a control message, and/or the like. The resource configuration may include the time and/or frequency pattern in which the PS WTRU is expecting to transmit and/or receive.

The WTRU may provide a resource configuration if it determines that an in-coverage WTRU is present. The WTRU may provide the resource configuration periodically or all of the time and/or prior to data transmission. The WTRU may provide the resource configuration when WTRUs operating in different spectrums are expected.

A WTRU (e.g., an in-coverage WTRU) may receive (e.g., from an out-of-coverage WTRU) a configuration and/or a time pattern. The WTRU may communicate the configuration information in a report to the eNB. The information communicated to the eNB may include a recommended gap pattern and/or frequency resources for the out-of-coverage WTRU, for example, for the out-of-coverage WTRU to use to communicate. The in-coverage WTRU may determine to send this information to the eNB, for example, if it determines that the out-of-coverage WTRU is a WTRU belonging to the same group as in the in-coverage WTRU (e.g., the WTRU is allowed to receive from this device). The eNB may reconfigure the resource pool it uses (e.g., for discovery and/or communication) and/or provide the in-coverage WTRU with gaps and/or scheduling opportunities to listen to the out-of-coverage link, for example, according to the resources provided by the out-of-coverage WTRU. The eNB may provide the gap pattern. The eNB may approve the use of the suggested gap pattern.

The gap pattern may be translated and/or adjusted according to the timing used by the controlling entity, for example, in the case where the timing and/or reference frame numbers used to determine the scheduling opportunities are different between an in-coverage WTRU and a neighboring WTRU.

Figure 17:
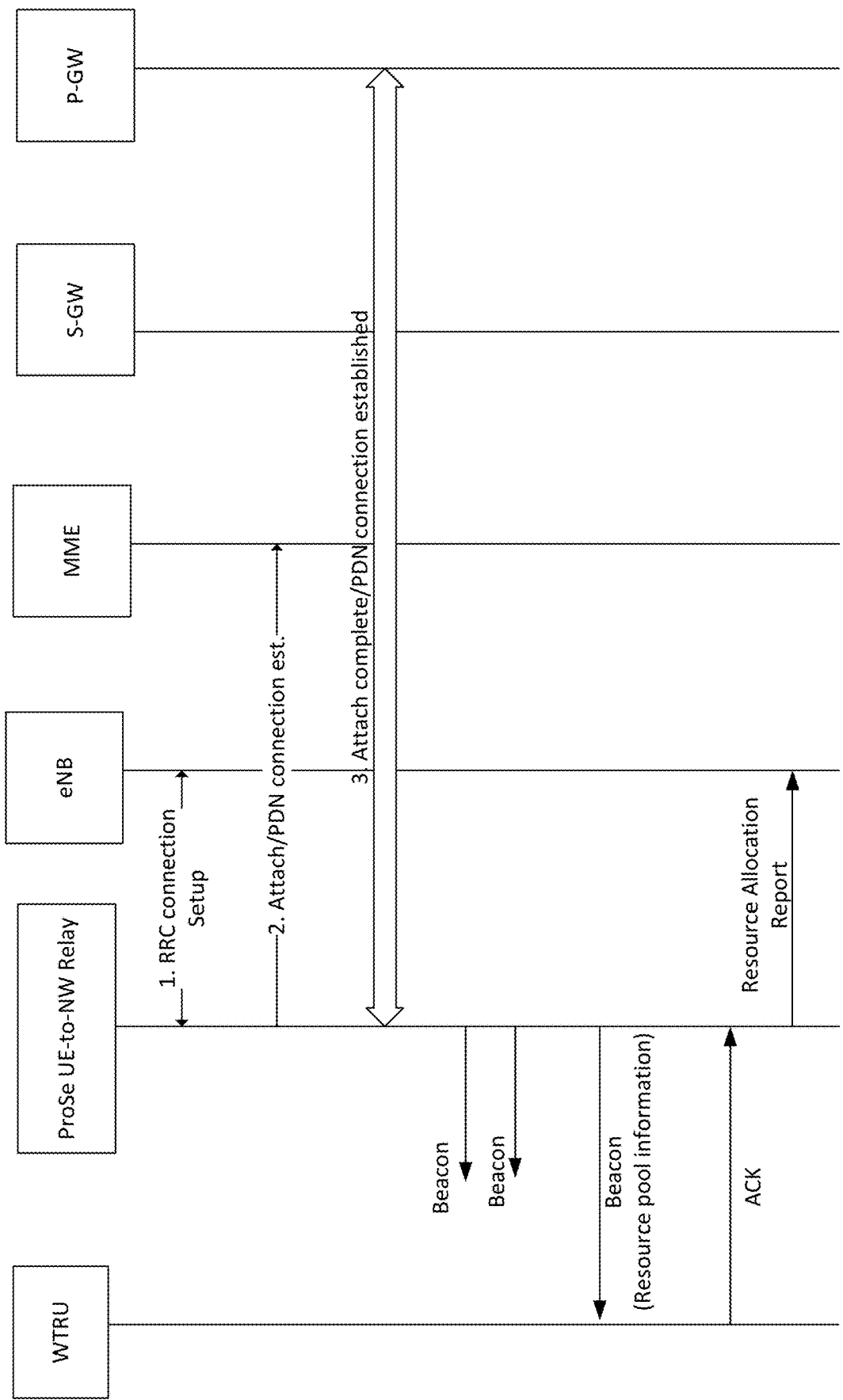
FIG. 17 is a diagram of an example of signaling that may be used for an eNB and/or an in-coverage WTRU to determine and/or drive resource allocation.

A WTRU may determine resource allocation and/or may be driven by the eNB and/or the in-coverage WTRU. FIG. 17 is a diagram of an example of signaling that may be used for an eNB and/or an in-coverage WTRU to determine and/or drive resource allocation. The resource usage allocation for an out-of-coverage link may be driven by the in-coverage WTRU and/or the eNB. For example, the out-of-coverage WTRU may transmit (e.g., broadcast) a resource allocation pool that it may use to select resources for operation and/or the in-coverage WTRU may be aware of the resource pool according to the pre-configured information. The in-converage WTRU, for example once it detects an out-of-coverage WTRU, may determine the resource pool the neighboring WTRU is using. The in-coverage WTRU may not receive this information from the out-of-coverage WTRU and/or it may rely on the preconfigured resource pool for the PS it has. The network may be aware of the resource pool pre-configured for the PS WTRUs.

The WTRU (e.g., in-coverage WTRU) may send a report to the eNB, for example, based on one or a combination of the triggers described herein (e.g., upon determining to communicate as a PS WTRU and/or communicate to a neighboring or remote WTRU, or upon determining to operate as a relay). The content of the report may be described herein, for example, the report may include the resource pool that the neighboring PS WTRU may be using, recommended time pattern, pre-configured time pattern, request for resources to operate as a relay, request for services (e.g., MBMS service groups requested by the remote WTRU), etc.

The eNB, for example upon reception of this request, may determine the scheduling opportunities and/or gaps to allocate to the in-coverage WTRU for PS communication and/or discovery and/or may send the gap pattern and/or time pattern and/or resource configuration to the WTRU or approves the use of the requested time pattern.

In the case of idle mode operation, the in-coverage WTRU, for example, based on the discovery resource pool allocated for in-coverage (e.g., time pattern and/or frequency) and/or the paging occasions, may determine a time pattern that may allow the in-coverage WTRU to tune out of the serving eNB and successfully perform communication with the neighboring WTRU.

The in-coverage WTRU may be configured by the eNB with a reception time pattern for communication with other WTRUs (e.g., in-coverage and/or out-of-coverage to the eNB) and/or the in coverage WTRU may have the pattern pre-configured.

The in-coverage WTRU, for example based on the determined pattern (e.g., from the eNB and/or determined internally), may send a message and/or report to the neighboring WTRU. The message may be transmitted as a broadcast message, as a synchronization message, and/or as a dedicated message to the WTRU and/or by using a control message that may be received by WTRUs belonging to the same group. The message and/or report may indicate the resource allocation, time pattern, and/or frequency in which the in-coverage WTRU may transmit and/or receive. The neighboring WTRU may relay and/or transmit (e.g., broadcast) the message and/or pattern to its controlling entity, which for example, may approve and/or configure the neighboring WTRU with the requested pattern and/or may send a new suggested pattern.

The eNB, for example in addition to a gap pattern and/or time pattern, may provide the WTRU with a specific resource configuration (e.g., frequency and/or time, for example by specifying subframe(s) and/or PRB(s)) that the out-of-coverage WTRU may transmit and/or receive with in-coverage WTRU, where for example, the frequency may correspond to the in-coverage resource pool. The out-of-coverage WTRU may be a standalone unattached out-of-coverage WTRU that may be trying to connect to the network using the in-coverage WTRU as a WTRU-to-NW (network) relay. The out-of-coverage WTRU may be communicating with other in-coverage and/or out-of-coverage WTRUs.

A WTRU may be configured to facilitate interactions between an in-coverage WTRU and an out-of-coverage WTRU. When the WTRU begins to operate in the relay and/or PS mode, the WTRU may send one or more D2D synchronization signals (D2DSS) and/or a control message (e.g., synchronization message). The WTRU may advertise that it is capable of operating as a relay and/or PS node in the control message. A neighboring WTRU operating in vicinity which is looking for a coordinating entity may monitor (e.g., periodically monitor) for D2DSS control symbols and/or may detect the WTRU (e.g., in coverage WTRU, out of coverage WTRU, relay WTRU, and/or the like). The triggers for a WTRU to begin operating as a relay node may be based on pre-configuration, based on measurements, based on explicit trigger from the network and/or from the ProSe server, and/or the like.

The in-coverage WTRU may send resource pool information, obtains acknowledgements, send a report to the eNB, and/or the like. The WTRU operating as a relay and/or triggered to operate as a PS node may operate in an unsolicited mode. For example, the WTRU may advertise itself as a relay and/or a PS node. The WTRU may send an advertisement message with one or more ProSe parameters (e.g., ProSe WTRU id, security, ProSe group id, etc.) and/or the resource pool it may be using for a link with the out-of-coverage WTRU and/or other PS nodes. The WTRU may operate as a cluster-head and/or append this information as a part of cluster configuration message, for example, for the synchronization message. This may be used by the WTRU to support open discovery. The control message may carry resource configuration indicated by the eNB.

The out-of-coverage WTRU may send a response accepting the configuration parameters. The response message may indicate one or more (e.g., a subset) of the resources in the pool that are acceptable to the out-of-coverage WTRU. The relay and/or the PS node WTRU may send a report to the eNB with this information, for example, as described herein. The eNB may accept this configuration. The eNB may configure gaps and/or reconfigure resources for the relay WTRU and/or PS node to be able to operate with the out-of-coverage WTRU and/or PS node using gaps.

A WTRU may use resources for relaying a control message (e.g., synchronization message). A WTRU operating as a relay may request for resources to relay the control message. The WTRU operating as a relay may use semi-statically allocated resources signaled by the eNB (e.g., using SIB signaling) to relay the control message. The WTRU operating as a relay may use preconfigured resources to relay the control message. The resources may be explicitly preconfigured for a control message and/or the WTRU may select (e.g., autonomously select) resources from a resource pool to be used for relaying the control message.

The out-of-coverage WTRU may request resource pool information, obtain information, send a report to the eNB, and/or the like. The remote and/or PS node WTRU may send a solicitation message requesting any neighboring WTRUs that can operate in a relay and/or PS mode. The remote WTRU may request specific services (for example, request to forward MBMS service indicated using a MBMS TMGI) in the solicitation message. The WTRU may operate as a cluster-head. The WTRU may include the resource pool it expects to use for transmission and/or reception and/or is using in the cluster configuration message, for example, for the synchronization message. A WTRU (e.g., with capability to operate in relay and/or PS mode, and/or operating in solicited mode) may detect this node and/or respond by declaring itself as a relay and/or PS node. The response message may indicate the parameters identifying itself as a ProSe node (e.g., ProSe WTRU id, ProSe group id, etc.), security configuration, and/or the like. The responding WTRU may request a different resource pool, for example, based on capabilities and/or an existing gap pattern configuration.

The relay and/or the PS node WTRU may send a report to the eNB with this information (e.g., as described herein), for example, once the resource negotiation is concluded. This mode may support targeted discovery. The eNB may accept the configuration and/or configure gaps and/or reconfigure resources for the relay WTRU and/or PS node to be able to operate with the out-of-coverage WTRU and/or PS node using gaps.

A WTRU may be configured to coordinate a communication from a coordinating WTRU. The WTRU may send a report. The WTRU may identify one or more (e.g., all) of the resources in the report. A reporting mechanism, a WTRU, and/or a WTRU transmitting a message may be used to allow coordination of time and/or resources used by WTRUs in coverage of different cells and/or clusters controlled by uncoordinated entities. Reporting may include resource allocation for an out-of-coverage link to assist the controlling entity and/or transmitting entity to determine scheduling opportunities and/or resource allocation. Resource allocation information may include information relayed, transmitted, broadcasted by neighboring WTRUs, and/or available (e.g., configured or preconfigured) in the in-coverage WTRU.

Reporting (e.g., which may include format, triggers, time windows, and/or the like) may be configured by the network (e.g., by a network node such as an eNB). The network node may configure one or more WTRUs that are configured to operate in a certain D2D communication mode. The reception of this report by the network may trigger actions.

The report may be transmitted to a coordinating entity and/or may be transmitted in the form of a broadcast message, as a part of a synchronization message, as a dedicated message by the coordinating (e.g., in-coverage) WTRU, and/or the like.

The report and/or the transmitted message triggered by a WTRU may include resource configuration from neighboring WTRUs. For example, the report may indicate the resource pool information obtained from the neighboring entities (e.g., WTRUs, cluster heads and/or eNBs, and/or out-of-coverage WTRUs).

The reported configuration may include the resource set intended for D2D discovery (e.g., frequencies, bandwidth, subframe(s), PRB(s), time, and/or the like), the resource set intended for D2D communications (e.g., frequency, bandwidth, subframe(s), PRB(s), time, and/or the like), and/or the identity of the coordinating entity and/or of the WTRU providing configuration information (e.g., cluster head id, eNB id and/or WTRU id, group ID, Prose ID, and/or the like).

The report triggered by a WTRU may include resources (e.g., a sub-set of resources) within a resource pool or the resource pattern that the in-coverage WTRU requests from the eNB (e.g., or may use as previously received from the eNB and/or already configured in the WTRU), for example, such that it may communicate with the out-of-coverage WTRU. For example, the report may include a suggested and/or used time pattern (e.g., cycle, duration, etc.), frequency, and/or the like. The report may indicate a controlling entity that may be taken into account and/or grant to the reporting WTRU. The suggested time pattern may be received from the neighboring WTRU and/or determined (e.g., autonomously) by the in-coverage WTRU based on information it has available. For example, the report may include one or more indices describing the resource(s) (e.g., in time and/or frequency) within a resource pool which the out-of-coverage WTRU and in-coverage WTRU have negotiated and/or preconfigured to use for the out-of-network link.

The report triggered by a WTRU may include location information. Location information may be associated with the reporting WTRU and/or may be associated to the report. A WTRU (e.g., transmitting and/or receiving) may determine its location, for example, based on the cell ID, GPS information, and/or other location information, and append the location information to the report.

The report triggered by a WTRU may include identity information. Identity information may include the identity of the detected out-of-coverage WTRU and/or the identity of the WTRU transmitting the message (e.g., on the synchronization channel). The identity may include a WTRU specific ID, a ProSe ID, a ProSe Group ID, a ProSe Application ID, and/or the like. The report triggered may include information related to one or more service (e.g., one or more service identities) for the detected out-of-coverage WTRU and/or for the WTRU transmitting the message. This information may be used, for example, to establish a relay service.

The report may include the specific plurality of resources, sub-frames and/or duration over which it may expect to receive data and/or receive data (e.g., as determined by control message, scheduling assignment, broadcast message, etc.)

The report triggered by a WTRU may include information relating to whether an out-of-coverage WTRU is present and/or absent. An indication when the in-coverage WTRU detected an out-of-coverage WTRU requesting and/or providing PS service, an indication when the in-coverage WTRU stops detecting the out-of-coverage WTRU (e.g., using measurements), and/or an indication when the out-of-coverage WTRU stops requesting relay service and/or when the WTRU detects a D2DSS from a neighboring WTRU, may be included in the report.

A WTRU may use a SFN (system frame number) and/or a timer reference.

The report triggered by a WTRU may include information relating to the reason for triggering the transmission of the report, the request, and/or the transmission message (e.g., over a synchronization message). The reasons to trigger a report may include a request to initiate ProSe discovery and/or communication for devices that may be operating in another frequency, detection of a neighboring WTRU to initiate communication with, a neighboring WTRU is no longer available, a new WTRU is detected, a change of pattern and/or configuration request, a request to stop a ProSe service, and/or the like.

A WTRU may use triggers. The WTRU may trigger a report, a request for a pattern, and/or the transmission of a pattern (e.g., over a synchronization message) based on the configuration. The WTRU may initiate the transmission when it receives L3 signaling that requests the WTRU to initiate a report and/or message transmission, and/or when the WTRU is configured for such reporting and another trigger initiates transmission of the report. Signaling may be specific to a D2D and/or prose service (e.g., communication and/or discovery) and/or may be WTRU-specific (e.g., applicable to any identities).

Triggers for the report may be event-based. For example, the trigger may be based on detection of a neighboring WTRU, a neighboring WTRU leaving, a request to initiate a ProSe service and/or initiate discovery, a change of pattern and/or resource allocation used by neighboring WTRU, and/or the like.

The report may be triggered when the in-coverage WTRU detects an out-of-coverage WTRU. The WTRU may detect the neighboring WTRU based on a received D2DSS, a synchronization message, and/or data received from the neighboring WTRU requesting a connection (e.g., solicited and/or unsolicited mode) and/or a WTRU performing PS communication with which the in-coverage WTRU can communicate with (e.g., the WTRUs belong to the same group and/or is allowed to communicate according to the ProSe configurations). The report may be triggered when an in-coverage WTRU detects the out-of-coverage WTRU is no longer available and/or the out-of-coverage WTRU is no longer requesting the service.

The WTRU may trigger a request and/or report when an application request from a server to initiate a ProSe service is received. The request and/or a pattern request and/or report from an in-coverage WTRU may be to enable the WTRU to detect and/or discover an out-of-coverage WTRU. The network may configure the WTRU for additional reporting, for example, once the neighboring WTRU has been detected and/or report to the network a request for opportunities to communicate with the discovered WTRU. The WTRU may trigger a report when it determines that a neighboring WTRU has changed the pattern and/or the resource allocation.

Triggers may be based on measurements and/or other detected WTRUs. The WTRU may trigger a report, a request for a pattern, and/or the transmission of a pattern (e.g., over a synchronization message) when connected to a higher priority synchronization source and/or when the WTRU detects another WTRU transmitting a synchronization originating from a lower priority source synch (e.g., a first WTRU is connected to an eNB and detects a second WTRU that is sending a synch signal and is connected to another WTRU and/or another synch source). A trigger may be when the WTRU detects a second WTRU which is not connected to an eNB. A trigger may be when the WTRU detects a second WTRU operating on a frequency other than its frequency of operation. A trigger may be when the WTRU detects a second WTRU that belongs to the same group (e.g., the second WTRU is allowed to communicate with the first WTRU). A trigger may be when the WTRU receives data from a second WTRU and determines that the WTRU is not in the coverage of the eNB (e.g., this may use an indication in the SA that the WTRU is not in coverage if there is not a D2DSS, SCI, SSS, other control signal and/or a message). A trigger may be when the WTRU detects different transmission patterns from different synchronization sources.

Triggers for the report may be periodic. The WTRU may initiate reporting periodically, for example, if there is one or more (e.g., possibly configurable number of) transmissions applicable to the reporting period. The reporting may be stopped when the WTRU detects that the out-of-coverage WTRU is no longer available (e.g., based on measurement) and/or the out-of-coverage WTRU stops requesting the service.

Triggers for the report may be aperiodic. The WTRU may initiate reporting from the reception of control signaling that requests that the WTRU perform reporting. Signaling may be received from a network node and/or may be dedicated signaling and/or signaling applicable to a plurality of WTRUs (e.g., received on a broadcasting channel and/or on a common control channel).

The WTRU may transmit the report using L2 (e.g., MAC) signaling (e.g., as a MAC Control Element), as L3 (e.g., RRC) signaling (e.g., as a RRC PDU as part of a reporting procedure), and/or as higher layer signaling (e.g., such as NAS signaling and/or application signaling). For example, the WTRU may receive control signaling on the PDCCH (e.g., an aperiodic request) that may trigger such reporting. The WTRU may assemble the report as a MAC control element and/or include it in an uplink transmission (e.g., its next uplink transmission). The eNB may be the endpoint of the reporting procedure.

The WTRU may receive a request on a signaling radio bearer (SRB) as an RRC PDU that triggers such reporting. The WTRU may assemble the report as a RRC PDU and/or make it available for transmission on the concerned SRB.

The WTRU may trigger reporting at the application level. For example, the WTRU may assemble an application layer control packet and/or make it available for transmission, for example, as a RRC PDU and make it available for transmission on the concerned SRB (e.g., in case NAS is used) and/or as a user plane data and make it available for transmission for a corresponding DRB. The ProSe and/or the application server may be the endpoint of the reporting procedure.

The WTRU may trigger reporting. If the WTRU is in RRC_IDLE mode, the WTRU may initiate a transition to CONNECTED mode and/or transmit the report according to the applicable signaling method. The WTRU may remain in IDLE mode and/or delay the transmission of the report until it moves to CONNECTED mode, for example, if RRC and/or a higher layer protocol is used.

The WTRU may perform one or more of the following actions upon reception of a report. The network and/or controlling node that receives a report may analyze the resource pool information and perform one or more of the following, for example, from reports received from multiple sources. The network and/or controlling node may determine which resource it may allow the in-coverage WTRU to communicate within the resource pool. The network and/or controlling node may initiate a procedure that reconfigures the resources for one or more WTRUs. The network and/or controlling node may use this information to avoid scheduling the WTRUs in the given resources and/or time periods. For example, the eNB may determine a gap pattern for the in-coverage WTRU and configure the WTRU with the gap pattern.

Upon receiving a report, the eNB may determine, provide, and/or configure a gap and/or time pattern for the WTRU. The gap pattern may be a bitmask and may indicate the TTIs when the WTRU may not be scheduled for normal communications and/or the pattern may correspond to a period, cycle, and/or duration within a period (e.g., each period) the WTRU may not be scheduled for communication with the eNB. Upon receiving a report, the eNB may analyze the requested gap pattern and if it is not deemed efficient, the eNB may provide the WTRU with a new gap pattern.

The WTRU may use the gap pattern to switch to the out-of-coverage link with the neighboring WTRU. The WTRU may send the gap pattern to the out-of-coverage WTRU and/or the new gap pattern received from the eNB to the out-of-coverage WTRU.

The eNB may remove the gap configuration, for example, when the report includes an indication informing the eNB that the out-of-coverage WTRU is no available and/or no longer requesting the service.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method performed by a wireless transmit/receive unit (WTRU), the method comprising:
   receiving a system information block (SIB) from a network device; and
   based at least on information comprised in the SIB and a determination that the WTRU has device-to-device data to transmit:
      sending a connection establishment request to the network device; and
      transmitting the device-to-device data during a time period after the connection establishment request is sent to the network device and before an indication regarding a resource rejection or a resource assignment is received from the network device in response to the connection establishment request, wherein the device-to-device data is transmitted using one or more resources autonomously selected by the WTRU from a resource pool.

2. The method of claim 1, wherein the device-to-device data is transmitted further based on a determination that the WTRU is in coverage of the network device.

3. The method of claim 1, wherein the transmission of the device-to-device data is performed while a radio resource control timer associated with the connection establishment request is running.

4. The method of claim 1, further comprising, if the resource assignment is received from the network device, switching from using the resource pool for device-to-device communication to using resources indicated by the resource assignment for device-to-device communication.

5. The method of claim 1, wherein the resource pool is configured to be used by the WTRU for device-device communication during exceptional scenarios.

6. The method of claim 1, wherein the SIB is received from the network device while the WTRU is in radio resource control (RRC) idle operation.

7. The method of claim 1, wherein transmitting the device-to- device data comprises transmitting the device-to-device data based on fixed power control.

8. The method of claim 1, wherein the resource pool is indicated by the SIB.

9. A wireless transmit/receive unit (WTRU) comprising:
   a processor configured to:
   receive a system information block (SIB) from a network device; and
   based at least on information comprised in the SIB and a determination that the WTRU has device-to-device data to transmit:
      send a connection establishment request to the network device; and
      transmit the device-to-device data during a time period after the connection establishment request is sent to the network device and before an indication regarding-a resource rejection or a resource assignment is received from the network device in response to the connection establishment request, wherein the device-to-device data is transmitted using one or more resources autonomously selected by the WTRU from a resource pool.

10. The WTRU of claim 9, wherein the device-to-device data is transmitted further based on a determination that the WTRU is in coverage of the network device.

11. The WTRU of claim 9, wherein the transmission of the device-to-device data is performed while a radio resource control timer associated with the connection establishment request is running.

12. The WTRU of claim 9, wherein the processor is further configured to, if the resource assignment is received from the network device, switch from using the resource pool for device-to-device communication to using resources indicated by the resource assignment for device-to-device communication.

13. The WTRU of claim 9, wherein the resource pool is configured to be used by the WTRU for device-to-device communication during exceptional scenarios.

14. The WTRU of claim 9, wherein the processor is configured to receive the SIB from the network device while the WTRU is in radio resource control (RRC) idle operation.

15. The WTRU of claim 9, wherein the processor being configured to transmit the device-to-device data comprises the processor being configured to transmit the device-to-device data based on fixed power control.

16. The WTRU of claim 9, wherein the resource pool is indicated by the SIB.

\* \* \* \* \*